US012745688B2

(12) United States Patent
Ostrowski et al.

(10) Patent No.: US 12,745,688 B2
(45) Date of Patent: Sep. 29, 2026

(54) DYNAMIC GENERATION OF EXPERIMENTAL TREATMENT PLANS

(71) Applicant: Deere & Company, Moline, IL (US)

(72) Inventors: James Patrick Ostrowski, Mountain View, CA (US); Benjamin Ray Chostner, San Francisco, CA (US); Kent Michael Anderson, Signal Mountain, TN (US); Erik Ehn, Sunnyvale, CA (US); William Louis Patzoldt, Gilroy, CA (US)

(73) Assignee: Deere & Company, Moline, IL (US)

( * ) Notice: Subject to any disclaimer, the term of this patent is extended or adjusted under 35 U.S.C. 154(b) by 965 days.

(21) Appl. No.: 17/840,856

(22) Filed: Jun. 15, 2022

(65) Prior Publication Data

US 2023/0403988 A1 Dec. 21, 2023

(51) Int. Cl.

*A01M 7/00* (2006.01)
*A01B 76/00* (2006.01)
(Continued)

(52) U.S. Cl.

CPC ........... *A01B 76/00* (2013.01); *A01M 7/0089* (2013.01); *B05B 13/005* (2013.01); *B05B 13/0278* (2013.01); *G06Q 50/02* (2013.01)

(58) Field of Classification Search

CPC . A01M 7/0089; B05B 13/005; B05B 13/0278
(Continued)

(56) References Cited

U.S. PATENT DOCUMENTS 7,263,210 B2 * 8/2007 Kummel ............. A01M 7/0089 104/165
10,713,484 B2 * 7/2020 Polzounov .......... A01M 7/0089
(Continued)

FOREIGN PATENT DOCUMENTS

EP 4186344 A1 5/2023
WO WO 2020/201046 A1 10/2020
(Continued)

OTHER PUBLICATIONS

European Patent Office, Extended European Search Report and Written Opinion, European Patent Application No. 23167317.9, Nov. 15, 2023, 9 pages.
(Continued)

*Primary Examiner* — David J Parsley
(74) *Attorney, Agent, or Firm* — Fenwick and West LLP

(57) ABSTRACT

A farming machine is configured to autonomously operate in a field to accomplish a farming objective. While doing so the farming machine can dynamically modify treatment plans and/or generate experimental treatment plans. Dynamically modifying treatment plans includes modifying, delaying, accelerating, adding, and/or removing farming actions in a treatment plan. Generating an experimental treatment plan includes intentionally modifying a treatment plan to induce a variance in a result, measuring the result, and determining whether the result from the experimental treatment plan is better than the unmodified treatment plan. The farming machine is also configured to generate user interactable feedback, and receive user generated instruction, to dynamically modify treatment plans and/or generate experimental treatment plans.

8 Claims, 28 Drawing Sheets

(51) Int. Cl.
*B05B 13/00* (2006.01)
*B05B 13/02* (2006.01)
*G06Q 50/02* (2012.01)

(58) Field of Classification Search
USPC .................................................... 47/1.7, 48.5
See application file for complete search history.

(56) References Cited

U.S. PATENT DOCUMENTS

| | | | | |
|---|---|---|---|---|
| 10,957,036 | B2 * | 3/2021 | Stueve | G06T 7/001 |
| 11,998,000 | B2 * | 6/2024 | Kwak | G06V 10/235 |
| 2019/0057461 | A1 | 2/2019 | Ruff et al. | |
| 2021/0243938 | A1 | 8/2021 | Blank et al. | |
| 2022/0067121 | A1 | 3/2022 | Huber et al. | |
| 2022/0117214 | A1 | 4/2022 | Garner et al. | |
| 2022/0118555 | A1 | 4/2022 | Sibley et al. | |
| 2022/0167551 | A1 | 6/2022 | Anderson et al. | |
| 2022/0317691 | A1 * | 10/2022 | Eskandari | A01B 69/001 |
| 2022/0338421 | A1 * | 10/2022 | Call | G05B 19/4155 |
| 2023/0054908 | A1 | 2/2023 | Stellpflug et al. | |
| 2023/0320259 | A1 | 10/2023 | Vandike et al. | |
| 2024/0095622 | A1 * | 3/2024 | Hoffmann | G06Q 10/0631 |
| 2024/0257275 | A1 * | 8/2024 | Hoffmann | G06Q 10/06 |
| 2025/0068788 | A1 * | 2/2025 | Hanebrink | G06Q 50/02 |

FOREIGN PATENT DOCUMENTS

| | | |
|---|---|---|
| WO | WO 2022152787 A1 | 7/2022 |
| WO | WO 2022243380 A1 | 11/2022 |

OTHER PUBLICATIONS

Extended European Search Report and Written Opinion issued in European Patent Application No. 25214396.1 dated Mar. 2, 2026, in 08 pages.

* cited by examiner

DYNAMIC GENERATION OF EXPERIMENTAL TREATMENT PLANS

BACKGROUND

Field of Disclosure

This disclosure relates generally to automated farming machines, and more specifically to an automated farming dynamically modifying a plant treatment plan based on user feedback, real time measurements, and desired experimentation levels.

Description of the Related Art

Traditionally, agricultural managers have leveraged long standing experience, expertise, and technical knowledge to implement treatment plans in fields. That is, an agricultural manager relies on institutional knowledge to implement methodologies for managing their fields, even if that institutional knowledge may be outdated, flawed, or incorrect for the prevailing conditions at hand. In short, managers largely implement certain farming techniques because that is the way they have always been done.

Obviously, this thought process has many drawbacks. For example, heedlessly applying traditional treatment plans disregards variation between fields and within fields, gradual climate change, increased capability of farming machines, regional weather variations, and decreasing numbers of managers to implement and manage treatment plans. Moreover, it is often economically unfeasible for a manager to improve field management by accounting for these slight variations.

As such, it would be useful for a farming machine to include the ability to dynamically modify a treatment plan by leveraging the suite of advanced technical capabilities being introduced to autonomous farming machines. Described herein is a farming machine configured to dynamically modify plant treatment plans based on real-time measurements in the field and real-time feedback and guidance from managers. Moreover, the farming machine is configured to intentionally experiment with treatment plans to and determine a modified treatment plan that may perform better than a historically accepted best practice treatment plan.

SUMMARY

Disclosed herein are methodologies and machines configured to dynamically modify treatment plans, generate experimental treatment plans, and methods to integrate user feedback into the same.

In an example embodiment, a farming machine operates in a field that is autonomously (or semi-autonomously) acting to accomplish a farming objective set forth by a manager of the field. The field is divided into field portions and farming actions to achieve the farming objective may be different for each field portion.

To accomplish the farming objective, the farming machine accesses a plant treatment plan. The plant treatment plan includes a predefined sequence of farming actions. Each of the predefined farming actions comprises a predefined treatment to perform at a predefined time in the field. In the example at hand, the predefined treatments are configured for treating plants in the field but could be some other treatment as described above.

As it is performing the plant treatment plan by performing applying the predefined sequence of farming actions in the field, the farming machine obtains real-time measurements describing conditions of the field (e.g., from a machine component array and/or external systems). In particular, the farming machine obtains real-time measurements for different field portions in the field. For instance, the farming machine may obtain real-time measurements for the field portion it is operating within, an adjacent field portion, or some other field portion. Additionally, the farming machine may access previous or historic measurements for the field, and the farming machine may also access real-time, previous, or historic measurements for a different field.

The farming machine applies a treatment prediction model to the real-time measurements. The treatment prediction model is configured to modify farming actions in the plant treatment plan to improve a result related to the farming objective. That is, in this example, the treatment prediction model may generate farming actions for modifying the sequence of farming actions to achieve the result.

To do so, the farming machine inputs the real-time measurements into the treatment prediction model. The farming machine employs the treatment prediction model to process the real-time measurements to identify latent information in the real-time information indicating that modifying the sequence of predefined farming actions would improve the result. That is, the farming machine employs the treatment prediction model to determine 1232 an informed time to perform an informed treatment. In other words, the prediction model receives as input the real-time measurements, processes those measurements, and generates a treatment action to implement in the predefined sequence of farming actions based on the measurements (an "informed treatment action"). The informed treatment action comprises an informed treatment to perform at an informed time. So, the farming machine generates an informed treatment to perform at an informed time that is predicted to improve the result and/or farming objective.

Based on the informed treatment action generated by the treatment prediction model, the farming machine modifies a subsequent farming action in the sequence of farming actions such that the sequence of farming actions includes performing the informed treatment at the informed time. That is, the farming machine will modify the predefined sequence of farming actions from performing a predefined treatment at a predefined time (i.e., performing a predefined farming action) to perform an informed treatment at an informed time (i.e., performing an informed farming action).

The farming machine, then performs the subsequent farming action in the field. That is, the farming machine performs a subsequent action comprising an informed treatment at an informed time. In different configurations, the farming machine may perform the farming action semi-autonomously or autonomously (e.g., with or without manager feedback.).

In an additional example embodiment, the farming machine performs prescribed treatments of a plant treatment plan. Prescribed treatments are predefined farming actions configured for accomplishing the farming machine through the field. In other words, the prescribed treatments include an ordered sequence of prescribed treatments actions that the autonomous farming machine performs as it moves through the field.

The farming machine generates an experimental treatment plan. The experimental treatment plan is a sequence of experimental treatments (i.e., experimental farming actions) configured to induce a variance between plants treated with the experimental treatment plan and plants treated with the prescribed treatments in the plant treatment plan. Generally, at least one of the experimental treatments is different from prescribed treatments of the plant treatment plan. Additionally, in some examples, at least one of the experimental treatments may be configured to be applied during a subsequent pass of the farming machine through the field, and the farming machine may implement the experimental treatment as such. The experimental treatment plan may be applied to a subset of the field portions.

Depending on the conditions, the experimental treatment plan may vary from the plant treatment plan in one or more was. For example the experimental treatment plan may include (1) an experimental treatment having a different amount (e.g., spray volume, seed count, etc.) than prescribed treatments in the plant treatment plan, (2) an experimental treatment performed at a different location than prescribed treatments in the plant treatment plan, (3) an experimental treatment having a different type (e.g., necrose, promote, harvest, thin, etc.) than a prescribed treatment of the treatment plan, (4) an experimental treatment employing a different machine configuration of the autonomous farming machine than a prescribed treatment of the plant treatment plan, (5) an experimental treatment having a different application precision than a prescribed treatment of the plant treatment plan, etc.

The farming machine performs the experimental treatment plan for the subset of field portions. That is, the farming machine implements the sequence of experimental treatments (i.e., experimental farming actions) in the subset of field portions (rather than the prescribed treatments of the plant treatment plan). In some cases, the subset of field portions may be a single row of plants, two rows of plants, etc.

In turn, the farming machine performs the plant treatment plan for a remainder of field portions of the plurality of field portions. The remainder of field portions is the plurality less the subset.

In an additional example embodiment, the farming machine obtains real-time measurements describing conditions (e.g., operating environment) for each of the field portions in the field. The real-time measurements may be obtained by the external systems \ or machine component array of the farming machine. The real-time measurements are obtained as the autonomous farming machine performs a prescribed action from a prescribed sequence of actions (i.e., a treatment plan) for treating plants in the field. In effect, the farming machine is continuously measuring the field as it is spraying plants with plant treatment.

The farming machine applies a machine-learned model to the real-time measurements. The machine learned module determines, for each field portion, a set of farming actions that further the farming objective. That is, the machine learned model generates modified farming actions informed by the real-time measurements obtained by the farming machine ("informed actions"). The generated set of informed actions represent a variety of possible actions that a manager may choose to further the farming objective, and each of those actions may change results pertaining the objective in different ways. For instance, one informed action may increase cost at the expense of yield when achieving the farming objective, while a second informed action may reduce cost to the detriment of yield.

Each of the informed farming actions in the set, in effect, performs a modified treatment at a modified time, both of which are informed by the real-time measurements. The modified treatment may be a change to various characteristics of the treatment (e.g., strength, duration, speed, chemistry, etc.). The modified time may be any of the temporal changes to modified treatments discussed hereinabove (e.g., accelerating, delaying, removing, adding, etc.).

The farming machine provides the manager (e.g., a controller) of the farming machine a visualization of the real-time measurements and the set of informed actions. The visualization may be provided to the manager via the network in the system environment of the farming machine. The visualizations may be graphical, text, audio, video, etc. of information in the system environment. For example, the visualization may be (1) a representation of an expected change in real-time measurements describing the conditions in the field when performing at least an informed action of the set of informed actions, (2) representation of one or more prescribed actions of the prescribed sequence of actions previously performed by the farming machine in the field, (3) illustrates historic real time measurements of the autonomous farming machine performing the prescribed sequence of actions in the field.

The farming machine receives a selected informed action of the set of informed actions from the manager. The farming machine then modifies the prescribed sequence of actions to include the selected informed action. The informed action may modify the prescribed sequence of actions in any of the manners described above (e.g., adding, removing, accelerating, delaying, modifying, etc.). The farming machine may employ the selected informed treatment action as an input to train one or more of the models employed by the prediction module 460.

The farming machine then performs the informed action as part of the prescribed sequence of actions (as the prescribed sequence of actions has been modified). Implementing the informed action may occur when the controller instructs the farming machine to perform the informed action (e.g., by transmitting the selected informed action), the farming machine schedules and performs the action, the farming machine generates instructions to implement the action, etc. The farming machine implements the informed action by performing the informed treatment at the informed time.

Figure 1A:
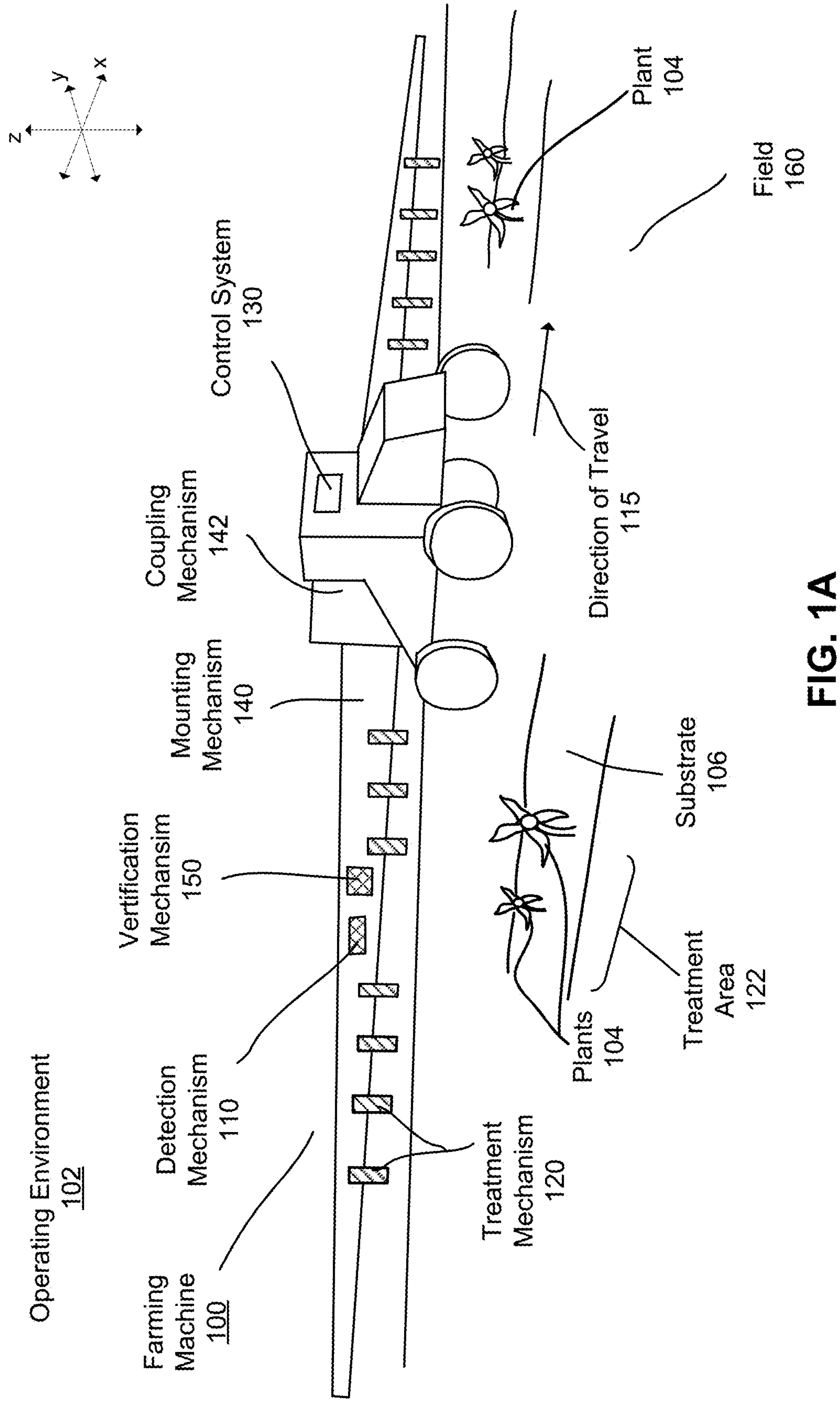
FIG. 1A is an isometric view of a farming machine that performs farming actions of a treatment plan, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

As farming machines becoming wholly autonomous, or partially autonomous, new challenges will arise that will require implementation of robust technical solutions. As these solutions are introduced, an opportunity for improving farming techniques and methodologies relative to historic practices will also arise. In one example, technological solutions for autonomous farming will rely on aggregated data analysis and machine learning algorithms. As such, many of the advantages inherent to those technologies may be applied to farming. For instance, a farming machine may be configured to measure its environment in real time and determine whether its farming objective is being accomplished, and perhaps more importantly, identify and implement methods to better achieve a manager's farming objective.

Disclosed herein are methodologies and machines configured to dynamically modify treatment plans, generate experimental treatment plans, and methods to integrate user feedback into the same.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
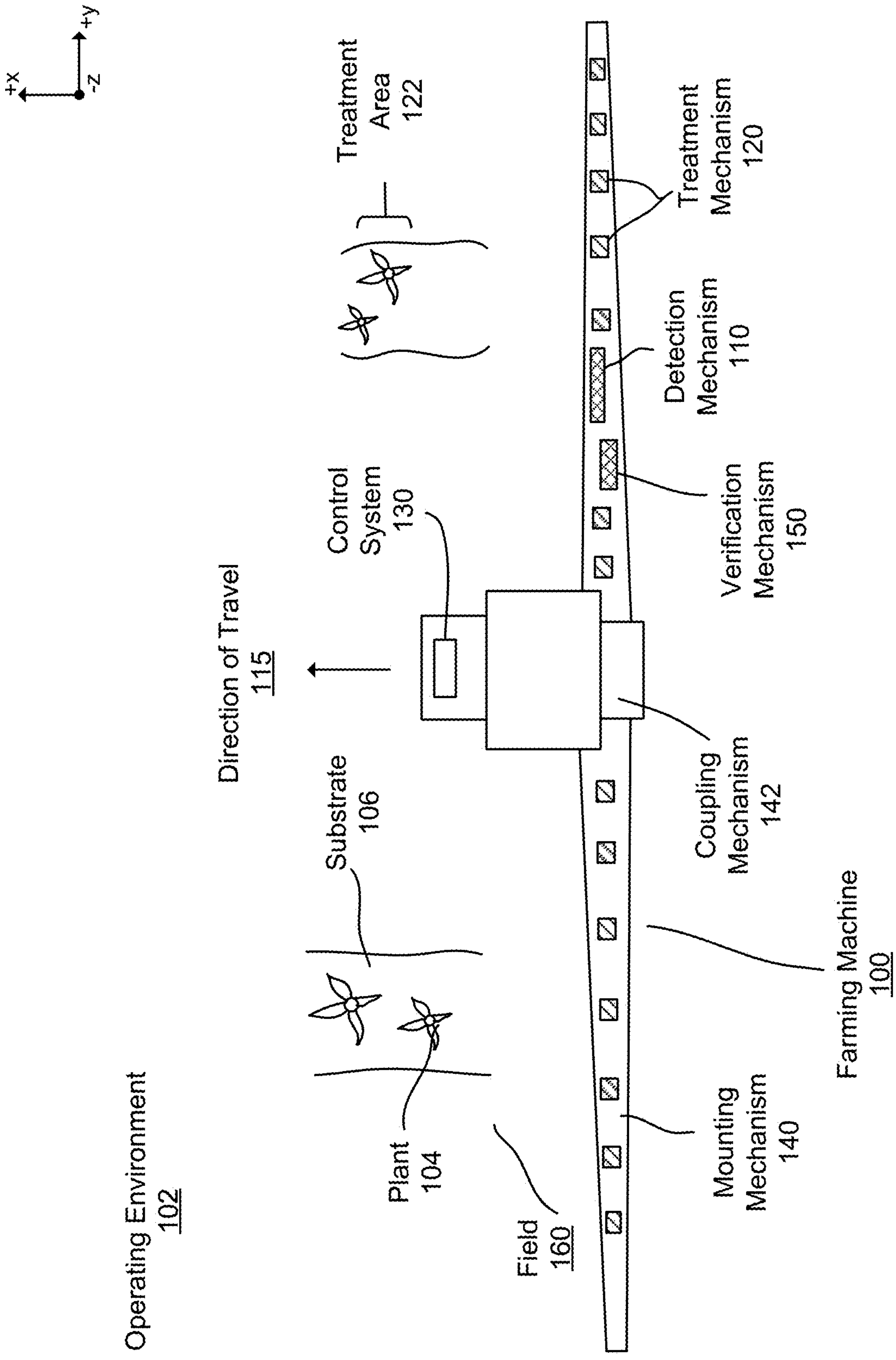
FIG. 1B is a top view of the farming machine in FIG. 1A, according to one example embodiment.
Figure 1C:
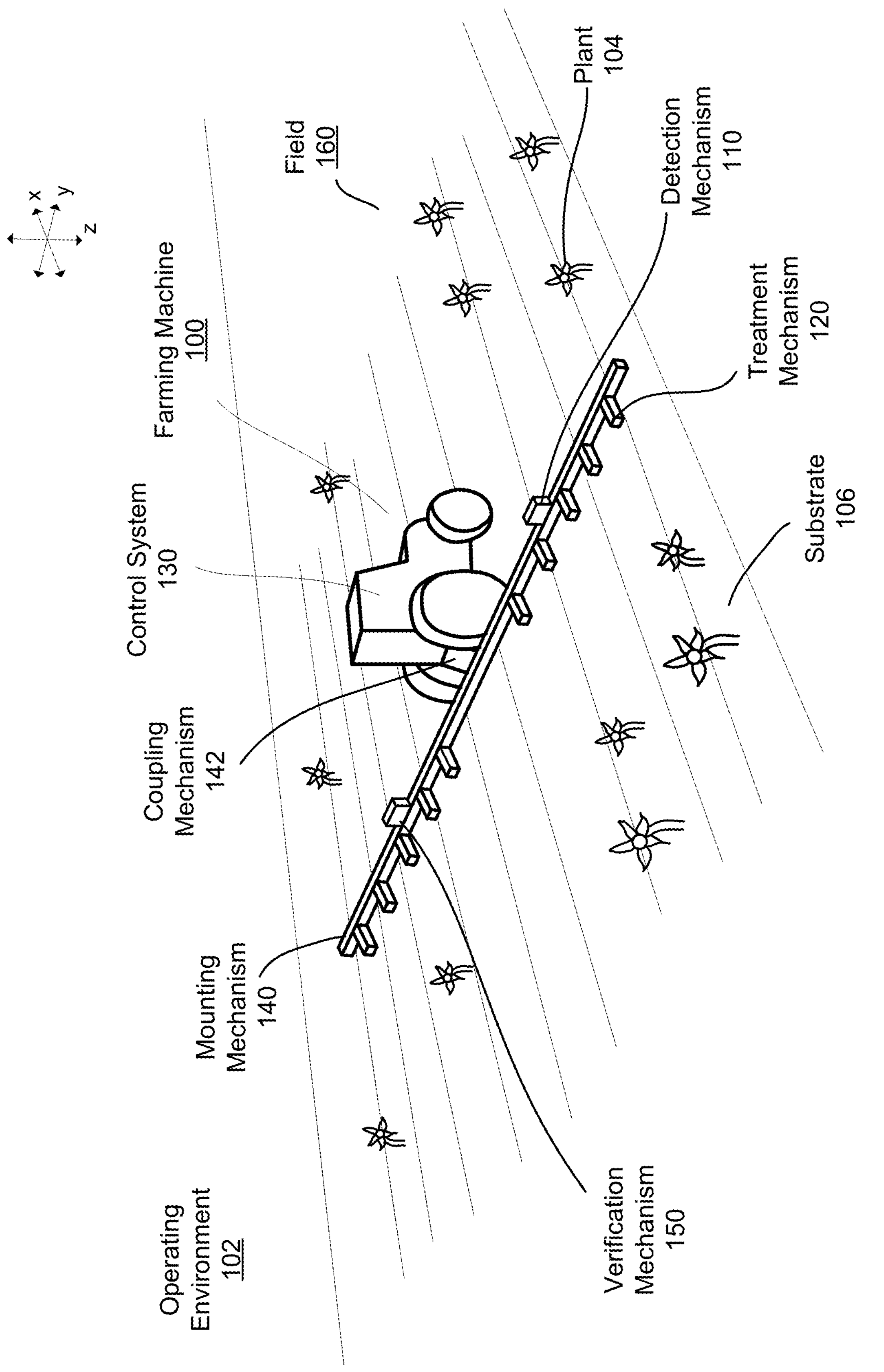
FIG. 1C is an isometric view of another farming machine that performs farming actions of a treatment plan, in according to one example embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

In another example, the farming machine 100 is configured to implement a farming action to measure the field, the environment, results of farming objectives, etc. That is, a farming action may include obtaining data about the field, the environment, etc. without physically manipulating the field itself.

Operating Environment

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100). Sensing information about the operating environment may be a farming action, a farming objective, or a treatment plan, depending on the context.

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action). Additionally, verifying information about the operating environment may be a farming action, a farming objective, or a treatment plan, depending on the context.

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system 210 may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

Figure 2:
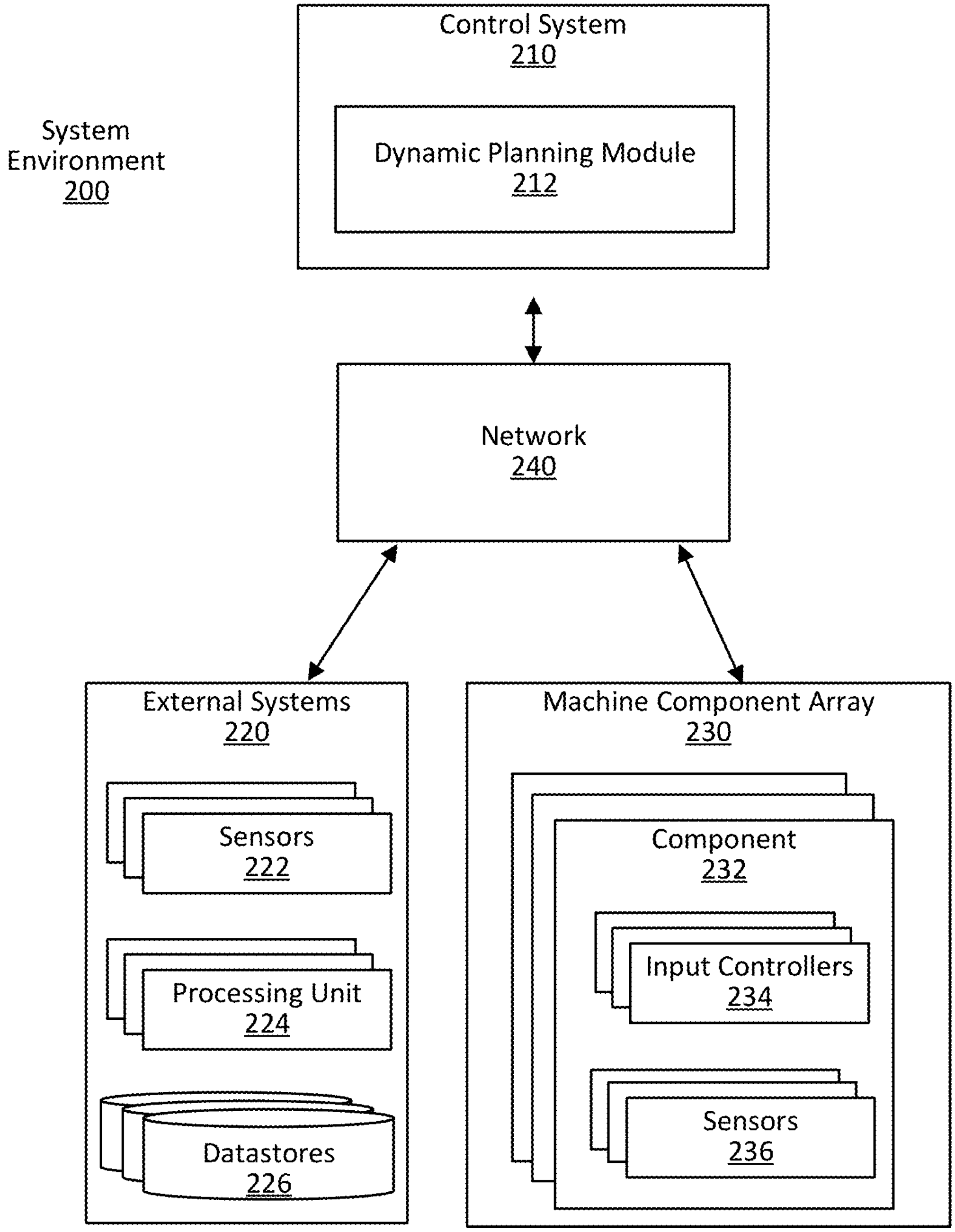
FIG. 2 is a block diagram of the system environment for the farming machine, according to an example embodiment.

FIG. 2 is a block diagram of the system environment for the farming machine, according to an example embodiment. In this example, the control system 210 (e.g., control system 130) is connected to external systems 220 and a machine component array 230 via a network 240 within the system environment 200.

The external systems 220 are any system that can generate data representing information useful for determining and implementing farming actions in a field. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in determining and implementing farming actions in the field. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in determining and implementing farming actions in the field. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 210 230 receives information from external systems 220 and the machine component array 220 and implements a treatment plan in a field with a farming machine. In particular, the control system 210 230 employs a dynamic planning module 212 to dynamically determine and implement farming actions of a treatment plan using information received from the external systems 220 and the machine component array 230. The dynamic planning module 212 is described in greater detail below in regard to FIG. 4.

In some configurations, the control system 210 may be a device connected to the farming machine 100 via the network, and/or some functionality of the control system 210 may be accessible via the network. For instance, the control system 210 may be a computer, smart phone, etc., in the environment and connected to the farming machine via the network 240. In other examples, a device such as a cell phone or computer may be configured to connect to a control system 210 on-board the farming machine via a network 240 such that the device controls control system 210 functionality.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 210 230. The control system 210 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Implementing a Treatment Plan

As described above, farming managers accomplish farming objectives in a field by implementing a treatment plan. A treatment plan is a hierarchical set of objectives that are, in effect, a series of implemented farming actions. Farming actions in a treatment plan are temporally sequenced in the field in a manner that the manager expects will yield good results. For example, a manager may dictate a treatment plan with the following farming actions: prepare a field at a first time, apply fertilizers at a second time after the first time, plant seeds at a third time after the second time, identify and necrose weeds at a fourth time after the third time, and so on.

Figure 3A:
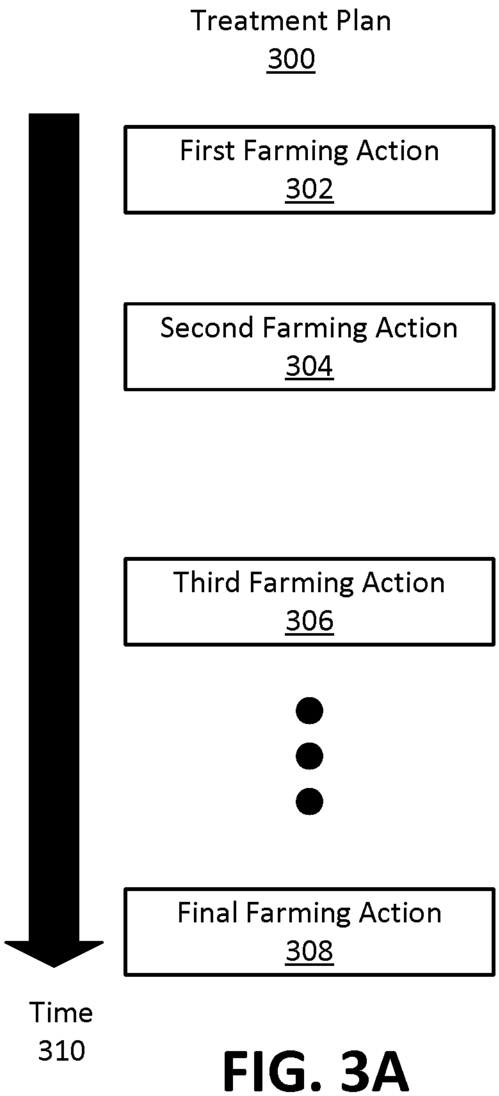
FIG. 3A illustrates a representation of a treatment plan, according to one example embodiment.

FIG. 3A illustrates a representation of a treatment plan, according to one example embodiment. The treatment plan 300 includes a sequenced set of farming actions. That is, the treatment plan includes a first farming action 302, a second farming action 304, a third farming action 306, and a final farming action 308. Each farming action in the sequence occurs at a specific time 310. For example, the second farming action 304 occurs after the first farming action 302 and before the third farming action 306. The final farming 308 action is the last farming action to occur in the treatment plan 300.

The illustrated treatment plan 300 is not intended to be limiting. The farming actions in the treatment plan can be any number or type of farming actions (e.g., planting, weeding, watering, etc.). Further, a treatment plan 300 can include additional or fewer farming actions and those actions can occur at different times and/or in a different sequence.

Figure 3B:
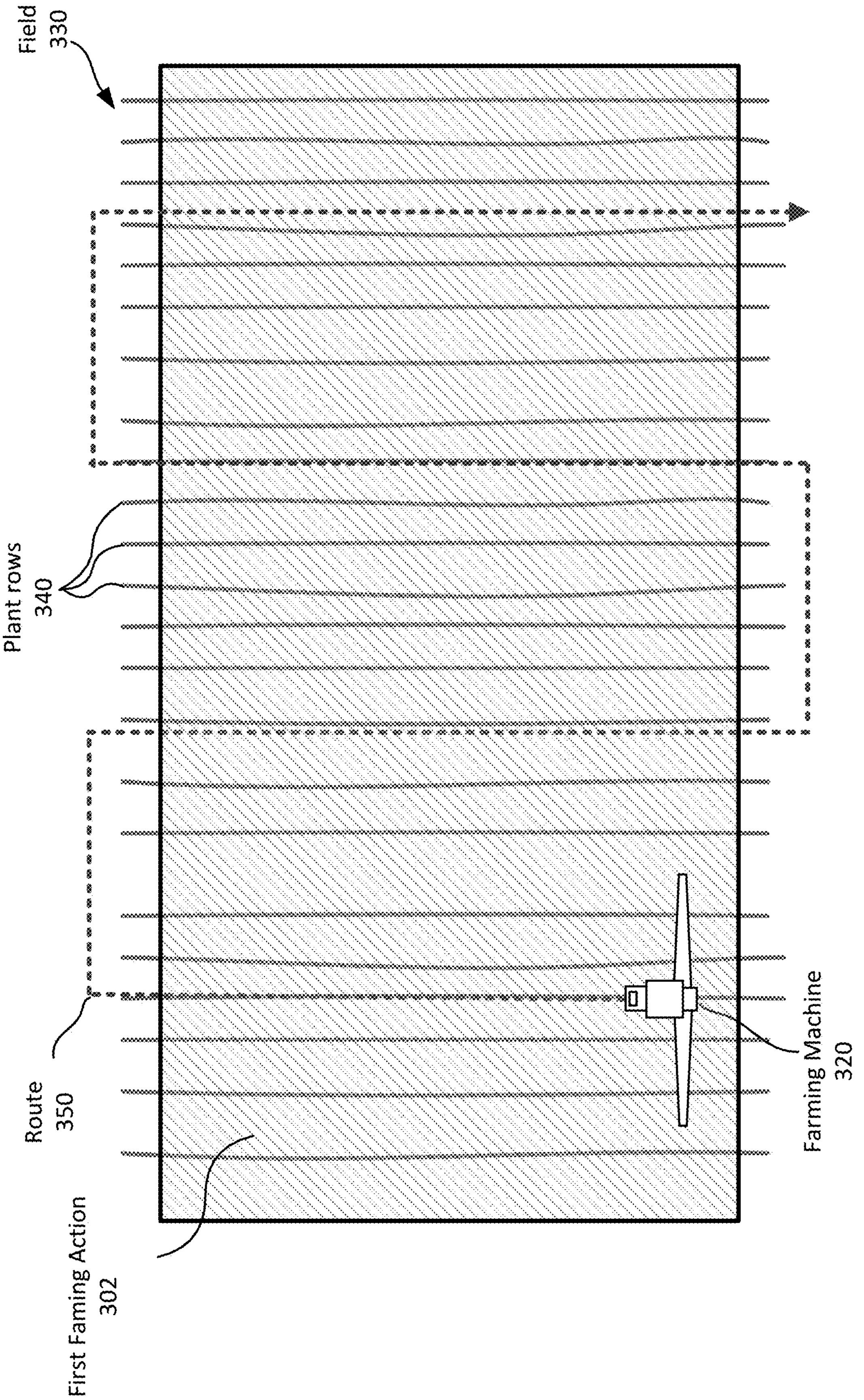
FIG. 3B illustrates an example of a farming machine implementing the first farming action of the treatment plan, according to one example embodiment.

FIG. 3B illustrates an example of a farming machine implementing the first farming action of the treatment plan, according to one example embodiment. The operating environment of the farming machine 320 is a field 330 including plant rows 340. The farming machine 330 travels the illustrated route 350 to implement the first farming action 302 in the field 330. The first farming action 302 is represented by a diagonal fill overlaid the field 330. The first farming action 302 is applied to all areas of the field at a first time, or at approximately a first time. For example, approximately the same pass may indicate one run of the farming machine over the field 330, within 2, 4, 8, 12 hours, etc. Generally, a pass represents the process of completing a farming action in the field. For instance, a single pass through the field may indicate the process of the farming machine travelling through the field to treat weeds with an herbicide. A pass may be tied to a field or a field portion, and a pass may be a current, scheduled (i.e., future), previous, etc., pass depending on the circumstances.

Figure 3C:
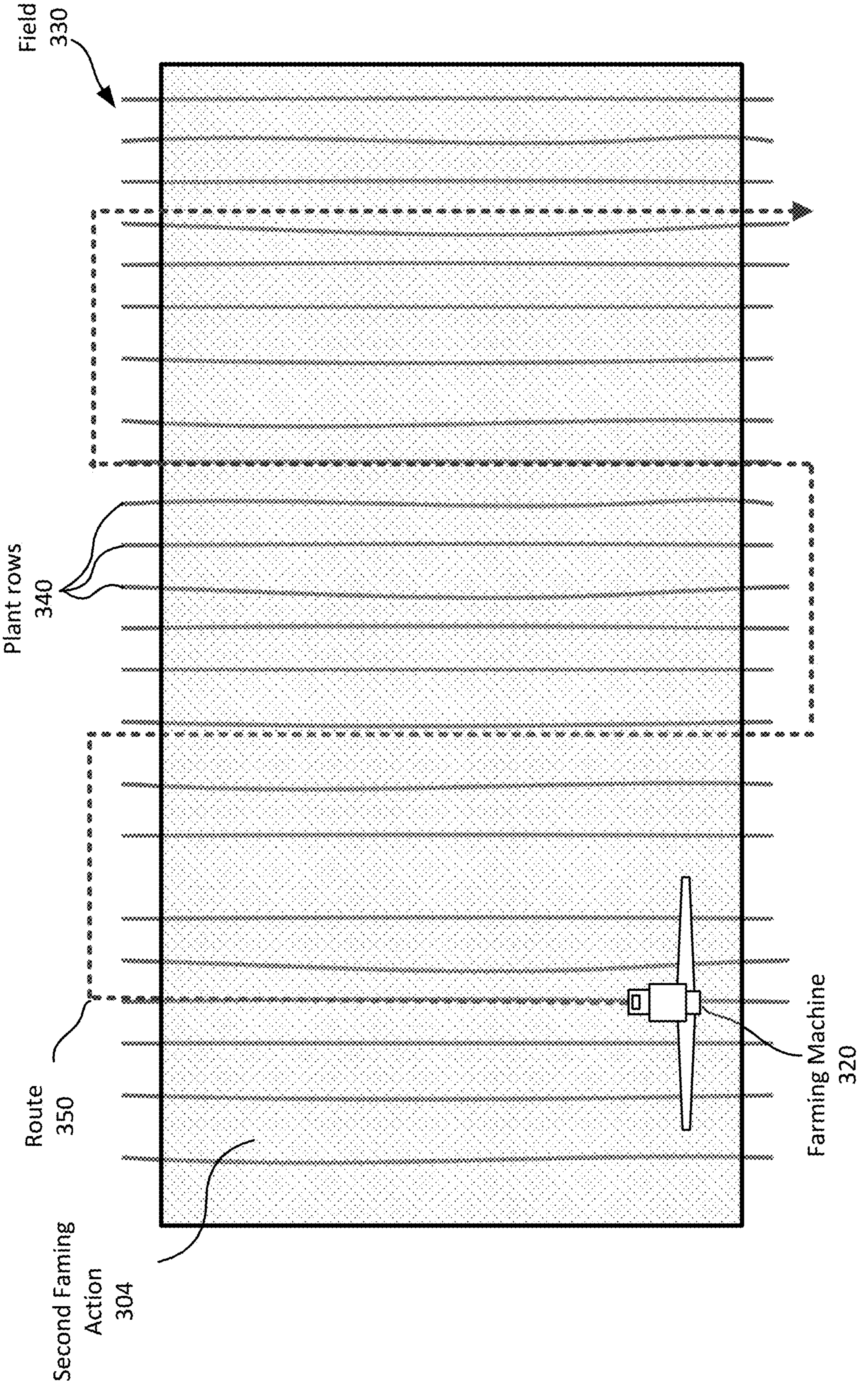
FIG. 3C illustrates an example of a farming machine implementing the second farming action of the treatment plan, according to one example embodiment.

FIG. 3C illustrates an example of a farming machine implementing the second farming action of the treatment plan, according to one example embodiment. The operating environment is the same field 330 as that shown in FIG. 3A. The farming machine 320 is the same as that shown in FIG. 3A, but it need not be. The farming machine 320 travels the illustrated route 350 to implement the second farming action 306 in the field 330. The second farming action 304 is represented by a dotted fill overlaid the field 330. The second farming action 304 is implemented in the field 330 at a second time after the first time, or at approximately a second time after conclusion of the implementation of the first farming action 302.

V. Dynamically Modifying a Treatment Plan

As described above, the farming machine (e.g., farming machine 100) includes a control system 130 (e.g., control system 130) that includes a dynamic planning module (e.g., dynamic planning module 212) that dynamically determines and generates farming actions for a treatment plan based on information received from external systems (e.g., external systems 220) and/or the machine component array (e.g., machine component array 230).

Figure 4:
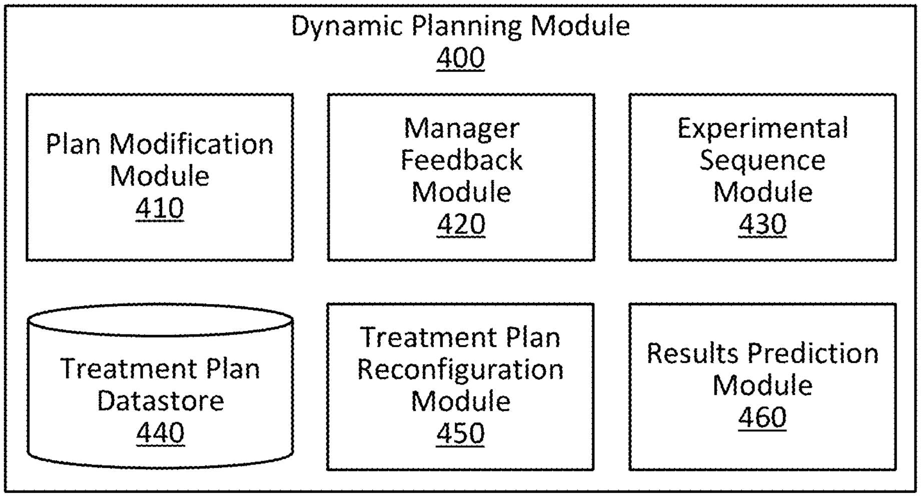
FIG. 4 is a representation of a dynamic planning module, according to one example embodiment.

FIG. 4 is a representation of a dynamic planning module, according to one example embodiment. The dynamic planning module 400 is similar to the dynamic planning module 212 in FIG. 2. The dynamic planning module 400 includes a plan modification module 410, a manager feedback module 420, an experimental sequence module 430, a treatment plan datastore 440, and a treatment plan reconfiguration module 450, and a results prediction module 460 ("prediction module 460"). In various other embodiments, the dynamic planning module 400 includes additional or fewer modules, the modules may be distributed in a different manner, or the capabilities of each module may be attributed to some other element of the farming machine.

The plan modification module 410 modifies farming actions of a treatment plan based on information received from external systems and/or the machine component array. Modifying farming actions in a treatment plan may include any of: (1) modifying a farming action from a first farming action to a second farming action on a current pass through the field, (2) modifying a farming action from a first farming action to a second farming action on a scheduled pass (e.g., a future pass), (3) "delaying" a farming action from a first, earlier time to a second, later time, (4) "accelerating" a farming action from a second, later time to a first, earlier time, (5) removing a farming action from a treatment plan, or (6) adding a farming action to a treatment plan. Other examples are also possible.

The plan modification module 410 generates modified treatment plans based on information received from external systems and/or the machine component array (or some other information available in the system environment 200) by employing the prediction module 460. Broadly, the prediction module 460 predicts how modifying a treatment plan (e.g., by modifying a farming action) will affect results and/or farming objectives using the received information. The plan modification module 410 thereby generates a modified treatment plan reflecting the prediction. As a simple contextual example, the prediction module 460 may predict that delaying the seeding stage of a treatment plan with the farming objective of harvesting a corn crop would increase the yield of the corn crop (i.e., better perform the farming objective). In response, the plan modification module 410 may generate a modified treatment plan including a delayed seeding stage reflecting the prediction. This process is described in greater detail below.

Modifying Farming Actions on a Current Pass

Figure 5:
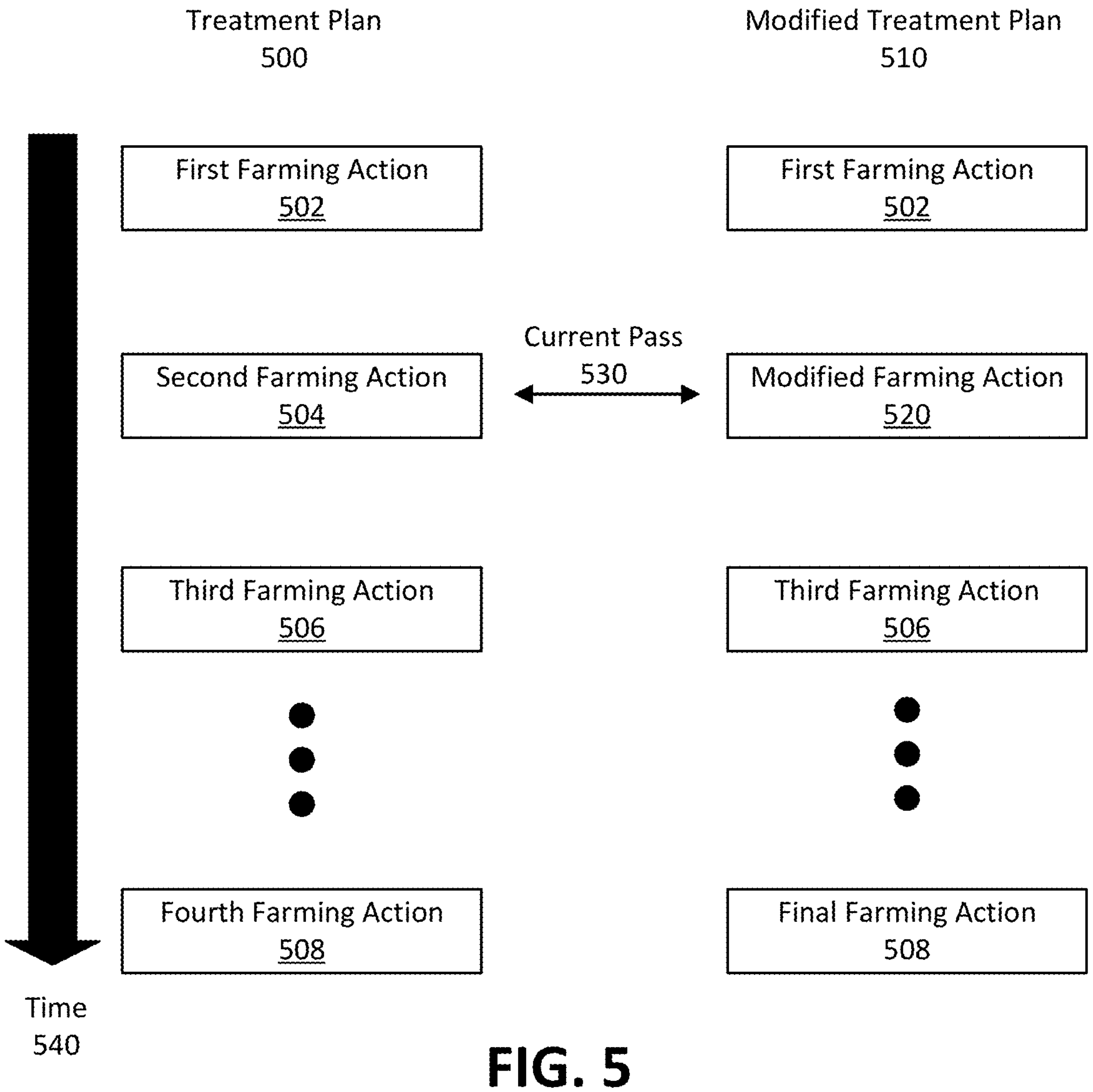
FIG. 5 shows a representation of dynamically modifying a treatment plan to generate a modified treatment plan, according to one example embodiment.

The plan modification module 410 can modify farming actions of a treatment plan on a current pass of the farming machine through a field. To illustrate, consider the modification of a treatment plan illustrated in FIG. 5. FIG. 5 shows a representation of dynamically modifying a treatment plan to generate a modified treatment plan, according to one example embodiment. Within the context of FIG. 5, a farming machine implements a treatment plan 500 in a field. The farming machine accesses the treatment plan 500 from the treatment plan datastore (e.g., treatment plan datastore 440). In some cases, rather than accessing a treatment plan, the farming machine may determine a configuration of its components and access a treatment plan corresponding to the determined configuration.

The treatment plan 500 comprises a sequenced set of farming actions for the farming machine to implement in the field to accomplish a farming objective. The example treatment plan includes a first farming action 502, a second farming action 504, a third farming action 506, a final farming action 508. Here, the sequenced set of farming actions represent the historical best practice for implementing a particular farming objective.

The farming machine implements the first farming action 502 at a first time for all field portions in the field. At a second time after the first time, the farming machine implements the second farming action 504 in the field. The control system (e.g., control system 210) is continually receiving information regarding the operating environment of the farming machine from external systems (e.g., external systems 220) and the machine component array (e.g., machine component array 230) as the farming machine 100 implements the second farming action second 504. For instance, the farming machine may continually record images of the field as the farming machine implements the second farming action 504.

While the farming machine is implementing the second farming action 504, the plan modification module 410 may determine that measurements from the external systems and/or the machine component array indicate that the farming machine should generate a modified treatment plan 510 for at least some portion of the field. That is, the plan modification module 410 determines that modifying the second farming action 502 to a modified farming action 520 will accomplish (or better accomplish) the farming objective of the treatment plan 500. For instance, the farming machine may apply a weed detection algorithm to the captured images and determine that the weed pressure in some field portions is higher than other field portions. In response, the plan modification module 410 generates a modified farming action 520 that more aggressively treats weeds in the affected field portions, and the farming machine 100 implements the modified farming action in the affected field portions.

Figure 6A:
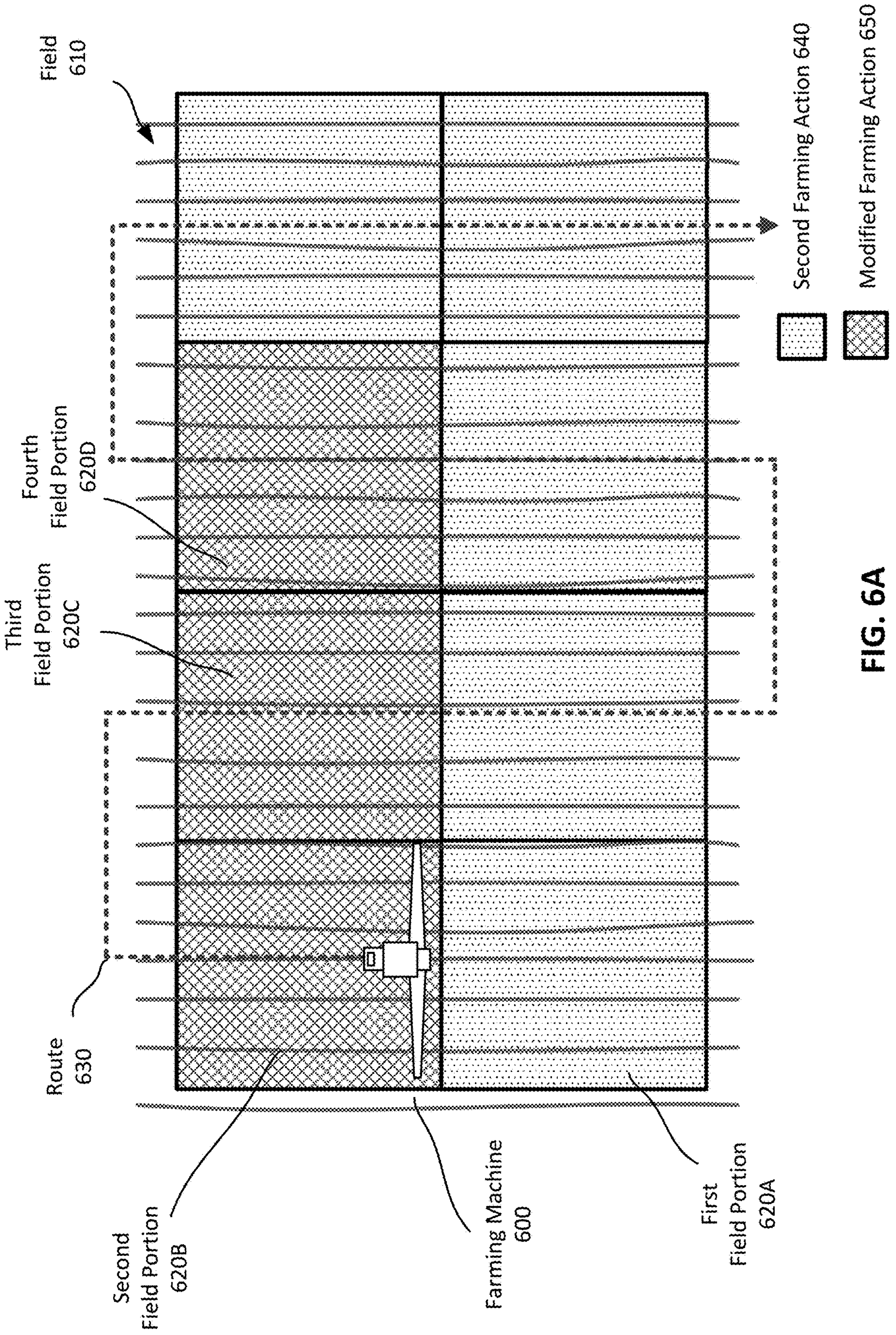
FIGS. 6A-6C show a farming machine implementing modified farming actions in a field, according to several example embodiments.
Figure 6B:
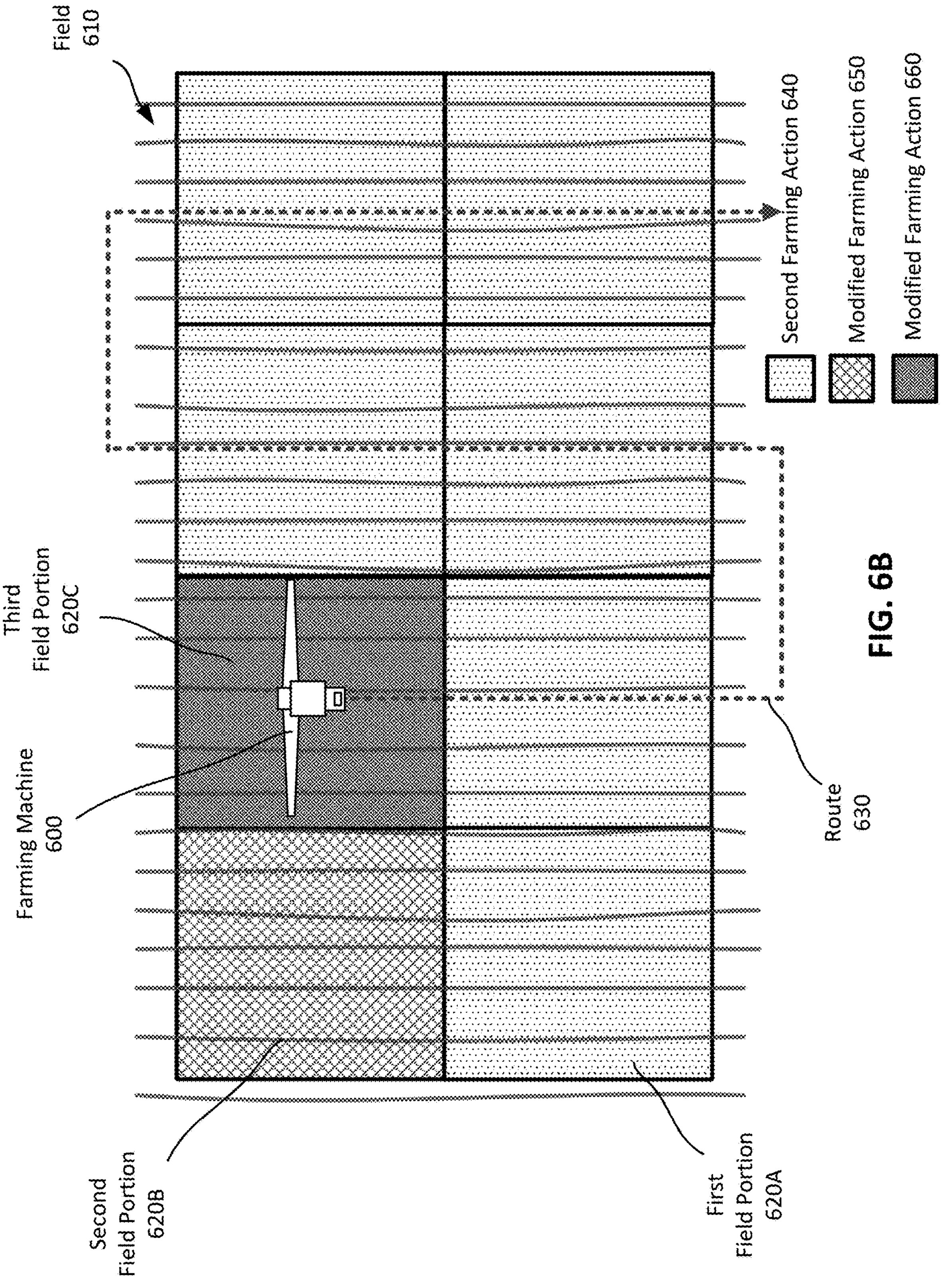
Figure 6C:
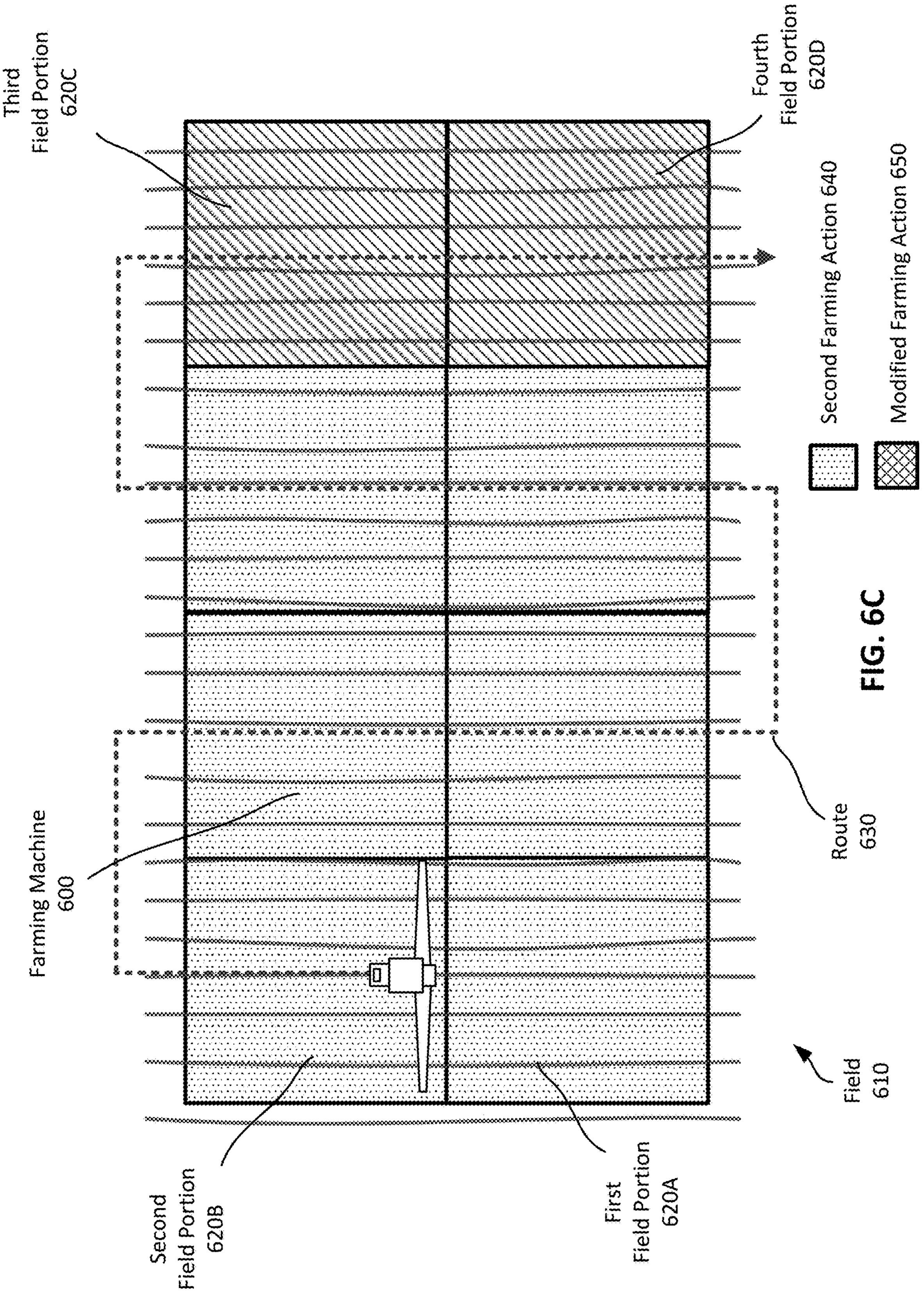

To illustrate, FIGS. 6A-6C show a farming machine implementing modified farming actions in a field, according to several example embodiments.

In FIG. 6A a farming machine 600 is performing farming actions in a field 610, which is indicated by a large rectangle. The field 610 includes a number of field portions 620, each of which are indicated by a small square inside the larger rectangle representing the field 610. Here, the number, size, and shape of field portions 620 are arbitrary, and the field portions 620 could be different than those pictured.

As illustrated, the farming machine 600 is implementing a second farming action 640 from a treatment plan that may be affected by weed pressure in the field 610. Alternatively stated, the farming objective of the implemented treatment plan may be negatively affected by certain weed pressures in the field 610. Accordingly, the farming machine 600 includes a control system (e.g., control system 210) that executes a weed detection algorithm configured to determine weed pressure in a given field portion 620 as the farming machine 600 travels along the route 630.

The control system continually records and processes information about the operating environment of the farming machine 600 to determine weed pressure. The weed detection algorithm determines weed pressure for each field portion 620 based on the recorded information and passes that information to the plan modification module 410. The plan modification module 410 may determine that the recorded information (e.g., weed pressure) indicates that modifying the second farming action 640 to a modified farming action 650 would more appropriately further the farming objective of the treatment plan in certain field portions 620 (e.g., increasing expected yield of the plants in that field portion).

To expand, the farming machine 600 pictured in FIG. 6A has already performed the second farming action 640 in the first field portion 620A. However, as the farming machine 600 approaches the second field portion 620B, the weed detection algorithm records an image and determines the weed density in the second field portion 620B, the third field portion 620C, and the fourth field portion 620D is much higher than in the first field portion 620A. Based on the increased weed density in those field portions, the plan modification module 410 generates a modified farming action 650 to implement in the second field portion 620B that accounts for the increased weed pressure. The plan modification module 410 similarly modifies the second farming action 640 to the modified farming action 650 in the third field portion 620C and fourth field portion 620D.

The farming machine 600 implements the modified farming action 650 in the second field portion 620A, the third field portion 620B, and the fourth field portion 620C as it travels through those field portions. In other words, the plan modification module 410 dynamically determines and generates a modified treatment plan including modified farming actions for each field portion 620 of the field 610, as necessary, such that the farming objective is accomplished in each portion of the field 610.

FIG. 6B illustrates a similar example to that shown in FIG. 6A. Again, a farming machine 600 is traveling along a route 630 in the field 610 performing a second farming action 640 from a treatment plan that accomplishes a farming objective. In this example, however, the second farming action 640 is affected by a moisture level of the substrate to which it is applied. In other words, the farming objective of the implemented treatment plan may be affected by certain moisture levels in the substrate of the field. Accordingly, the farming machine 600 includes one or more sensors and/or machine vision algorithms that determines a moisture level in a field portion 620 as the farming machine 600 travels along the route 630.

In this example, the farming machine 600 implemented the second farming action 640 in the first field portion 620A. However, as the farming machine 620B trave led through the second field portion 620B, the control system determined that the moisture level in the second field portion 620B would affect the farming objective of the treatment plan. In response, the plan modification module 410 generated a modified farming action 650 to compensate for the moisture level in the second field portion 620B and the farming machine 600 implemented the modified farming action 650 in the second field portion 620B.

Notably, as illustrated, as the farming machine 600 travels through the third field portion 620C along the route 630, the control system 210 determines that the moisture level in the third field portion 620C would again affect the farming objective of the treatment plan. Additionally, the moisture level in the third field portion 620C is different than that seen in the first field portion 620A or the second field portion 620B. As such, the farming machine 600 generates a modified farming action 660 to compensate for the determined moisture level in the third field portion 620C and the farming machine 600 implements the modified farming action 660 in the third field portion 620C. Because the moisture levels are different, the modified farming action 650 implemented in the second field portion 620B is different from the modified farming action 660 implemented in the third field portion 620C. This illustrates that the farming machine 600 can implement a different modified treatment plan for each field portion 620 as the farming machine 600 travels through the field 610.

FIG. 6C illustrates a similar example to that shown in FIG. 6A. Here, a farming machine 600 is traveling along a route 630 in the field 610 performing a second farming action 640 from a treatment plan that accomplishes a farming objective. In this example, however, the second farming action 640 is affected by previously implemented farming actions in the field 610 (e.g., a previous nitrogen treatment). In other words, the farming objective of the implemented treatment plan may be affected by previously implemented farming actions in the field 610. Accordingly, the farming machine 600 may access previous farming actions implemented in the field 610 and/or each field portion 620 as the farming machine 600 travels along the route 630 to determine whether they affect the farming objective.

In this example, the farming machine 600 implemented the second farming action 640 in both the first field portion 620A and the second field portion 620B. However, when accessing previous farming actions implemented in the field 610, the plan modification module 410 determines that the farming action previously implemented in the third field portion 620C and the fourth field portion 620D would affect the farming objective of the treatment plan. In response, the plan modification module 410 generates a modified farming action 650 to implement in the third field portion 620C and the fourth field portion 620D to compensate for the previously implemented farming actions in those field portions 620. As illustrated, the farming machine 600 will implement the modified farming actions 650 in the appropriate field portions 620 as the farming machine 600 travels along its route 630. This illustrates that the farming machine 600 can determine and implement different modified treatment plans for each field portion without presently measuring data in the field but relying on previously measured data. Similar modifications may be made for predicted measurements in the field.

Modifying Farming Actions on a Scheduled Pass

Figure 7:
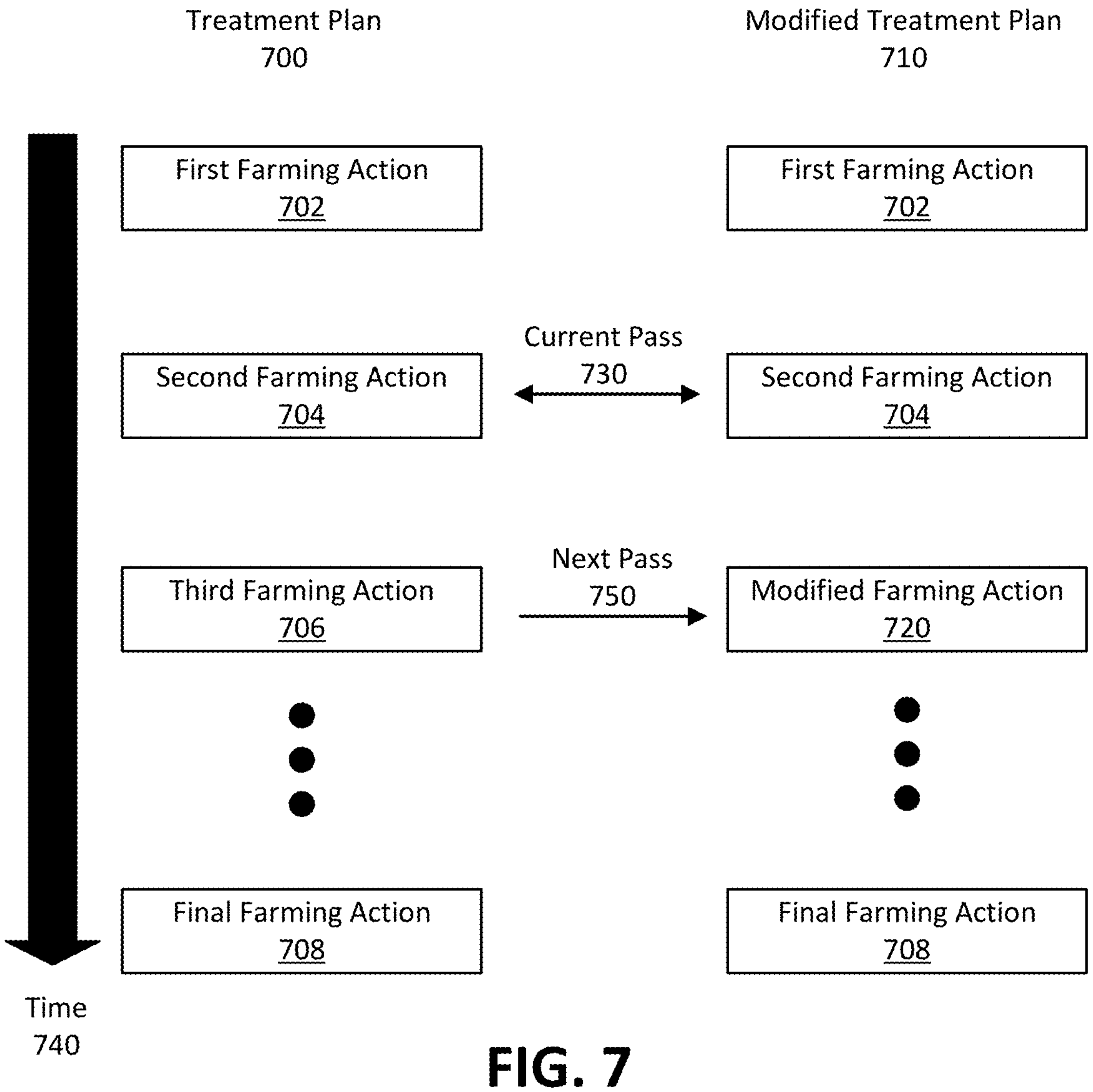
FIG. 7 shows a representation of dynamically modifying a treatment plan to generate a modified treatment plan, according to one example embodiment.

The plan modification module 410 can modify farming actions of a treatment plan on a scheduled (i.e., future) pass of the farming machine through a field. To illustrate, consider the modification of a treatment plan as illustrated in FIG. 7. FIG. 7 shows a representation of dynamically modifying a treatment plan to generate a modified treatment plan, according to one example embodiment. Within the context of FIG. 7, a farming machine implements a treatment plan 700 in a field. The farming machine accesses the treatment plan 700 from the treatment plan datastore. The treatment plan 700 comprises a sequenced set of farming actions for the farming machine to implement in the field over time 740 (e.g., a first farming action 702, a second farming action 704, a third farming action 706, a final farming action 708, etc.). The sequenced set of farming actions represent the historical best practice for implementing a particular farming objective. The control system continually receives and/or accesses information regarding the operating environment of the farming machine from external systems and/or the machine component array as the farming machine implements the farming actions in the field.

The farming machine implements the first farming action 702 at a first time and a second farming action 704 at a second time after the first time for all field portions in the field 160. On the current pass 730, the farming machine 100 receives information from external systems and/or the machine component array which indicates that the farming machine should modify the treatment plan 700. In response, the plan modification module 410 generates a modified treatment plan 710 based on the received and/or accessed information. The modified treatment plan 710 includes modifying the third farming action 706 scheduled for implementation on the next pass 750 to a modified farming action 720. On the next pass 750 (e.g., at a third time after the second time), the farming machine performs the modified farming action 720 rather than the original third farming action 706.

Delaying or Accelerating a Farming Action

Figure 8A:
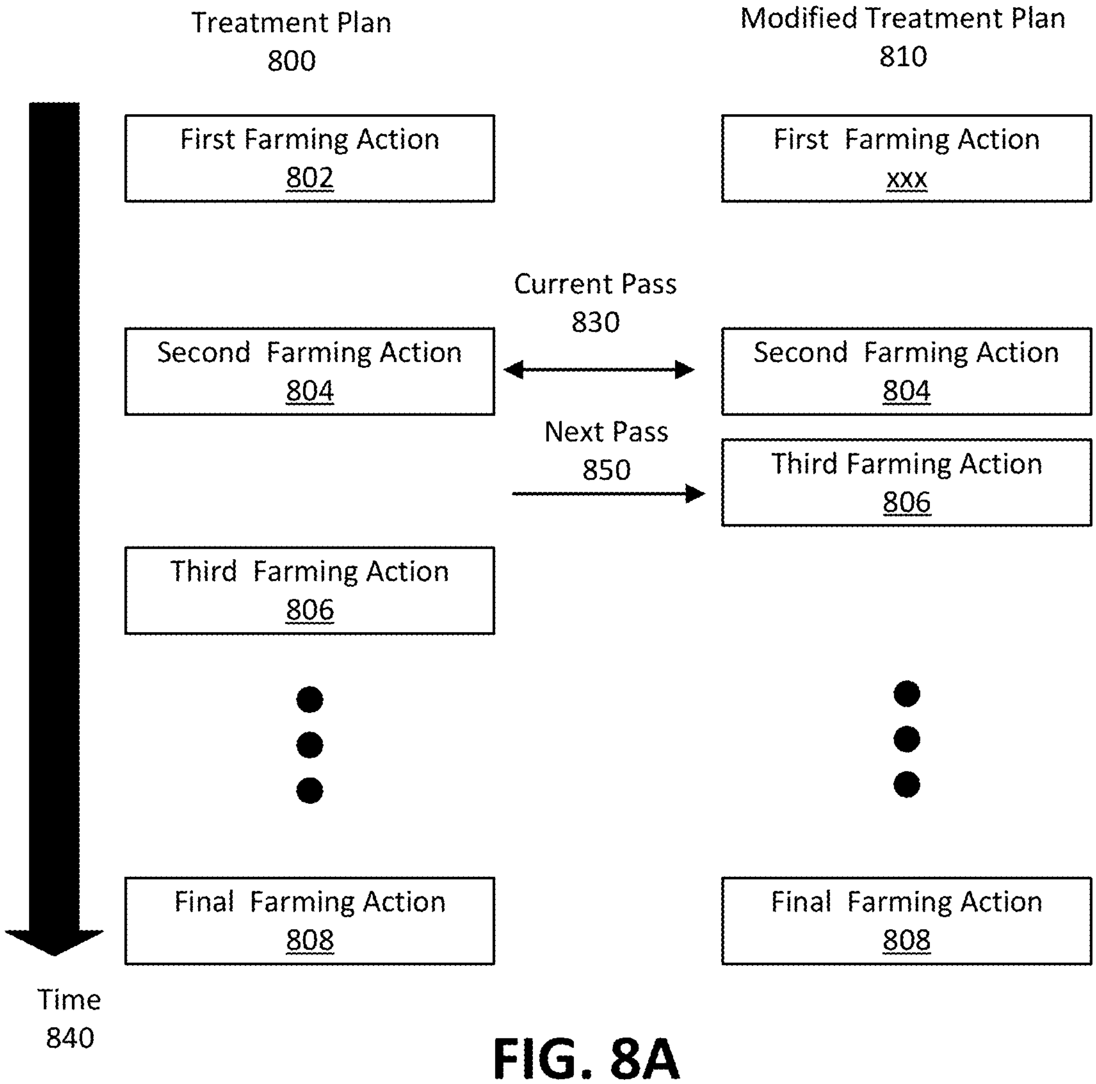
FIGS. 8A-8B show generating a modified treatment plan including a temporally shifted farming action, according to one example embodiment.
Figure 8B:
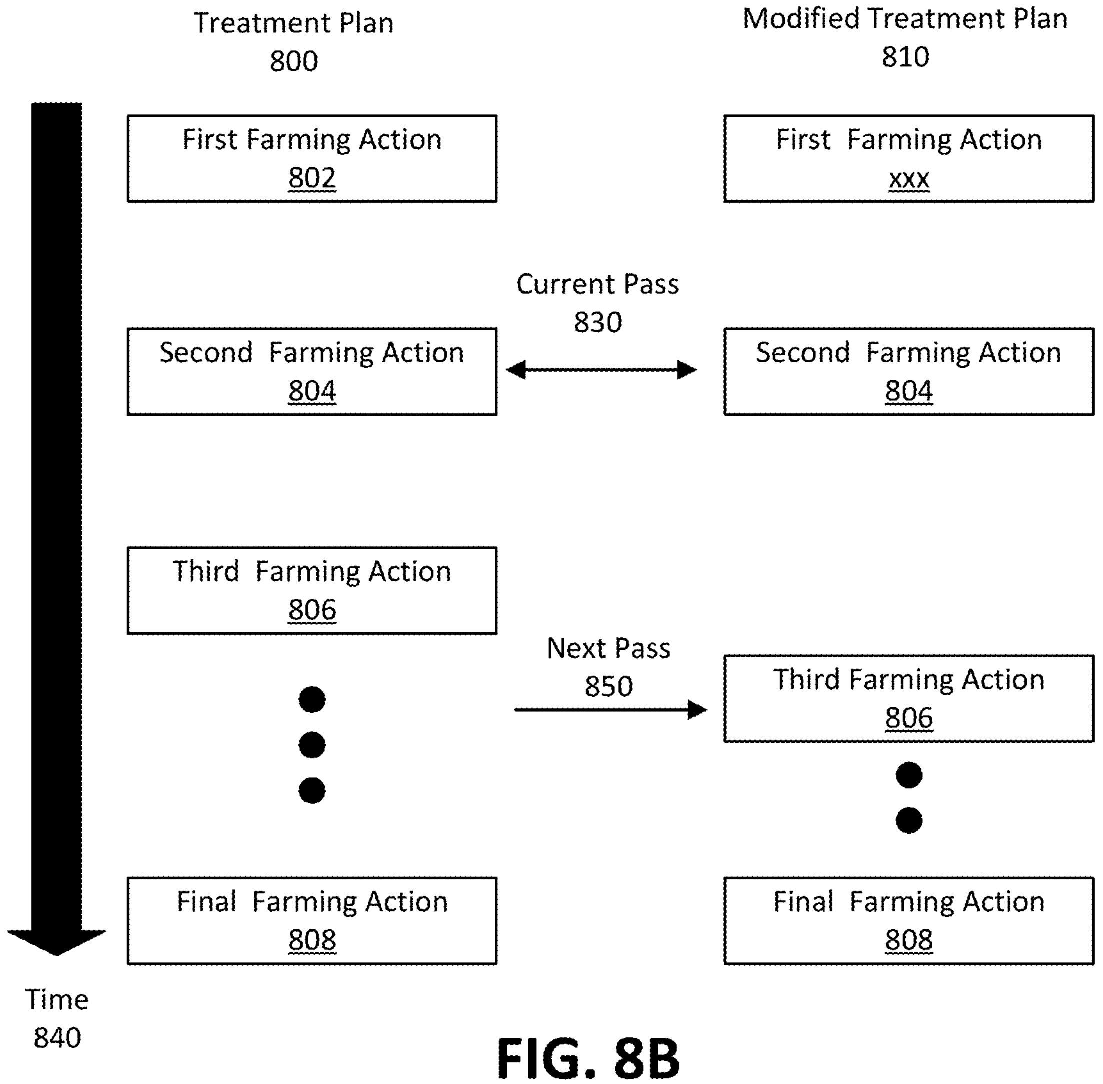

The plan modification module 410 can modify farming actions of a treatment plan by delaying or accelerating a farming action. To illustrate, consider the modification of a treatment plan illustrated in FIGS. 8A and 8B. FIGS. 8A-8B show generating a modified treatment plan including a temporally shifted farming action, according to one example embodiment. Within the context of FIGS. 8A and 8B, a farming machine 100 implements a treatment plan 800 in a field. The farming machine accesses the treatment plan 800 from the treatment plan datastore. The treatment plan 800 comprises a sequenced set of farming actions for the farming machine to implement in the field over time 840 (e.g., a first farming action 802, a second farming action 804, a third farming action 806, a final farming action 808, etc.). The sequenced set of farming actions represent the historical best practice for implementing a particular farming objective. The control system 210 continually receives and/or access information regarding the operating environment of the farming machine from external systems and the machine component array as the farming machine implements the farming actions in the field.

The farming machine implements the first farming action 802 at a first time and a second farming action 804 at a second time after the first time for all field portions in the field 160. The farming machine is scheduled to implement the third farming action at a third time after the second time. On the current pass 830, the farming machine 100 receives information from external systems and/or the machine component array which indicates that the farming machine should modify the treatment plan 800. In response, the plan modification module 410 generates a modified treatment plan 810 based on the received and/or accessed information.

The modified treatment plan 810 includes changing the implementation of the third farming action 806 at the third time by shifting the third time forward or backward in time 840. That is, the plan modification module 410 accelerates or delays implementation of the third farming action 806 in the modified treatment plan 810. The timing of the next pass 850 is appropriately adjusted and the farming machine 100 performs the third farming action 806 at the accelerated/delayed time rather than at the original time. Notably, changing the timing of the third farming action 806 is, in effect, creating a modified farming action for the modified treatment plan 810. FIG. 8A illustrates an example of the plan modification module 410 generating a modified treatment plan 810 by accelerating the third farming action 806, and FIG. 8B illustrates an example of the plan modification module 410 generating a modified treatment plan 810 by delaying the third farming action 806.

Adding or Removing a Farming Action

Figure 9A:
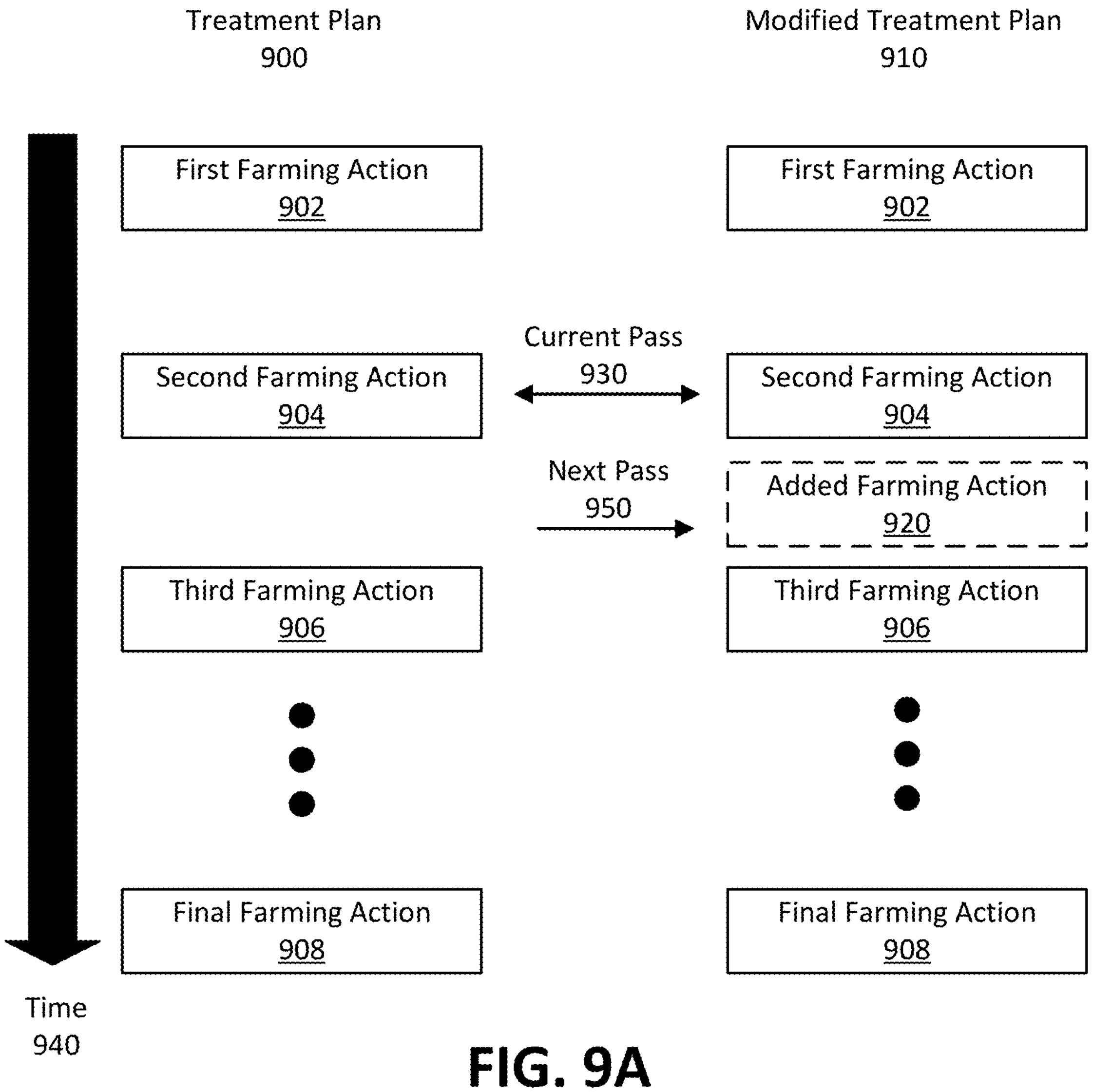
FIGS. 9A-9B show generating a modified treatment plan by adding or removing a farming action, according to one example embodiment.
Figure 9B:
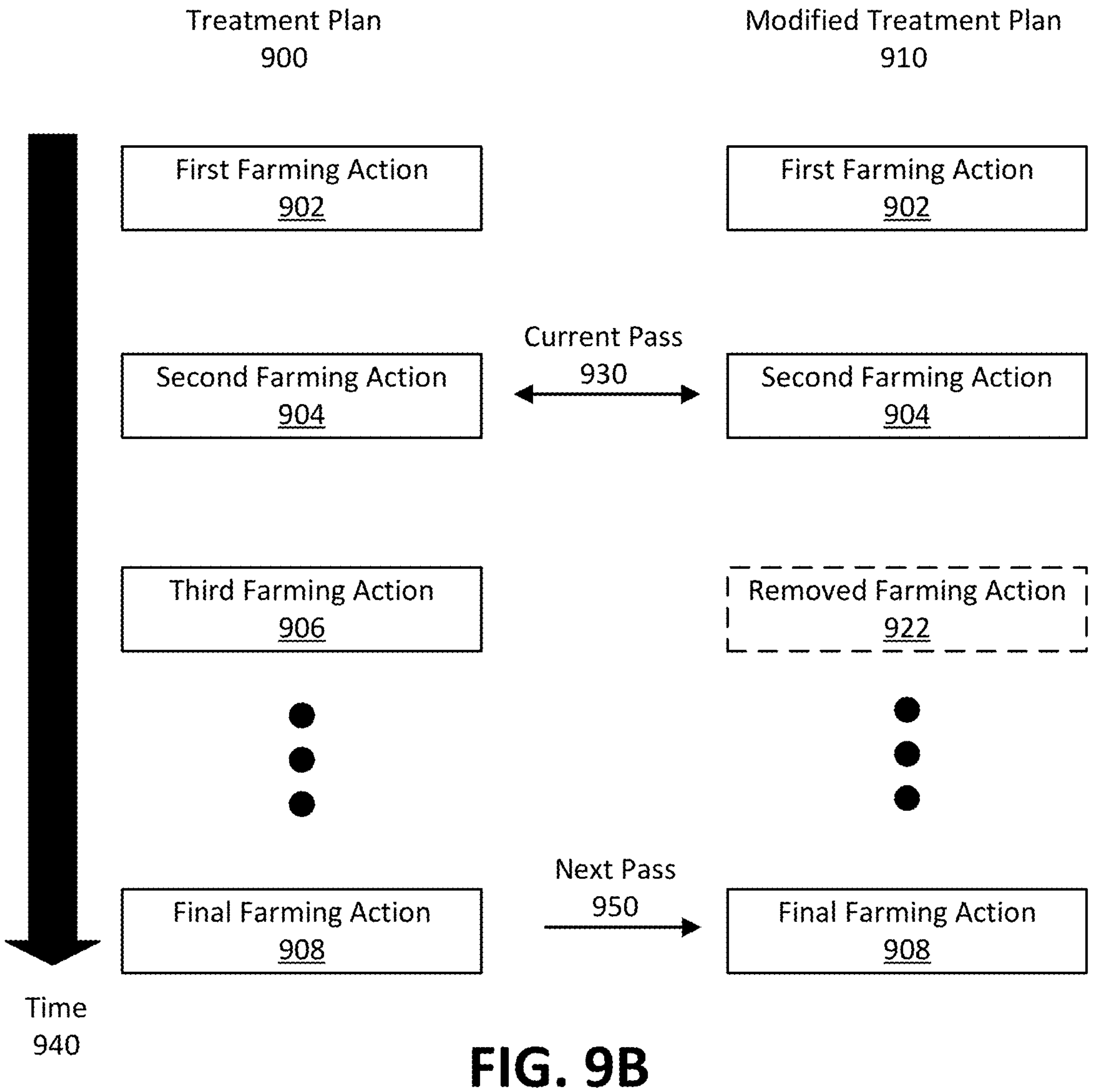

The plan modification module 410 can modify farming actions of a treatment plan by adding or removing a farming action. To illustrate, consider the modification of a treatment plan illustrated in FIGS. 9A and 9B. FIGS. 9A-9B show generating a modified treatment plan by adding or removing a farming action, according to one example embodiment. Within the context of FIGS. 9A and 9B, a farming machine implements a treatment plan 900 in a field. The farming machine accesses the treatment plan 900 from the treatment plan datastore 440. The treatment plan 900 comprises a sequenced set of farming actions for the farming machine to implement in the field over time 940 (e.g., a first farming action 902, a second farming action 904, a third farming action 906, a final farming action 908, etc.). The sequenced set of farming actions represent the historical best practice for implementing a particular farming objective. The control system 210 continually receives and/or access information regarding the operating environment of the farming machine from external systems and the machine component array as the farming machine implements the farming actions in the field.

The farming machine implements the first farming action 902 at a first time and a second farming action 904 at a second time after the first time. The farming machine may implement the farming actions for all or some portions of the field. On the current pass 930, the farming machine 100 receives information from external systems and/or the machine component array which indicates that the farming machine should modify the treatment plan 900. In response, the plan modification module 410 generates a modified treatment plan 910 based on the received and/or accessed information.

The modified treatment plan 910 includes adding and/or removing a farming action. FIG. 9A illustrates generating a modified treatment plan 910 including an added farming action 920. The added farming action 920 is between the second farming action 904 and the third farming action 906. In this manner, the farming machine 100 performs the added farming action 920 on the next pass 950 at a third time after the second time and performs the third farming action 906 at a fourth time after the third time. FIG. 9B illustrates generating a modified treatment plan 910 including a removed farming action 922. In this case, the removed farming action 922 is the third framing action 906. Because the third farming action becomes a removed farming action 922, the farming machine implements the final farming action on the next pass at a third time after the second time.

Additional Example Modifications

As described above, the plan modification module 410 generates modified treatment plans included modified treatment actions based on measurements and/or accessed information of the operating environment. Generating a modified treatment action for a modified treatment plan may include modifying different characteristics of a treatment. For example, changing parameters of the treatment action (e.g., spray speed), the treatment mechanism(s) (e.g., selecting a nozzle, etc.), changing chemistry, etc.

In an additional example, modifying a treatment plan may include generating modified treatment actions to kill (or thin) the crop plant. That is, rather than removing all future treatments of an identified plant, determining that the desired outcome for the field is benefited by selective removal of certain plant (e.g., if it is diseased). In an additional example, modifying a treatment plan may include selectively harvesting mature plants while allowing immature plants to remain in the field for later harvest.

Evolution of a Treatment Plan

The plan modification module 410 can also continuously modify a treatment plan ("evolve a treatment plan") based on information accessed from external systems and/or received from the machine component array 230. To illustrate, FIG. 10 shows an evolution of a treatment plan, according to one example embodiment.

Figure 10:
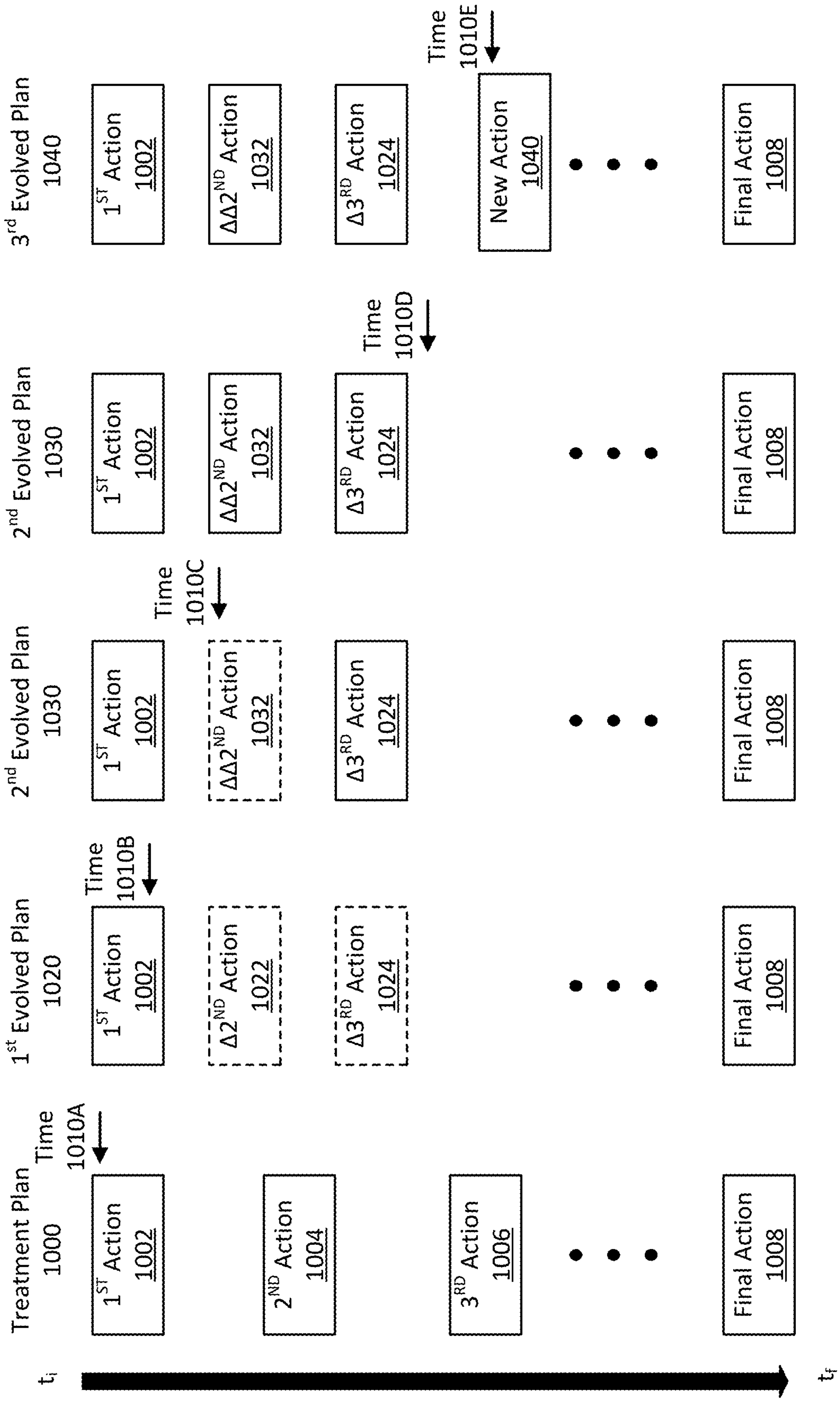
FIG. 10 shows an evolution of a treatment plan, according to one example embodiment.

FIG. 10 includes a series of columns, with each column including a vertical array of boxes. Each column represents an evolution of a treatment plan 1000 and each box in the column represents a farming action in the evolution of the treatment plan 1000. The evolution of the treatment plan is represented spatially from left to right across the image. That is, the treatment plan represented by the first column is the original treatment plan, the column immediately to the first column's right is the 1$^{st}$ evolution of that treatment plan, the column immediately to the second column's right is the $2^{nd}$ evolution of the treatment plan, etc.

FIG. 10 includes a large arrow on the left side representing the flow of time from an initial time ($t_i$) to a final time ($t_f$). That is, the flow of time is from the top of the figure to the bottom of the figure such that the farming actions nearer the top of the page occur before those below it in space. Additionally, each column represents a snapshot in the flow of time such that the temporal location of that snapshot in time relative to the flow of time is indicated by a small arrow. In other words, the treatment plan evolves from left to right as the small arrow tracks downwards relative to the large arrow. So, the first column is a snapshot in the evolution of the treatment plan at a first time (represented by the small arrow), and the second column is a snapshot in the evolution of the treatment plan at a second time (represented by a change in position of the second small arrow).

Turning now to the evolution of the treatment plan 1000 in the context of FIG. 10, a farming machine implements the treatment plan 1000 in a field. The farming machine accesses the treatment plan from the treatment plan datastore. The treatment plan 1000 comprises a sequenced set of farming actions for the farming machine to implement in the field (e.g., a first farming action 1002, a second farming action 1004, a third farming action 1006, a final farming action 1008, etc.). Each farming action in the treatment plan 1000 occur at a different time 1010. The sequenced set of farming actions represent the historical best practice for implementing a particular farming objective. The control system 210 continually receives and/or accesses information regarding the operating environment of the farming machine from external systems and the machine component array as the farming machine implements the farming actions in the field.

The plan modification module 410 is configured to evolve the treatment plan 1000 based on the received/accessed information in order to implement the farming objective of the treatment plan.

To illustrate, at a first time 1010A the farming machine begins to implement the first farming action 1002 in the field. At a second time 1010B the control system 210 receives and/or accesses information indicating that the farming machine should modify the treatment plan to achieve the farming objective of the treatment plan 1000. As such, the plan modification module 410 evolves the treatment plan by generating a first evolved treatment plan 1020. The first evolved treatment plan 1020 includes a modified second farming action (e.g., $\Delta 2^{nd}$ action 1022) and a modified third farming action (e.g., $\Delta 3^{rd}$ action 1024). The modified second farming action 1022 and the modified third farming action 1024 are accelerated relative to the original second farming 1004 action and third farming action 1006. The modified farming actions are indicated by dashed lines in the second column.

The farming machine starts to implement the modified second farming action in the field. At a third time 1010C after the second time 1010B and while the farming machine is implementing the modified second farming action, the farming machine receives and/or accesses information indicating that the farming machine should modify the evolved treatment plan 1000 to achieve the farming objective. As such, the plan modification module 410 further evolves the treatment plan by generating a second evolved treatment plan 1030. The second evolved treatment plan modifies the modified farming second action 1022 (e.g., $\Delta\Delta 2^{nd}$ action 1032). That is, plan modification module 410 modifies the modified second farming action 1022 to a subsequently modified second farming again 1032. The subsequently modified second farming action 1032 modifies the treatment of the modified second farming action 1022 for at least some portion of the field. The modified third farming action 1024 is not changed in the second evolved treatment plan.

The farming machine implements the modified third farming action 1024 in the field. The farming machine does not receive or access information that indicates the plan modification module 410 should modify the treatment plan 1000. As such the farming machine continues with the second evolved treatment plan 1030.

At a fourth time 1010D after implementing the modified third farming action 1024 and before performing the final farming action 1008 in the field, the farming machine receives and/or accesses information indicating the plan modification module 410 should modify the treatment plan 1000. In response, the plan modification module 410 generates a third evolved treatment plan 1040. The third modified treatment plan 1040 includes a fourth farming action that was not originally included in the treatment plan 1000. For example, the third evolved treatment plan 1040 includes a fourth farming action 1040 that implements an additional farming action before the final farming action 1008.

At a fifth time 1010E after the fourth time, the farming machine implements the fourth farming action 1040 in the third modified treatment plan.

The farming machine continues to evolve and implement a treatment plan to accomplish the farming objective until the final farming objective is performed.

The evolution of treatment plan 1000 demonstrated in FIG. 10 is just an example. Depending on the configuration of the farming machine, measurements of the environmental conditions, historical data of the environmental conditions, etc. the plan modification module 410 can generate any number of modified treatment plans to dynamically evolve a treatment plan over time.

Dynamically Modifying Farming Objectives

Notably, while the context of this specification describes the ability of the farming machine to dynamically modify treatment plans to best accomplish a farming objective, the dynamic planning module 400 can employ many of the same techniques to dynamically modify a farming objective. For example, a farming objective may be to "harvest plants with the greatest yield," but may also be configured to dynamically modify the farming objective to "harvest plants for the greatest profit to the manager." The various descriptions herein should be considered to enable this functionality. For instance, the prediction models could be trained to predict which farming objectives are most lucrative for the manager, which objectives are least risky, etc., and the dynamic planning module can be configured to change the farming objective and modify the treatment plans accordingly.

VI. Experimental Treatment Plans

Returning now to FIG. 4, the dynamic planning module 400 includes an experimental sequence module 430. The experimental sequence module 430 generates one or more experimental treatment plans to implement in the field. Experimental treatment plans include one or more experimental farming actions (or "experimental treatments").

An experimental treatment plan is an intentionally modified treatment plan that may, or may not, accomplish the farming objective. In other words, an experimental treatment plan is one configured to create a variance in results between the experimental treatment plan and the historic treatment plan.

To provide context, recall that many of the treatment plans implemented by a farming machine represent a historical best practice for implementing a particular farming objective. For instance, there is a "best-practice" sequence of farming actions to perform in Texas when growing a wheat crop. Generally, best-practice treatment plans evolve over decades based on the experience of managers. That is, when a particular farming objective is accomplished by a newly implemented or modified treatment plan, that newly implemented treatment plan is likely to be implemented in a similar manner year over year.

However, relying on manager experience to generate treatment plans has many drawbacks resulting in static treatment plans. First, a manager is less likely to experiment with a treatment plan to improve a result of a farming objective. This occurs because if a manager knows that a historical treatment plan is likely to accomplish a farming objective (to some degree), they are less likely to risk failing the farming objective by experimenting with the historical treatment plan. Second, when implementing a treatment plan, traditional farming techniques implement a single treatment plan for an entire field (or large portions of the field). Managers typically implement the same treatment plan because it is not time or cost effective to apply different treatment plans to small portions of the field. Third, the human mind is not well suited to recognizing subtle differences and patterns. For instance, it is a challenge for a human mind to recognize whether one or more small changes to a treatment plan affect the result of the treatment plan. Thus, managers are ill suited at making a series of incremental improvements to farming actions in a treatment plan to improve a result of a farming objective.

A farming machine including a dynamic planning module 400 overcomes many drawbacks attributable to manager generated treatment plans. The farming machine can, for example, access and measure more information from a wider array of sources than a manager, implement treatment plans with a higher level of granularity than managers and/or traditional farming machines, and more readily recognize patterns in treatment plan results that may affect implementation of future treatment plans. Because of these advantages, the dynamic planning module 400 can employ the experimental sequence module 430 to generate an experimental treatment plans that may, over time, become a treatment plan considered to be best practice.

In other words, the farming machine generally allows more experiments because the experimental process is automated which, in turn, drives more experiments and more experiences drives more learning by the models. Additionally, because experimental treatment plans are applied to, typically, smaller field portions, (1) the risk of bad outcomes stemming from plan modification and imparted to the manager are reduced and (2) there is an inherent improvement to result measurements (sensitivity & accuracy) reflecting the impact of modifications on the farming objective, both of which improves the utility of experiments and also allows for smaller plan modifications.

Example Experimental Treatment Plan

To illustrate, consider a farming machine implementing a treatment plan accessed from a treatment plan datastore. The accessed treatment plan is the historical best practice for implementing a specific farming objective in a field. In this case, the historical best practice treatment plan was developed greater than 40 years ago for a field with significantly different environmental conditions than the field the farming machine is operating in. As such, while the farming machine can achieve the farming objective of the treatment plan, it does not do so with the highest (or even expected) level of proficiency.

Notably, however, this farming machine is configured with an experimental sequence module 430. The experimental sequence module 430 generates an experimental treatment plan that includes farming actions that are varied from the farming actions of the historical treatment plan. For instance, the experimental treatment plan may accelerate a farming action, delay a farming action, modify a farming action, etc. Whatever the case, the variation in the experimental treatment plan is expected to change the degree at which the farming machine achieves the farming objective relative to the accessed historical treatment plan. That is, the experimental treatment plan is designed to induce a variance in results relative to the historical treatment plan. Depending on the experimental treatment plan, the farming machine may improve, or worsen, the degree to which the farming machine accomplishes the farming objective of the farming plan. For example, the experimental treatment plan may increase or decrease yield relative to the expected yield of the historical treatment plan.

When the experimental treatment plan improves the degree to which the farming machine accomplished the farming objective (e.g., increases yield), the farming machine may modify the historical treatment plan to include the modified farming action that, when implemented, improved the result of the farming objective. On the contrary, when the experimental treatment plan does not improve the result of the farming objective, the farming machine may maintain the farming actions in the historic treatment plan (rather than updating it with the modified treatment plan).

Measuring Results

An important aspect of implementing an experimental treatment plan is that the farming machine is configured to measure results of the treatment plan in view of the desired farming objective with a high degree of fidelity. As a simple example, consider an experimental treatment plan applied to 5% of the field portions in a field. In this case, the farming machine is configured to measure the results the experimental treatment plan for the 5% of field portions and measure the results of the historical treatment plan for the 95% of the field portions. Additionally, the results may be measured across different variables (e.g., time, space, etc.) depending on the configuration, and those results may be compared to one another. Some result measurements across different variables are discussed below and are not intended to be limiting.

The farming machine can measure the result of an experimental treatment plan spatially. That, the farming machine is configured for measuring results in specific portions of the field, and those results may be measured relative to other portions of the field. For example, the farming machine may determine that the result of the farming objective is "accomplished" or "not accomplished" for all the field portions, or some subset of field portions, where the experimental treatment plan was applied. In another example, the farming machine may determine that the result of the farming machine is "20 more plants harvested" in field portions where the experimental treatment plan was applied relative to where the historic treatment plan was applied.

The farming machine can measure the result of an experimental treatment plan per plant. For example, the farming machine may determine that the result of the farming objective is "harvested" or "unharvested" for each plant in the field. In another example, the farming machine may determine that the result of the farming objective is the amount of nitrogen applied to each plant in the field.

The farming machine can measure the result of an experimental treatment plan temporally. For example, the farming machine may determine that the result of the farming objective is “sprayed” on a current pass and “unsprayed” on a previous pass. In another example, the farming machine may determine that the result of the farming objective is “5000 ears harvested” on a first pass and “6000 ears harvested” on a second pass.

The farming machine can apply one or more functions or statistical analysis when measuring the result of an experimental treatment plan. For example, the farming machine may apply a function that calculates a feature from various measurements of the farming machine. For instance, the farming machine may apply a function that calculates, e.g., yield from farming machine measurements. As another example, the farming machine may apply a statistical analysis to various measurements to determine a result. For instance, the farming machine may determine a result by calculating a statistical significance to changes in results or measurements. Other functions are also possible.

The farming machine can measure the result of an experimental treatment plan at various levels of granularity. For example, the farming machine can calculate a result for each farming action in an experimental treatment plan, and/or the farming machine can calculate a result for the entirety of the treatment plan. Similarly, the farming machine can calculate a result for each field portion individually, groups of field portions, and/or all field portions to which the experimental treatment plan was applied. Moreover, the farming machine can calculate a result for each plant individually, groups of plants, and/or all plants to which the experimental treatment was applied. Additionally, the farming machine can calculate a result over various time periods. For instance, multiple times per pass, per pass, over several passes, etc.

The result types discussed herein are not exclusive. For example, the farming machine can measure a result per plant once per pass, or per region once per multiple passes, or continuously apply a statistical analysis to an entire field. Whatever the case, the farming machine measures results to determine how well an experimental treatment plan performs relative to a historic treatment plan.

Additionally, each of the measured results described herein can be used to determine a variance induced by the experimental treatment plan. The variance is some change to the plant, plant growth, farming objective, operating environment, farming machine, etc. caused by performing the experimental treatment plan. So, in effect, the variance is a measured difference in results between the experimental treatment plan and the (original) treatment plan.

Determining Significance of a Result

Determining whether an experimental treatment plan improves, or doesn’t improve, a historic treatment plan is a complex problem. For example, it is challenging to determine whether external factors (e.g., variations in weather, pests, seeds, etc.) affect a result of an experimental treatment plan, or whether a modified farming action in an experimental treatment plan affected the result of the experimental treatment plan.

As such, the experimental sequence module 430 is configured to determine whether one or more results of a treatment plan are significant. A significant result is a result determined to materially affect a farming objective. A significant result in an experimental treatment plan can positively affect (e.g., improve), negatively affect (e.g., worsen), or not affect a historic treatment plan. Significant results may be associated with any of the one or more modified farming actions in an experimental treatment plan. In this manner, the farming machine may only modify a historic treatment plant to reflect an experimental treatment plan based on significant results. There are many ways to determine whether a result of an experimental treatment plan is significant, some of which are described below.

As an example, the experimental sequence module 430 may determine that a result of an experimental treatment plan is significant when a threshold number of results of the experimental treatment plan improve the result. For instance, a farming machine may apply an experimental treatment plan to 5% of the field portions in a field for six growing seasons. If the experimental treatment plan materially affects the result of the farming objective for greater than a threshold number of growing seasons (e.g., five), the experimental sequence module 430 may determine the result is significant. Based on whether the experimental treatment plan positively or negatively affects the farming objective, the farming machine may replace, or not replace, the historical treatment plan with the experimental treatment plan. Notably, the threshold number of growing seasons may be lessened or improved based on the capability of the farming machine. That is, for example, the experimental sequence module may be able to determine significance of a result faster than the standard plan modification repetition period (five years).

In another example, the farming machine may apply an experimental treatment plan across different environments (e.g., weather patterns, soil patterns, geographies, etc.). If the experimental treatment plan affects the result of the farming objective for greater than a threshold number of growing seasons for a significant number of environments, the experimental sequence module 430 may determine the result is significant and modify the historical treatment plan with the experimental treatment plan.

Of course, other results and thresholds for those results are also possible. For instance, a significant result may be predicated on yield, number of plants, weed pressure, etc. Moreover, the threshold for significance may also be other factors. For instance, relative increases or decreases, absolute differences, or any other factor between experimental and historic treatment plans that could indicate significance in a result.

An experimental sequence module 430 may also be configured to identify significant results in a more robust manner than the preceding simplistic example. To illustrate, consider a farming machine configured to generate a vast number of experimental treatment plans in a field. The farming machine in question is configured to apply, for example, a different experimental treatment plan every twenty yards along a crop row in the field. Moreover, the experimental treatment plans may vary across more than one variable (e.g., modifying different farming actions). For instance, one set of experimental treatment plans varies an application rate of a treatment fluid, while another set of experimental treatment plans varies a treatment area size, while another set of experimental treatment plans varies both simultaneously. In a situation such as this, determining which modified farming action yields a significant result is likely beyond the scope of a manager. Instead, the experimental sequence module 430 is configured to apply statistical methods and/or machine learning algorithms to the multitude of results to determine which experimental treatment plans generate significant results. In this manner, the experimental sequence module 430 may be able to identify specific experimental treatment plans, and/or experimental farming actions that generate significant results.

In a similar example, the experimental sequence module 430 is configured to control for external factors when determining which results are significant. For instance, the farming machine is configured to capture data from sensors on both external systems and the machine component array. Any of the external measurements may be used as controls in the statistical analysis to determine significant results resulting from experimental treatment plans. For example, both the external systems and machine component array of a farming machine may be configured to measure wind speed while the farming machine performs actions of the experimental treatment plant. This external factor is not controllable by the farming machine but may cause various results to be significant and not significant. Because the external factor is measured by the farming machine, the experimental sequence module 430 is able to control for it in determining whether the results of an experimental treatment plan are significant. For example, spray treatments are less accurate on a windy day and are therefore less effective at regulating plants when applied on windy days. Accordingly, the significance of the results of spray treatments may be affected by the windiness on the day that they were applied, and because the experimental sequence module 430 measures the wind it is able to control for that factor in its significance analysis.

In effect, the farming machine leverages the experimental sequence module 430 to run a vast array of experimental treatment plans in the field to determine which experimental treatment plans produce significant results. Once significant results that positively affect the farming objective are identified, the experimental sequence module 430 can modify a treatment plan to reflect experimental treatment plans generating better outcomes. Similarly, if the farming machine identifies a significant results that negatively affects the farm objective, the experimental sequence module 430 can modify a treatment plan to avoid the negative result.

Controlling Implementation of Experimental Treatment Plans

As described above, implementing an experimental treatment plan may (1) negatively affect a result of a historic treatment plan such that the farming machine does not complete the farming objective, or completes the farming objective to a lesser degree, (2) positively affect the result of a historic treatment plan such that the farming machine completes the farming objective to a greater degree, or (3) not materially affect the result of a historic treatment plan. Because of this variability in outcome, a manager may want to control the implementation of an experimental treatment plan. There are several methods of controlling the implementation of an experimental treatment plan, some of which are described below.

The experimental sequence module 430 may apply experimental treatment plans to one or more field portions rather than the whole field. For instance, the experimental sequence module 430 may generate experimental treatment plans to apply to 5%, 10%, 20%, etc. of the field portions in the field, and the percentage may be selected by a manager. Similarly, the experimental sequence module 430 may generate experimental treatment plans for field portions indicated for experiment by a manager (10% of the total area of the field, a specific portion of the field, etc.), in field portions less likely to accomplish a farming objective (e.g., edge field portions, less fertile field portions, weed prone field portions etc.), for field portions that have previously included, or not included, experimental treatment plans, random field portions, non-random field portions, etc.

The experimental sequence module 430 may apply experimental treatment plans to portions of the field according to various temporal and/or spatial factors. For instance, the experimental sequence module 430 may only apply experimental treatment plans during specific time windows every year, during different time windows every year, during specific times of day, etc. Similarly, the experimental sequence module 430 may only apply experimental treatment plans in certain areas of the field, for certain maximum amount of the field, for a certain minimum amount of the field, etc. Additionally, the experimental sequence module 430 may apply experimental treatment plans to field portions when measurements of the operating environment are within specific ranges (e.g., wind less than a threshold, time after a threshold, temperature within a threshold, etc.)

The experimental sequence module 430 may only apply experimental treatment plans with specific types of modifications. For instance, the experimental sequence module 430 may only apply experimental treatment plans with modified farming actions, deleted farming actions, added farming actions, accelerated farming actions, delayed farming actions, etc. Or the experimental sequence module 430 may only apply experimental treatment plans for specific types of farming actions. For instance, the experimental sequence module 430 may only generate experimental treatment plans including variations in spray treatments, while not varying spray treatment size or application rate.

Finally, the manager may control any number of the factors above when implementing experimental treatment plans. For example, the manager may define a certain field portions, farming actions, and time frames the experimental sequence module 430 is able to generate and apply experimental treatment plans. Additionally, the manager may define a maximum variance for modifying the experimental treatment plan relative to the historic plant treatment plan. As such, the experimental treatment plan may be less than a threshold level of dissimilarity different than the historic treatment plan. Moreover, the manager may be able to specify the tolerable predicted risk of the experimental farming plan on the farming objective. For instance, the manager may be able to specify a limit of 5%, 15%, or 30% degradation of the farming outcome, and the experimental sequence module 430 may generate experimental treatment plans accordingly. Whatever the case, the implementation of experimental treatment plans is controllable by the manager such that they are able to balance successfully completing a farming objective using historic treatment plans against risking adverse effect on farming objectives by investigating experimental treatment plans that may, one day, replace a historic treatment plan.

VII. User Feedback in Modifying Treatment Plans

Returning now to FIG. 4, the dynamic planning module 400 includes a manager feedback module 420. The manager feedback module 420 allows a manager to interact with a dynamic planning module 400 and dictate any of the various implementations described above.

To do so, the manager feedback module 420 is configured to communicate information about a treatment plan (whether historic, modified, experimental, etc.) to a manager and receive feedback from the manager in response. For example, the manager may be operating a control system including the dynamic planning module 400 and the manager feedback module 420 may generate a display allowing the manager to interact with, and make decisions about, the various treatment plans generated or accessed by the dynamic planning module 400.

In some instances, a manager is operating a device in the system environment 200 connected to the control system 210 via the network 240. In this case, the dynamic planning module 400 may transmit treatment plan information to the device via the network 240, the device may display the treatment plan information to the manager, receive an input from the manager regarding the treatment plan information from the manager, and transmit the information to the control system 210 via the network.

In whatever case, the manager feedback module 420 is configured to transmit information about treatment plans to the manager. The information may include farming actions in the treatment plan, changes to the treatment plan, options to select from regarding the treatment plan, sensor measurements, pertinent accessed data, results, significance of results, expected results, or any other information that may be useful to the manager in dynamically modifying a treatment plan.

More contextually, the manager feedback module 420 may allow a manager to (1) modify a treatment plan in real-time, (2) validate changes to modified treatment plans, (3) control the bounds of dynamic planning, (4) control experimental treatment plans in real time, (5) validate experimental treatment plans, (6) control the bounds of experimental treatment plans, (7) validate treatment plan reconfigurations, (8) control the bounds of treatment plan reconfigurations, etc. Some of these examples are described in more detail below to provide example functionality for the manager feedback module 420.

Modifying Treatment Plans

The manager feedback module 420 is configured to allow a manager to modify a treatment plan in real time. Modifying a treatment plan generally represents receiving a treatment plan (or modified treatment plan), reviewing the treatment plan, modifying some aspect of the treatment plan (e.g., a farming action), and transmitting the modified treatment plan to the farming machine. The farming machine may then implement the user modified treatment plan.

For instance, the manager may access a treatment plan being executed by a farming machine in the field. The manager may review any of the various measurements, results, etc. regarding the treatment plan as it is being executed in the field. Moreover, the manager may be able to access historical information about the field, previous farming actions and treatment plans, operating environment characteristics etc.

Using this information, the manager may elect to generate a modified treatment plan in real time. For instance, the manager may elect to modify a farming action in a treatment plan, add a farming action to a treatment plan, accelerate a farming action in the treatment plan, etc. The manager then transmits the modified treatment plan (if necessary) to the farming machine, and the farming machine implements the modified treatment plan.

A manager may control experimental treatment plans and treatment plan reconfigurations in a similar manner.

Validating Treatment Plans

The manager feedback module 420 is configured to allow a manager to validate a modified treatment plan generated by the dynamic planning module 400. Validating a modified treatment plan generally represents receiving a modified treatment plan, allowing the manager to review and validate the modified treatment plan, and transmitting the validation to the farming machine. Validating the treatment plan allows the farming machine to implement the modified treatment plan in the field (e.g., a farming machine may require a validation from a manager before implementing a farming machine).

To illustrate, the dynamic planning module 400 may generate a modified treatment plan based on information from external systems and/or the machine component array. The manager feedback module 420 transmits the modified treatment plant to the manager and displays any information regarding the modified treatment plan to the manager that may be pertinent for the manager validating the treatment plan. For example, the manager may receive an expected change in a result of the farming objective if executing the modified treatment plan, farming actions modified in the modified treatment plan, an expected additional cost of the modified treatment plan, etc.

Using this information, the manager may elect to validate the modified treatment plan. For instance, the manager may select to allow the farming machine to implement the modified treatment plan, or some portion of the modified treatment plan. The manager then transmits the modified treatment plan (if necessary) to the farming machine, and the farming machine implements the modified treatment plan.

In some examples, the dynamic planning module 400 may generate several modified treatment plans (e.g., options). In this case, the manager feedback module 420 may present the options to the manager and the manager may select a modified treatment plan of the presented treatment plans (or none of them) to implement with the farming machine.

A manager may validate experimental treatment plans and treatment plan reconfigurations in a similar manner.

Controlling Treatment Plans

The manager feedback module 420 is configured to allow a manager to control implementation of modified treatment plans. Controlling the implementation of modified treatment plans generally represents letting a manager set the constraints of the dynamic planning module 400. Constraints may be used to control any of: (1) a threshold amount the dynamic planning module 400 is able to change a farming action when generating a modified treatment plan, (2) a threshold number of farming actions a dynamic planning module 400 is able to add or subtract from a treatment plan, (3) a threshold amount of time the dynamic planning module 400 is able to accelerate or slow farming actions in a treatment plan, (4) implementing various validation requirements for modifying treatment plans, (5) controlling parameters in experimental treatment plans, (6) specifying a threshold cost increase or decrease when modifying a treatment plan or experimental treatment plan, (7) limiting a range of farming objectives that the dynamic planning module 400 may implement in the field, etc. Of course, other examples are also possible.

For instance, consider a manager employing the experimental treatment plan functionality of the dynamic planning module 400. In this case, the manager may use the manager feedback module 420 to define how much of the field she wishes to use for experimental treatment plans, define a maximum amount of variance per modified treatment plan, etc. In other words, the manager uses the manager feedback module 420 to control the parameters the experimental sequence module 430 uses when generating experimental treatment plans.

In another example, consider a manager employing the dynamic plan modification functionality of the dynamic planning module 400. In this case, the manager may use the manager feedback module 420 to define bounds for modifying the historical treatment plan. For instance, the manager may define that no farming action in the treatment plan should be modified more than 10% from the historical treatment plan, or such that the cost of the modified treatment plan is more than 10% more than the historical treatment plan. In this case, the dynamic planning module may create modified farming actions in a modified treatment plan within those specified boundaries.

Visualizations

The manager feedback module 420 is configured to dynamically generate any number of visualizations to assist the manager in interacting with, modifying, and validating treatment plans.

For example, the manager feedback module 420 may generate several visualizations of historical and current information in the field to assist the manager in modifying a treatment plan. To illustrate, the manager feedback module 420 may generate a graph showing a field or a field portion over time, and generate a graph representing an expected yield over time if implementing a proposed modification to a farming action in a treatment plan. With the visualization, the manager is able to conceptualize more accurately what modifying a treatment plan may entail.

In another example, the manager feedback module 420 may generate several visualizations of experimental treatment plans. To illustrate, the manager feedback module 420 may generate a graphical representation of the field and illustrate which field portions implement experimental treatment plans and which field portion implement historical treatment plans. The manager feedback module 420 may generate various overlays to allow the manager to visualize the differences in the implementation of experimental treatment plans vs. the historical treatment plans. Moreover, the manager feedback module 420 may generate various overlays that show differences in the results of experimental treatment plans vs. historical treatment plans. In this manner, the manager is more easily about to conceptualize differences between experimental treatment plans and historical treatment plans.

More generally, the visualizations may be textual or graphical representations of various information in the system environment 200 utilized in modifying a treatment plan. For instance the visualization may state a result, a measurement, a farming action, etc. On the whole, the visualizations provide the manager information such that they are able to make informed decisions in managing the field to achieve the farming objective.

Of course, the visualizations listed here are just examples. The manager feedback module 420 is able to generate any visualization that may be able to help convey information within the system environment to the manager. Example visualizations may include text, images, videos, graphs, maps, charts, visual overlays, etc. The visualizations may include information regarding measurements from external systems and/or the machine component array, results of farming actions, implementations of farming actions, representations of treatment plans, or any other suitable information.

Interactable Visualizations

The manager feedback module 420 is configured to allow a manager to interact with visualizations to manipulate, control, and implement modified treatment plans. For instance, the visualizations generated by the manager feedback module 420 may be configured to allow the manager to modify treatment plans transmitted to the manager, request additional data regarding the transmitted treatment plants, query differences between the modified treatment plan and a historic treatment plan, etc. In these case, the manager may be employing two-way communication with the farming machine to retrieve data, modify settings and parameters, generate new visualizations, etc., in an effort to dynamically modify a treatment plan "on the fly" while the autonomous farming machine is performing a treatment plan and measuring its environment.

VIII. Predicting Results of Modified Treatment Plans

Returning now to FIG. 4, the dynamic planning module 400 includes a results prediction module 460. The results prediction module 460 ("prediction module 460") predicts how modifying a treatment plan will affect results and farming objectives. Predictions are generally based on information received from external systems and/or the machine component array, but could be based on other information such as historical or predicted information. Additionally, predictions can occur using a variety of methodologies, some of which are described herein. Of course, the predictive methods presented herein are not intended to be limiting but are meant only to exemplify the predictive capabilities of the prediction module 460. Other methods and other results are also possible.

Providing more nuanced context, information gained from experimental treatment plans (or some other results) are broadly useful in generating predictions because those results improve the database 'understanding' (i.e., by training the predictive models) of cause and effect under certain circumstances. Those interpreted causes and effects may then be implemented in the future as the best way to achieve the farming objective (rather than a previously understood historical best practice). In other words, while the description often relates binary "improvement" or "no improvement" use cases and examples, the farming machine learns something useful from each experiment and/or measured, regardless of whether a farming objective is accomplished, or not. Therefore, every experimental treatment plan and/or measured results improves the prediction model (i.e., the farming machines understanding of how to best achieve a farming objective given the circumstances in the field) and can then accordingly generate predictions for how to achieve particular results in the field.

Example Predictions

In an example, the prediction module 460 can predict an absolute or relative change in a particular result from a modified treatment plan. For instance, consider an example where a farming machine is implementing a treatment plan to remove weeds from a field. The prediction module 460 is configured to predict an absolute and/or relative change to a result (e.g., likelihood of necrosis) by implementing a modified farming action that sprays 5% more treatment fluid than the corresponding farming action.

In another example, the prediction module 460 can predict an absolute or relative change to a farming objective. For instance, consider an example where a farmer is implementing a treatment plan with the farming objective of harvesting a crop with the greatest yield. In this case, the predication module is configured to predict how modifying various farming actions in the treatment plan may affect the yield in absolute or relative terms. For example, the prediction module 460 may predict that accelerating a farming action would result in 2% more yield for a field portion.

In another example, the prediction module 460 can predict various economic effects of modifying treatment plans. For instance, consider an example where a manager is trying to minimize costs while implementing a treatment plan with the farming objective of weeding a field. In this case, the prediction module 460 is configured to predict an increased or decreased cost of modifying farming actions in the treatment plan. Moreover, the economic effects may be tied to the various other predictive capabilities of the prediction module 460. So, using the previous example, the prediction model may predict an expected cost/benefit of spraying additional weed treatment fluid. For example, predicting that spraying additional weed treatment fluid will reduce weed pressure by an additional 15% but increase costs by 8%.

Example Prediction Methodologies

The prediction module 460 is configured to predict how modifying treatment plans will affect results and farming objectives in a variety of manners.

In an example, the prediction module 460 configured to continuously predict how modifying treatment plans will affect results and farming objectives. To begin, consider a farming machine that is continuously receiving information about the operating environment from external systems and/or the machine component array. The received information inherently contains information reflecting how the implanted treatment plan affects results and farming objectives. Using that received real time information, the prediction module 460 continuously predicts how modifying the treatment plan may affect results and farming objectives.

In another example, the prediction module 460 is configured to predict how modifying treatment plans will affect results and farming objectives based on a time interval. For instance, only predicting how modifying a treatment plan would affect results and farming objectives every minute, hour, pass, farming action, season, etc. The time intervals may be defined by the manager.

In another example, the prediction module 460 is configured to predict how modifying treatment plans will affect results and farming objectives at certain spatial intervals. For instance, only predicting how modifying a treatment plan would affect results and farming objectives per linear distance, spatial area, crop row, field portion, field, etc. The spatial intervals may be defined by the manager.

Of course, other methodologies, or combinations of methodologies are also possible. Moreover, those other methodologies and combinations may be controlled by a manager.

Example Triggers for Modifying Treatment Plans

As described above, predictions of how modified treatment plans affect results and farming objectives may govern how the plan modification module 410 generates modified treatment plans. There are methodologies that may be implemented for triggering the plan modification module 410 to generate a modified treatment plan based on a prediction from the prediction module 460.

In an example, recall the prediction module 460 that continuously generates predictions on how modifying a treatment plan will affect results and farming objectives based on real-time information received from external systems and the machine component array. In this case, the dynamic planning module 400 may generate a modified treatment plan reflecting any prediction from the prediction module 460 that improves results or the farming objective. For example, if the prediction module 460 predicts that modifying a treatment plan to subtract a farming action would improve a result, the dynamic modification module may correspondingly generate the modified treatment plan reflecting the prediction.

In an example, the plan modification module 410 may generate a modified treatment plan if a modified treatment plan reflecting a prediction from the prediction module 460 if the prediction achieves a threshold change in result or farming objective. For instance, the plan modification module 410 may only generate a modified treatment plan reflecting a prediction if the prediction indicates more than a five percent improvement in a particular result.

In an example, the plan modification module 410 may generate a modified treatment plan if a modified treatment plan reflecting a prediction from the prediction module 460 based on temporal or spatial triggers. For instance, the plan modification module 410 may only generate a modified treatment plan reflecting a prediction if the once per pass, per hour, per field portion, per row, etc.

In an example, the plan modification module 410 may generate a modified treatment plan if a modified treatment plan based on received manager input. For instance, the prediction module 460 may generate one or more predictions reflecting how one or more modified treatment plans may affect results and/or farming objectives. The manager feedback module 420 may then present those modified treatment plans to the manager, and the manager may select one or more of the modified treatment plans for implementation. Based on the selection, the plan modification module 410 generates modified treatment plans reflecting their corresponding predictions.

In an example, the plan modification module 410 may generate a modified treatment plan based on directly observed plant information. Some directly observable plant information includes size, height, width, leaf area index, maturity, and/or biomass maturity (e.g., ripeness, growth cycle stage, etc.). Additional directly observable plant information includes health indicators such as including stress and source of stress indicators. These indicators include water deficiency, nutrient deficiency, disease, insect pest, weeds, sunlight deficiency, etc. More directly observable plant information includes plant type, such as whether multiple crop varieties are in the field, the differences between those crop varieties. Finally, some directly observable plant information includes weed type, stand count, and status of adjacent plants.

In an example, the plan modification module 410 may generate a modified treatment plan based on soil information. Soil information may include, moisture nutrient availability, type of soil (e.g., loam, clay, etc.), organic matter content, physical characteristics (e.g., crusted, clod size, etc.).

In an example, the plan modification module 410 may generate a modified treatment plan based on weather information. Weather information may include current humidity, wind, sun intensity, temperature, etc. Moreover the weather information may include variability of weather information within a field in different direction (e.g. temperature inversion where air temperature increases with height from ground). The weather information may also include the above for adjacent, nearby, or similarly fields and/or may include historic or future weather information.

In an example, the plan modification module 410 may generate a modified treatment plan based on pest information. For example, the plan modification module 410 may modify a treatment plan when a pest is observed, but before the corresponding stress of the plant is observed. Moreover, the pest information may include information from adjacent, nearby, or similar fields and/or may include historic or future pest information.

In an example, the plan modification module 410 may generate a modified treatment plan based on market information. Market information may include: price per unit, price per quality (e.g. protein content, pesticide free, etc.), timing of crop delivery (e.g. earlier or later) amount of crop needed to fulfill contract (e.g. if the farmer has a contract for x bushels at y price but no or limited ability to generate revenue from the remaining bushels expected to be harvested, the decision could be made to stop investing in the 'additional' yield), etc.

In an example, the plan modification module 410 may generate a modified treatment plan based on yield information. Yield information may be measured, expected, predicted or forecasted yield. Yield information may be measured in quantity or quality metrics.

Predictions Generating Redundant Farming Actions

In some cases, the dynamic planning module 400 may generate a prediction that results in generation of a modified treatment plan comprising one or more redundant farming actions. A redundant farming action is a farming action that is the same, or substantially similar to (e.g., 1%, 2%, 3%, 5% different), a farming action already in the treatment plan. For instance, consider a farming machine implementing a treatment plan for spraying crops in the field with treatment fluid at a first time. The dynamic planning module 400 may generate a modified treatment plan that sprays crops with the treatment fluid at a second time different than the first time (i.e., the farming machine would stop or delay implementation). If the second time is just a few minutes after the first time, it could be considered redundant. That is, there is not enough time separating the first time and the second time for implementation of the spray at the second time to be meaningful or cost-effective to implement. In this case, the farming machine may determine the modified farming action in the modified treatment plan is redundant and not perform the action. In another example, the farming machine may generate a modified treatment plan including two additional farming actions that apply the spray treatment at a second time and a third time after the first time. In this case, if the second time and the third time are substantially similar, they could be redundant. As such, the farming machine may modify the modified treatment plan to remove one or both of the modified farming actions to remove the redundancy.

In determining redundancy, the dynamic planning module 400 may calculate a redundancy value for one or more farming actions in a modified treatment plant. The redundancy value is a quantification of the similarity between the farming actions and/or how their implementation affects a result relating to the farming objective. If the redundancy score is above a threshold, the farming machine may modify the modified treatment plan to address the redundant farming actions. To do so the farming machine may remove redundant farming actions, combine redundant farming actions, modify farming actions, etc.

VIII.A Example Prediction Model

As described above, there are several methods to predict results and farming objectives when modifying a treatment plan. In one example, prediction may be implemented by a control system 130 executing a modification prediction model.

Figure 11A:
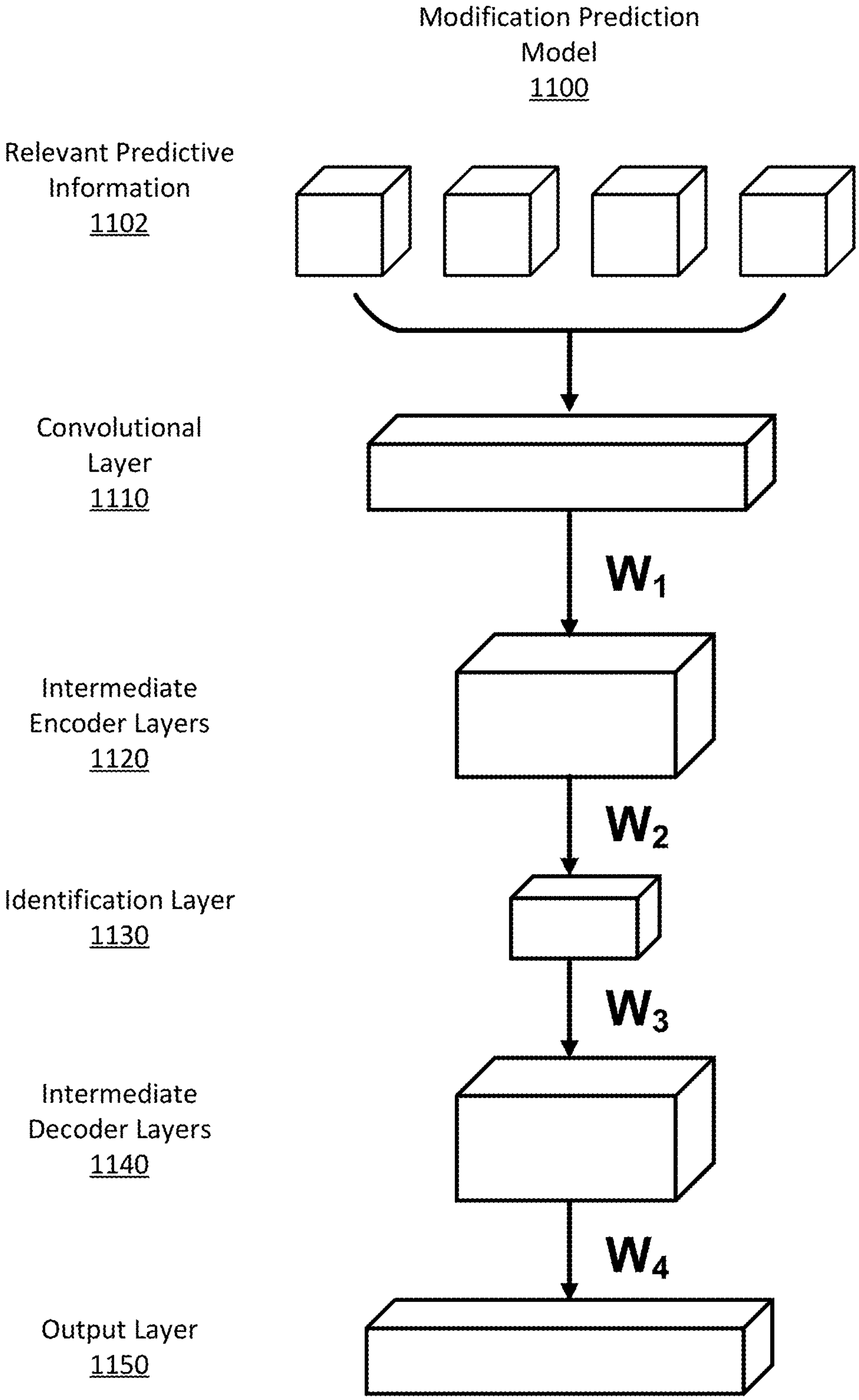
FIG. 11A is a representation of a treatment modification prediction model based on information received from external systems and/or the machine component array and a current treatment plan of the farming machine, according to one example embodiment.

FIG. 11A is a representation of a treatment modification prediction model based on information received from external systems and/or the machine component array and a current treatment plan of the farming machine, according to one example embodiment. As described in greater detail below, the modification prediction model can predict results from modified treatment plans, and/or suggest modified treatment plans corresponding to predictions.

In the illustrated embodiment, referred to throughout the remainder of the specification, the modification prediction model 1100 is a convolutional neural network model with layers of nodes, in which values at nodes of a current layer are a transformation of values at nodes of a previous layer. A transformation in the model 1100 is determined through a set of weights and parameters connecting the current layer and the previous layer. For example, as shown in FIG. 10, the example model 1100 includes five layers of nodes: layers 1110, 1120, 1130, 1140, and 1150. The control system 130/210 applies the function $W_1$ to transform from layer 1110 to layer 1120, applies the function $W_2$ to transform from layer 1120 to layer 1130, applies the function $W_3$ to transform from layer 1130 to layer 1140, and applies the function $W_4$ to transform from layer 1140 to layer 1150. In some examples, the transformation can also be determined through a set of weights and parameters used to transform between previous layers in the model. For example, the transformation $W_4$ from layer 1140 to layer 1150 can be based on parameters used to accomplish the transformation $W_1$ from layer 1110 to 1120.

The dynamic planning module 400 inputs information from external systems and/or the machine component array ("relevant predictive information 1102") and encodes the relative predictive information onto the convolutional layer 1110. After processing by the control system 130, the model 1100 outputs a prediction decoded from the output layer 1150. The prediction is typically a predicted result of a modified treatment plan based on the data. For instance, the prediction may be a modified treatment plan and an expected change in results if the farming machine implements the modified treatment plan.

The control system 130 employs the model 1100 to identify latent information in the relevant predictive information 1102 that may indicate a prediction. That is, information that may indicate a change in results if implementing a modified treatment plan. The control system 130 reduces of the dimensionality of the convolutional layer 1110 to that of the prediction layer 1130 to generate the prediction, and then increases the dimensionality of the prediction layer 1130 to generate a prediction.

As previously described, the control system 130 encodes relevant predictive information 1102 onto the convolutional layer 1110, but, in other examples, the relevant predictive information 1102 can be adjusted such that its dimensionally is the same as the dimensionality of the convolutional layer 1110. For example, the relevant predictive information 1102 may be sampled, truncated, deleted, etc.

The control system 130 applies the model 1100 to relate relevant predictive information 1102 in the convolutional layer 1110 to modified treatment plans and their corresponding predictions in the prediction layer 1130. The control system 130 determines relevance information between these elements can by applying a set of transformations (e.g., $W_1$, $W_2$, etc.) between the corresponding layers. Continuing with the example from FIG. 10, the convolutional layer 1110 of the model 1100 represents encoded relevant predicative information, and prediction layer 1130 of the model 1100 represents predictions of how modified treatment plans affect results and farming objectives. The control system 130 identifies prediction using the relevant predictive information 1102 by applying the transformations $W_1$ and $W_2$ to information values in the space of convolutional layer 1110. The weights and parameters for the transformations may indicate relationships between information contained in the relevant predictive information 1102 and the determination of predictions. For example, the weights and parameters can be a quantization of farming actions, farming action parameters, expected changes in results, etc. included in information representing predictions. The control system 130 may learn the weights and parameters using historical data. For example, the control system 210 can access prediction information in external systems or generate predictive information based on measurements of modified treatment plans performed by the farming machine in the field.

In one example, the weights and parameters for predictions regarding modified farming actions can be collected and trained using data collected from academic studies reflecting this information that is labelled by a human. In another example, the weights and parameters for predictions regarding modified farming actions can be collected as a result of experimental treatment plans implemented by the farming machine. In this manner, the farming machine is configured to become better at predicting how modifying treatment plans affects results and farming objectives. That is, the more experimental treatment plans that the farming machine implements, the more accurate the predictions for modified treatment plans will become.

As described above predictions describing how modified treatment plans affect results and farming objectives are identified in the prediction layer 1130. The prediction layer 1130 is a data structure representing modified treatment plans and their corresponding effects of results and farming objectives on the relevant predictive information 1102.

To generate an output, the control system 130 employs the model 1100 and applies the transformations $W_3$ and $W_4$ to the values of the predictions in prediction layer 1130. The transformations result in a set of nodes in the output layer 1150. The weights and parameters for the transformations may indicate relationships between the predictions and the desired output of the model 1100. In one example, the output from the output layer is simply a predicted result or change in farming objective for an optional modified treatment plan (e.g., may or may not be implemented). In another example, the output from the output layer includes the modified treatment plan itself. In other words, the model can encompass the functionality of the prediction model and/or the plan modification module 410. That is, the model can output any of (1) a prediction for a modified treatment plan which may then be acted on by the plan modification module 410, (2) a modified treatment plan (e.g., if the prediction associated with the modified treatment plan achieves a beneficial change to a result above a threshold) that may be implemented by the plan modification module 410.

In some cases, there may be a conversion layer to convert a prediction to a modified treatment plan. To illustrate conversion, take, for example, a control system 130 employing model 1100 that produces a predicted result for a modified treatment plan. The control system 130 may generate a modified treatment plan based on the predicted results by employing a conversion layer that converts the prediction to a modified treatment plan.

Additionally, the model 1100 can include layers known as intermediate layers. Intermediate layers are those that do not correspond to relevant predictive information 1102, predictions, or modified treatment plans. For example, as shown in FIG. 10, layers 1120 are intermediate encoder layers between the convolutional layer 1110 and the prediction layer 1130. Layer 1140 is an intermediate decoder layer between the prediction layer 1130 and the output layer 1150. Hidden layers are latent representations of different aspects of generating predictions from relevant predictive information 1102 not observed in the itself, but may govern the relationships between those elements in a different space. For example, a node in the hidden layer may have strong connections (e.g., large weight values) to input values and identification values that share the commonality of "increase spray." As another example, another node in the hidden layer may have strong connections to input values and identification values that share the commonality of "better yield." Specifically, in the example model of FIG. 10, nodes of the hidden layers 1120 and 1140 can link inherent information in the accessed image that share common characteristics to help determine how modified treatment plans affect results and farming objectives.

Additionally, each intermediate layer is a combination of functions such as, for example, residual blocks, convolutional layers, pooling operations, skip connections, concatenations, etc. Any number of intermediate encoder layers 1120 can function to reduce the convolutional layer to the prediction layer and any number of intermediate decoder layers 1140 can function to increase the prediction layer 1130 to the output layer 1150. Alternatively stated, the encoder intermediate layers reduce the pixel dimensionality to the identification dimensionality, and the decoder intermediate layers increase the identification dimensionality to the treatment dimensionality.

Herein, the exact input and outputs to the model are not explicitly defined because one skilled in the art will understand that a convolutional neural network structured as model 1100 can be trained to generate any number of modified treatment plans for any number of farming objectives and desired results. That is, given enough training data (such as that generated by the experimental sequence module 430), the model 1100 can be employed to modify treatment plans for any conceivable farming objective implemented by a farming machine.

However, obtaining this much training data will take time. In lieu of an unbounded model, model 1100 may initially be configured to modify treatment plans to achieve specific farming objectives, or limit how the model 1100 may modify those treatment plans. For instance, the model 1100 may be limited to predicting how accelerating or delaying farming actions may affect results or farming objectives, or the model may be limited to a specific farming objective such as high efficiency plant necrosis. Depending on the configuration, one skilled in the art will recognize that the inputs and outputs of the model 1100 would be tailored for their specific use case.

VIII.B Example Training Data

It is impossible to quantify all the possible data measurable by a farming machine and used to train a treatment modification prediction model (e.g., prediction model 1100). This section provides example real time measurements, results, etc. used to train a prediction model.

Figure 11B:
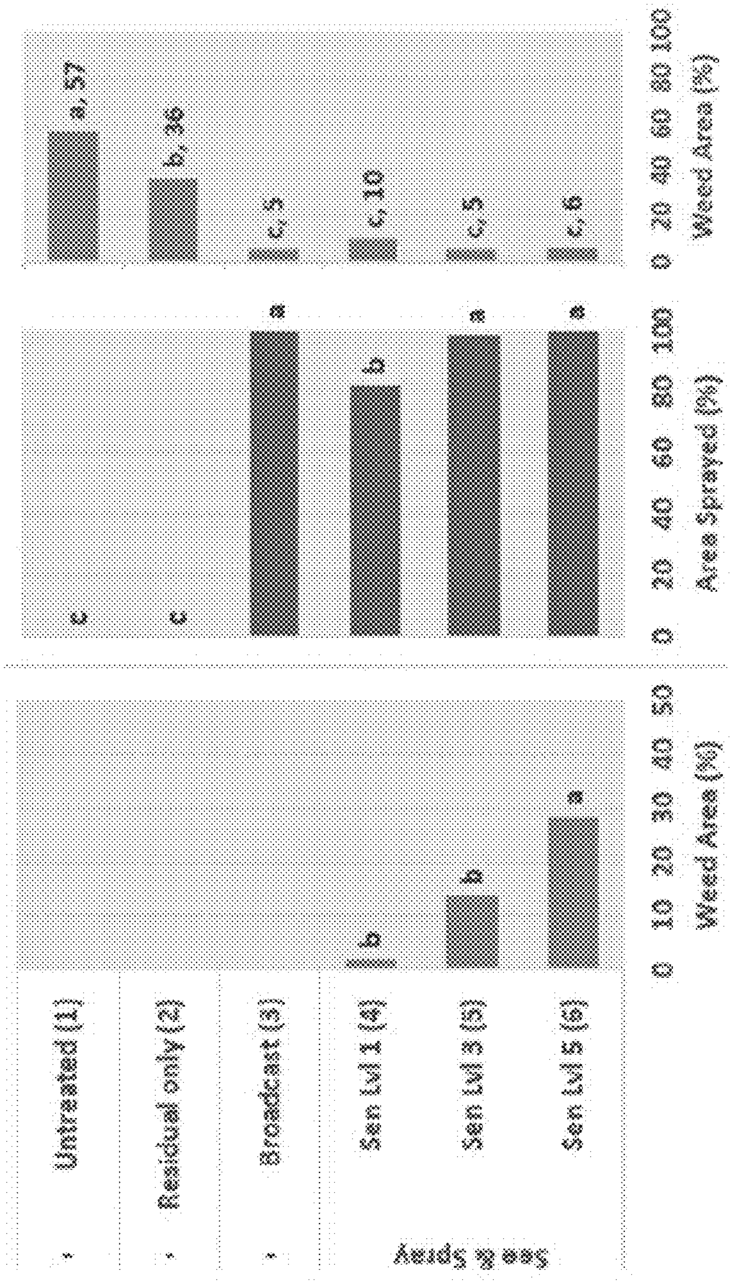
FIG. 11B illustrates variance in farming action results when a sensitivity of a treatment action is modified in a treatment plan for soybeans, according to one example embodiment.

FIG. 11B illustrates variance in farming action results when a sensitivity of a treatment action is modified in a treatment plan for soybeans, according to one example embodiment. In this case, modifying the sensitivity of a treatment action changes an identification sensitivity of a plant identification model used to identify and treat plants as a farming action. Here, a higher sensitivity indicates that the model is more likely to identify plants accurately and with fidelity, while a low sensitivity is less likely to identify plants accurately and with fidelity.

FIG. 11B includes three bar graphs. The leftmost bar graph gives the area of weeds detected as a function of sensitivity level. The middle bar graph gives the area treated as a function of sensitivity level. The right most bar graph gives the weed area 26 days after treating a plant when employing the respective sensitivity levels. The top three columns are control factors for untreated, residual, and broadcast sprays.

As indicated by the data, treatment actions with increased sensitivity increase the weed area detected, leading to a higher area sprayed. Moreover, the higher sensitivities indicate a lower weed area after treatment than when employing the lower sensitivity. Thus, modifying a sensitivity of a treatment action when treating soybeans may be tuned to control weed area after treatment. Data such as this may be used to train a prediction model.

Figure 11C:
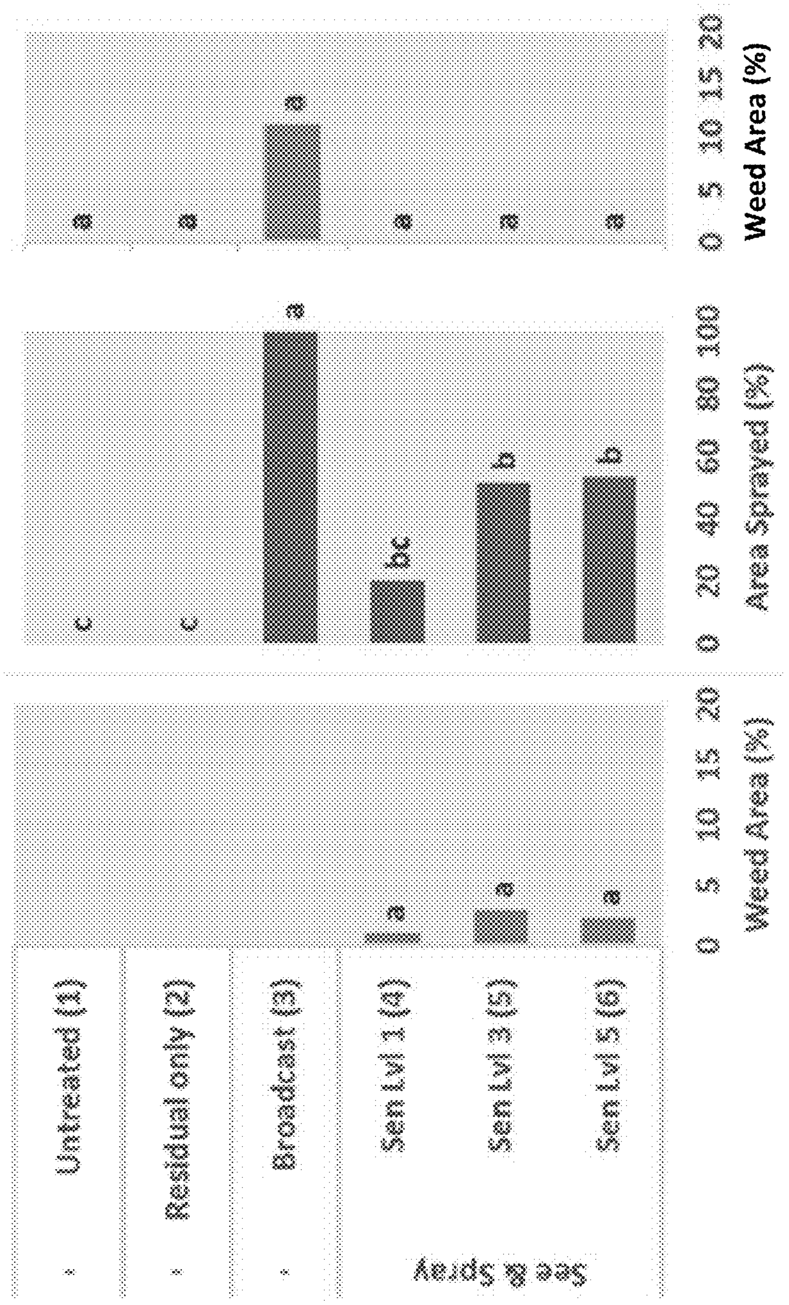
FIG. 11C illustrates variance in farming action results when a sensitivity of a treatment action is modified in a treatment plan for cotton, according to one example embodiment.

FIG. 11C illustrates variance in farming action results when a sensitivity of a treatment action is modified in a treatment plan for cotton, according to one example embodiment. FIG. 11C is similarly structured to FIG. 11B and includes three bar graphs representing area of weeds detected, area treated, and area of weeds detected after treatment, respectively. Here, FIG. 11C illustrates that, for cotton, the lowest sensitivity and the highest sensitivity function in largely a similar manner. As such, modifying a sensitivity when generating modified farming action for treating cotton may be unnecessary and the lowest sensitivity is functional.

Figure 11D:
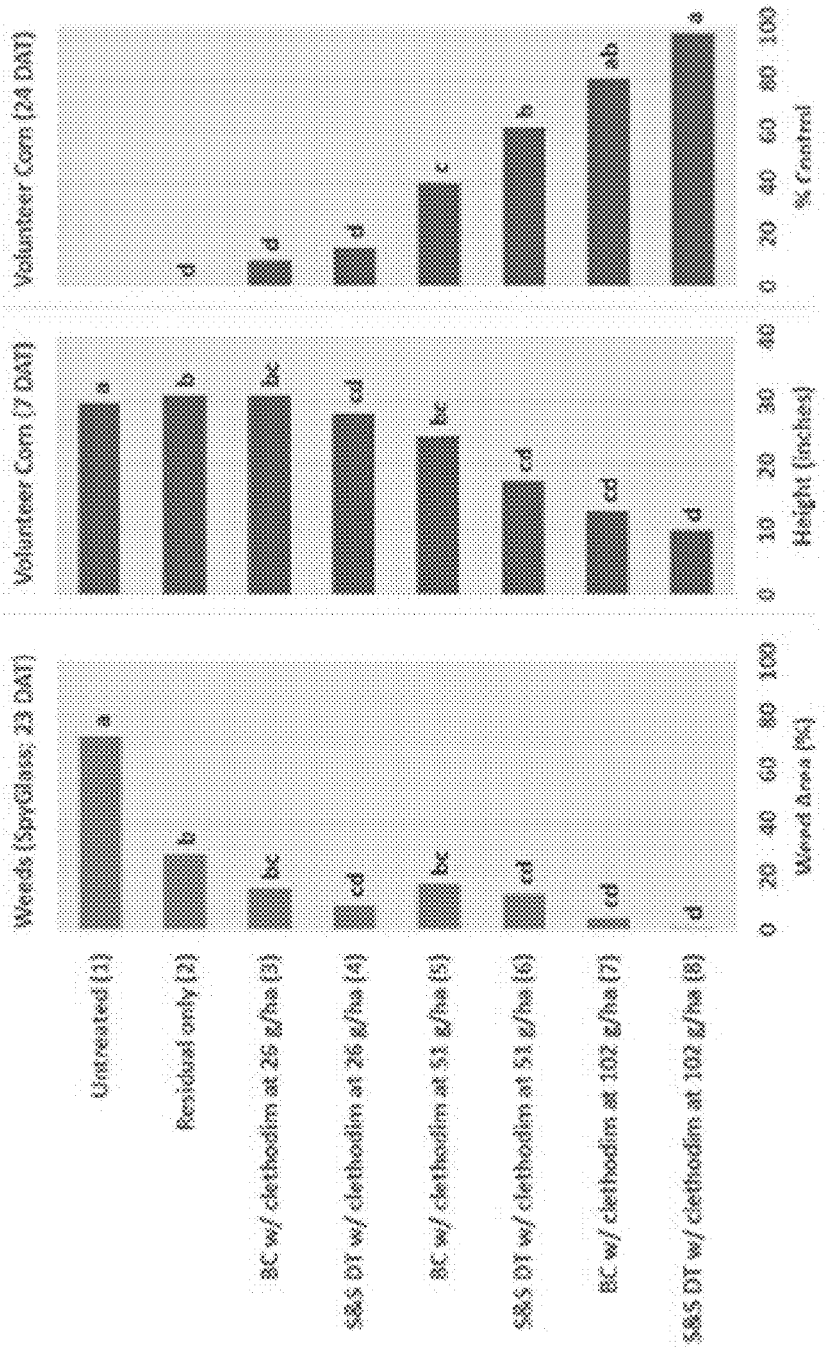
FIG. 11D illustrates variance in farming action results when treatment chemistry, treatment characteristics, and farming machine configuration is modified in a treatment plan for soybeans, according to one example embodiment.

FIG. 11D illustrates variance in farming action results when treatment chemistry, treatment characteristics, and farming machine configuration is modified in a treatment plan for soybeans, according to one example embodiment. In this case, modifying the chemistry of the treatment action applies different chemistries to a plant, modifying treatment characteristics modifies the amount of treatment (e.g., g/ha) applied, and modifying treatment configuration modifies single or multi-tank configurations. In this case, the modified farming actions are configured for treating soybeans in a field, where the field includes volunteer corn. In other words, the modified farming actions aim to control manage both corn and soybeans while treating a soybean field.

FIG. 11D includes three bar graphs. Each row on the bar graph represents a modified treatment action with distinct combination of chemistry, characteristics, and machine configuration. The leftmost bar graph gives the area of weeds detected 23 days after treatment, the centermost bar graph illustrates the height of the corn 7 days after treatment with each modified treatment action, and the right most bar graph illustrates the height of the corn relative to a control 24 days after treatment with a modified treatment action. These results show that each modified treatment action affects soybeans, corn and weeds to various degrees at different times, and the data may be correspondingly used to train a prediction model.

Figure 11E:
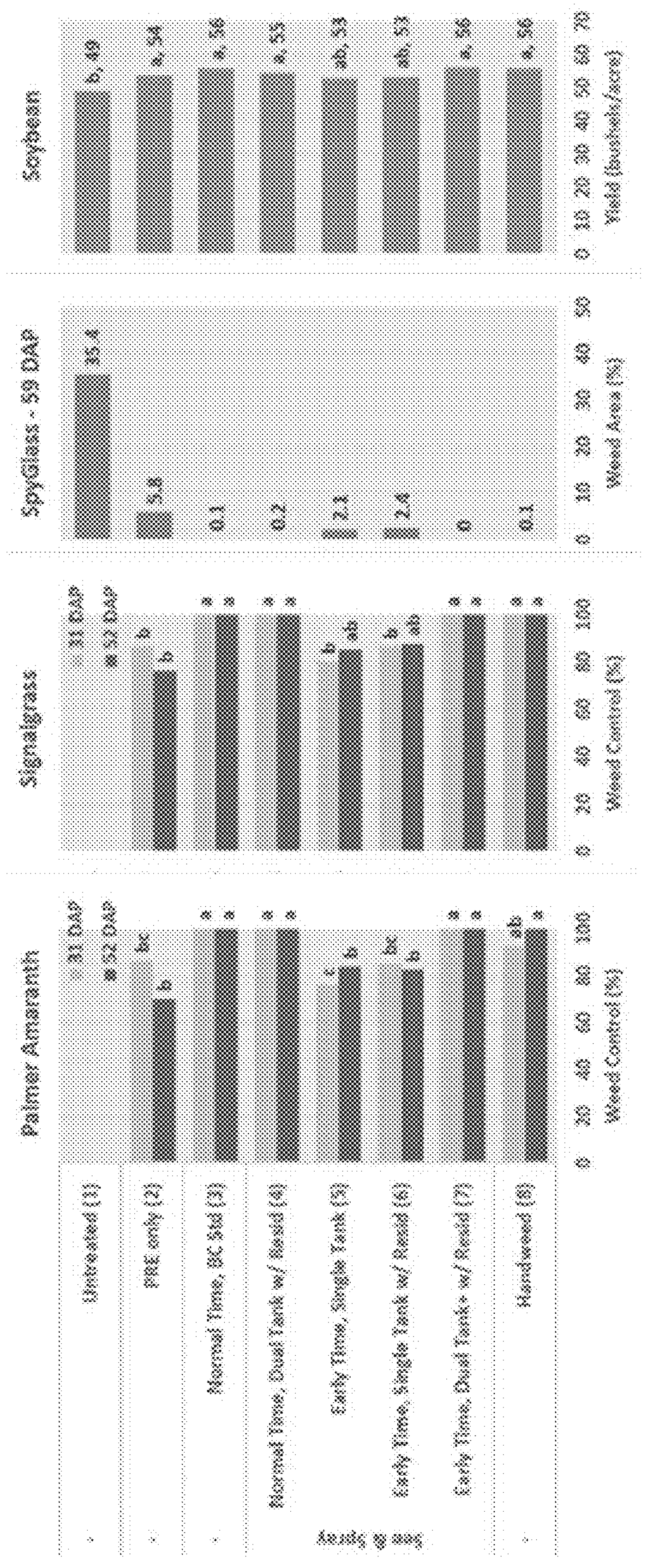
FIG. 11E illustrates variance in farming action results when treatment time treatment chemistry, and machine configuration is modified in a treatment plan for soybeans, according to one example embodiment.

FIG. 11E illustrates variance in farming action results when treatment time, treatment chemistry, and machine configuration are modified in a treatment plan for soybeans, according to one example embodiment. In this case, modifying the treatment chemistry of the treatment action applies different chemistries to a plant, modifying a treatment time modifies a treatment time of a plant (e.g., accelerate or delay), and modifying a machine configuration modifies a single or dual tank machine configuration.

FIG. 11E includes four bar graphs. Each row on the bar graph represents a modified treatment action with distinct combination of chemistry, times, and machine configurations. The first bar graph from the left gives the weed control for a first type of weed, the second gives the weed control for a second type of weed, and the third gives the weed area for a third type of weed. The rightmost graph gives the yield of soybeans for each modified treatment action. These results show that each modified treatment action affects soybeans and weeds to various degrees at different times, and the data may be correspondingly used to train a prediction model.

Figure 11F:
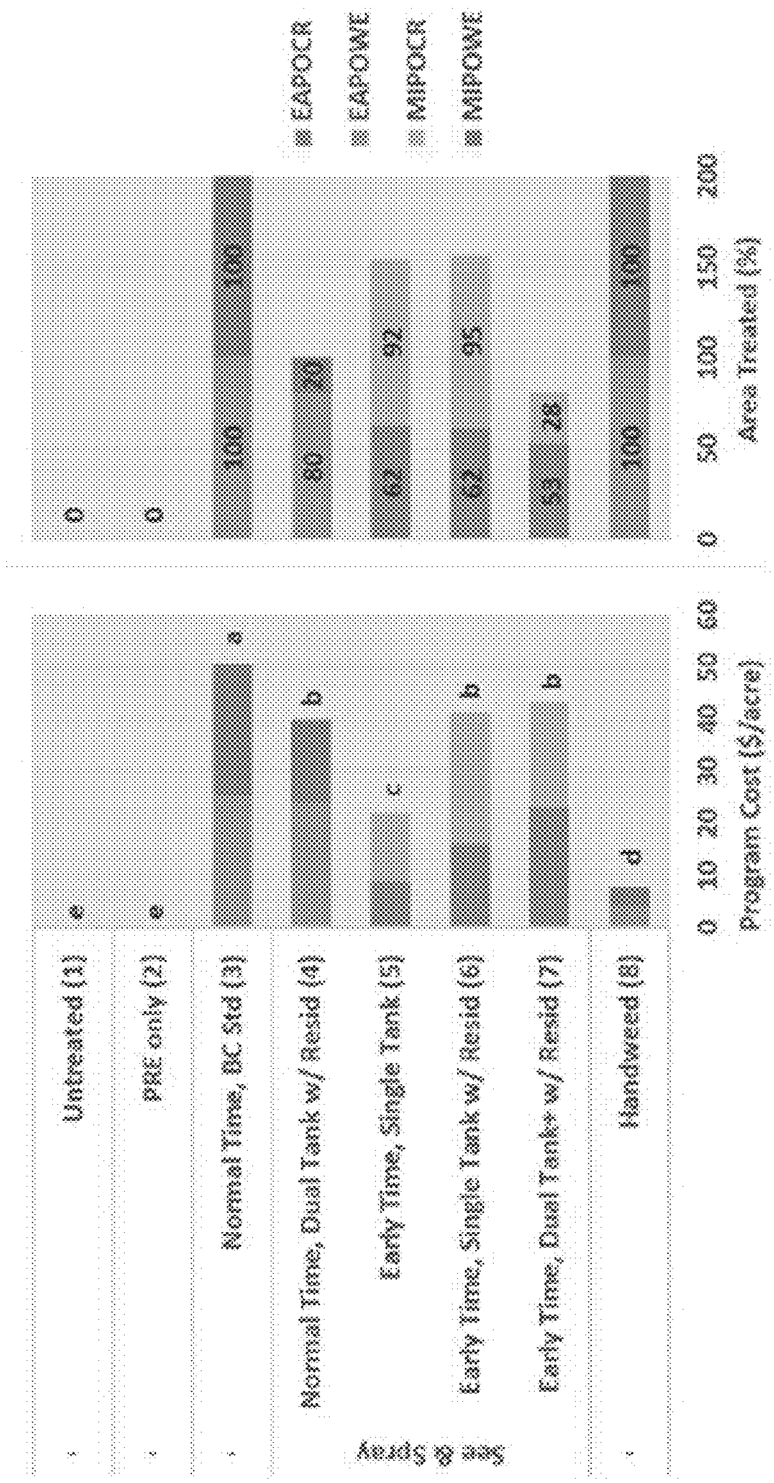
FIG. 11F illustrate economic variance in farming action results when treatment time treatment chemistry, and machine configuration is modified in a treatment plan for soybeans, according to one example embodiment.

FIG. 11F illustrate economic variance in farming action results when treatment time, treatment chemistry, and machine configuration is modified in a treatment plan for soybeans, according to one example embodiment. In this case, modifying the treatment chemistry of the treatment action applies different chemistries to a plant, modifying a treatment time modifies a treatment time of a plant (e.g., accelerate or delay), and modifying a machine configuration modifies a single or dual tank machine configuration.

FIG. 11F includes two bar graphs. The left bar graph represents the program costs of each modified farming action when applied to the field. The right bar graph represents an area of the field treated when each modified farming action is applied to the field. Notably, the economic results of these modified farming actions may be linked to measurements in FIG. 11E. As such, the various real-time measurements in results in FIG. 11E can be said to influence, or be associated with, the economic results in FIG. 11F. In turn, the results of FIG. 11F show that each modified treatment action affects the economic result of soybeans farming when modified treatment actions are applied at different times, with different chemistries, and with different machine configurations. As such, the data may be correspondingly used to train a prediction model.

VIII. C Training Models for Implementing Modified Treatment Plans

The control system 130/210 can train the dynamic planning module 400 to generate modified treatment plans that positively affect results and farming objectives. For example, the control system 210 can train the model (e.g., model 1100) to generate modified treatment plans that positively affect farming objectives and results.

In an example, the control system 210 trains the dynamic planning module 400 using historic information. In this example, the control system 210 may access historic results for a farming objective implemented by historic treatment plans from external systems (e.g., academic studies, results from other fields, etc.). The historic results may include any amount of information that relates to the result of implementing a farming objective in the field (e.g., yield, nitrogen use, weed pressure, etc.). The information may also include the pertinent information about the farming actions used to implement the historic treatment plan (e.g., when an action is taken, properties of the action, etc.) Moreover, the historic results may include spatial and temporal information related to those results and actions.

Once the historic information is obtained, the control system 210 associates the historically implemented treatment plan with the results, spatial information, temporal information, farming actions, etc. Once associated, the control system 210 uses the historic information to train the model as to what farming actions and treatment plans yield what results. For example, at what time planting a seed in the field will yield the largest plant, or what level of spray will kill a weed in a field.

Of course, there will be variations in the historic data. That is, not every historic treatment plan is implemented in the exactly the same manner and the treatment plans will vary (e.g., one manager implements a farming action of the treatment plan a week earlier than another). These variations may or may not affect results and/or faming objectives. In other words historic treatment plants that are variably implemented are, in effect, a modified treatment plan. Thus, the model can be trained to recognize variations in implementations of historic treatment plans that affected results and farming objectives as potential modified treatment plans. In other words, a manager who delays seeding for a week a historic treatment plan due to a broken down seeder is effectively performing a modified treatment plan that can be used to train the prediction model.

In another example, the control system 210 trains the dynamic planning module 400 using experimental treatment plans. That is, each experimental treatment plan implemented by the farming machine is, in effect, a modified treatment plan with an unknown effect on results and farming objectives. Once the effects on results and farming objectives is measured and/or calculated by the farming machine, that information can be associated with the experimental treatment plan and used to train the predication model 1000. In other words, each experimental treatment plan, once measured, is a modified treatment plan that can be used to train the model 1000.

In another example, the control system 210 trains the dynamic planning module 400 using measured and/or determined results and farming objectives as the farming machine operates in the field. That is, whatever result the farming machine measures, or whatever farming objective is, or is not, accomplished during normal operation of the farming machine may be associated with the treatment plan that generated that result. In this manner, the farming data obtained by the farming machine may be used to further train the model.

Finally, the control system 210 can train the dynamic planning module 400 periodically during operation of the farming machine, at a determined time, or before the model 1000 is implemented on a farming machine. Additionally, the model can be trained by another system such that the dynamic planning module 400 can be implemented on a control system 210 of a farming machine as a standalone model. Notably, in some examples, the aspect of the control system 210 that trains the dynamic planning module 400 is not collocated on the farming machine. That is, the dynamic planning module 400 may be trained on a machine separate from the farming machine and transferred to the farming machine for generating modified treatment plans.

IX. Reconfiguring Treatment Plans

Returning now to FIG. 4, the dynamic planning module 400 includes a treatment plan reconfiguration module 460. The treatment plan reconfiguration module 450 modifies historical treatment plans to reflect modified treatment plans that better accomplish the farming objective.

To illustrate, recall again the experimental treatment plants configured to induce a variance in results between a historic plant treatment plan and the generated experimental treatment plan. In this case, the experimental treatment plan may end up being better at accomplishing the farming objective than the historic treatment plan. Accordingly, the reconfiguration module 460 may modify the historic treatment plan such that it reflects at least some portion of the experimental treatment plant. That is, the reconfiguration module 460 modifies a historic treatment plan to align with a generated treatment plan that produces better results in line with a farming objective. The reconfiguration module 460, more generally, may be configured to modify historic treatment plans with any modified treatment plan that causes the farming machine to better achieve the farming objective.

Moreover, the reconfiguration module 460 may utilize the farming machine to perform farming actions that more fully enable the reconfiguration model to modify/reconfigure treatment plans that better accomplish farming objectives. For example, the reconfiguration module 460 may generate additional farming actions that employ sensors (e.g. sensor 236) to take measurements of previous farming actions, employ models or data analytics to calculate field or yield metrics, etc. That is, the reconfiguration module can perform farming actions that do not actually manipulate plants, the environment, the field, etc., in order to determine which farming actions that do manipulate plants, the environment, the field, etc., are best suited for modifying a historical treatment plan.

IX. Example Implementations

Dynamically Modifying a Treatment Plan

Figure 12:
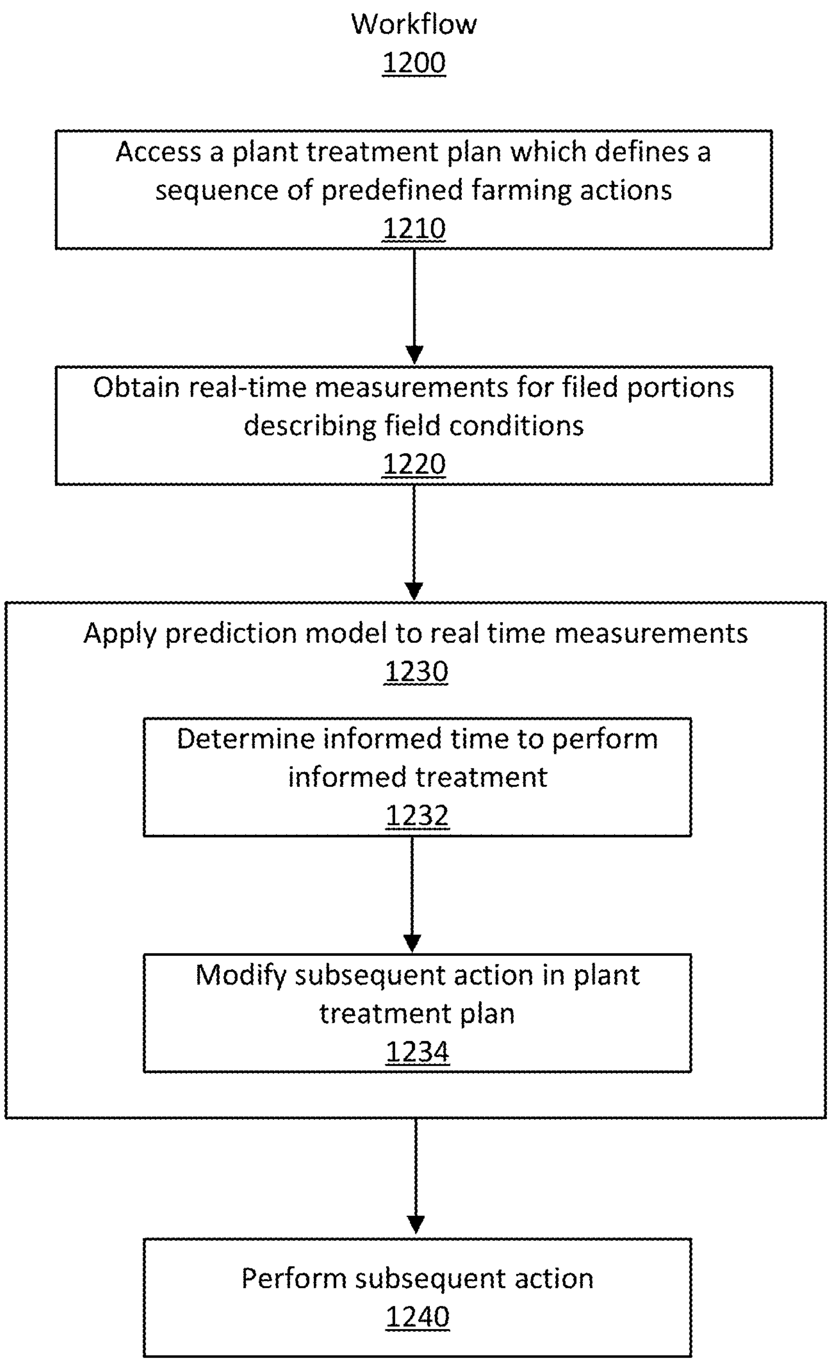
FIG. 12 illustrates a workflow for dynamically modifying a treatment plan, according to one example embodiment.

FIG. 12 illustrates a workflow for dynamically modifying a treatment plan, according to one example embodiment. The workflow 1200 can include additional or fewer steps and the illustrated steps may be accomplished in any order. In some cases, steps may be repeated any number of times before progressing to a subsequent step.

As described above, the workflow 1200 is performed by a farming machine in a field that is autonomously (or semi-autonomously) acting to accomplish a farming objective set forth by a manager of the field. Here, the farming objective weeding the field by treating identified plants with a spray treatment. The field is divided into field portions and farming actions to achieve the farming objective may be different for each field portion.

To accomplish the farming objective, the farming machine accesses 1210 a plant treatment plan. The plant treatment plan includes a predefined sequence of farming actions. Each of the predefined farming actions comprises a predefined treatment to perform at a predefined time in the field. In the example at hand, the predefined treatments are configured for treating plants in the field but could be some other treatment as described above.

As it is performing the plant treatment plan by performing applying the predefined sequence of farming actions in the field, the farming machine obtains 1220 real-time measurements describing conditions of the field (e.g., from a machine component array and/or external systems). In particular, the farming machine obtains real-time measurements for different field portions in the field. For instance, the farming machine may obtain real-time measurements for the field portion it is operating within, an adjacent field portion, or some other field portion. Additionally, the farming machine may access previous or historic measurements for the field, and the farming machine may also access real-time, previous, or historic measurements for a different field.

The farming machine applies 1230 a treatment prediction model to the real-time measurements. The treatment prediction model is configured to modify farming actions in the plant treatment plan to improve a result related to the farming objective. That is, in this example, the treatment prediction model may generate farming actions for modifying the sequence of farming actions to achieve the result.

To do so, the farming machine inputs the real-time measurements into the treatment prediction model. The farming machine employs the treatment prediction model to process the real-time measurements to identify latent information in the real-time information indicating that modifying the sequence of predefined farming actions would improve the result. That is, the farming machine employs the treatment prediction model to determine 1232 an informed time to perform an informed treatment. In other words, the prediction model receives as input the real-time measurements, processes those measurements, and generates a treatment action to implement in the predefined sequence of farming actions based on the measurements (an “informed treatment action”). The informed treatment action comprises an informed treatment to perform at an informed time. So, the farming machine generates an informed treatment to perform at an informed time that is predicted to improve the result and/or farming objective.

Based on the informed treatment action generated by the treatment prediction model, the farming machine modifies

1234 a subsequent farming action in the sequence of farming actions such that the sequence of farming actions includes performing the informed treatment at the informed time. That is, the farming machine will modify the predefined sequence of farming actions from performing a predefined treatment at a predefined time (i.e., performing a predefined farming action) to perform an informed treatment at an informed time (i.e., performing an informed farming action).

The farming machine, then performs the subsequent farming action in the field. That is, the farming machine performs 1240 a subsequent action comprising an informed treatment at an informed time. In different configurations, the farming machine may perform the farming action semi-autonomously or autonomously (e.g., with or without manager feedback.).

Notably, modifying a subsequent treatment action in the sequence of predefined farming actions can include many possibilities. For instance, in an example, the farming machine may modify a subsequent treatment action to perform a treatment at an informed time that is either the same or different than the predefined time for the subsequent farming action. E.g., the informed treatment time may be on the same pass or a different pass or may be in the same growing season or different growing seasons.

In another example, the farming machine may modify a subsequent treatment action to perform an informed treatment that is either the same or different than the predefined treatment for the subsequent farming action. The informed treatment may modify (1) a treatment amount of a predefined treatment for the subsequent predefined farming action to a different treatment amount, (2) a treatment mechanism performing the treatment of a predefined treatment for the subsequent faming action to a different treatment mechanism, (3) one or more treatment characteristics (e.g., spray speed, spray shape, etc.) of a predefined treatment for the subsequent farming action to one or more different treatment characteristics, (4) a treatment location in the field portion of a predefined treatment for the subsequent farming action to a different treatment location in the field portion, (5) a targeted plant of a predefined treatment for the subsequent predefined farming action to a different targeted plant, etc.

Additionally, as described above, the treatment prediction model may generate farming actions that (1) modify a farming action in the sequence of predefined farming actions for a current pass or future pass, (2) delay or accelerate a farming action in the predefined sequence of farming actions for a current or future pass, or (3) add or remove a farming action in the sequence of farming actions for a current or future pass. For ease of description, the workflow 1200 described these actions as "modifying" subsequent farming actions in the predefined sequence of farming actions, although it should be understood that the functionality of all the options are possible.

For instance, modifying the sequence of predefined farming actions may include adding the subsequent predefined farming action to the predefined sequence of actions such that autonomous farming machine performs the subsequent action as one of the predefined sequence of actions. In another example, modifying the sequence of predefined farming actions may include removing at least one subsequent predefined farming action from the sequence of predefined farming. Removing a subsequent predefined farming action may include that determining the informed time and the informed action represent "no treatment."

Additionally, modifying the sequence of predefined farming actions may include determining whether or not the informed treatment is redundant. For instance, the farming machine may determine a redundancy value for the informed treatment and informed time quantifying a redundancy of the informed treatment and informed time relative to predefined treatments and predefined times for the predefined farming actions in the sequence of predefined farming actions. If the redundancy value is greater than a threshold, the farming machine may replace a redundant predefined treatments and predefined times in the sequence of predefined farming actions with the informed treatment at the informed time.

Accessing the plant treatment plan may also entail variations in implementation depending on the configuration. For example, the farming machine may determine a configuration for the autonomous farming machine and access the sequence of predefined farming actions corresponding to the configuration of the farming machine. In another example, the farming machine may determine a different farming machine is operating in a different field than the farming machine. The different field may have similar characteristics to the field (e.g., the field is a corn field, and the different field is an adjacent corn field operated by the farmers neighbor), and the different farming machine may have similar characteristics to the farming machine. The farming machine may access the sequence of predefined farming actions the different farming machine implemented in the different field to perform in the field.

In some cases, the farming machine may autonomously traverse the field to obtain real-time data describing initial conditions for each of the plurality of field portions in the field. The farming machine may then access the predefined sequence of actions the predefined sequence of actions is based on real-time measurements describing conditions for each of the plurality of field portions in the field obtained during a previous pass in a same season the autonomous farming machine operated in the field. In another example, the farming machine may access the predefined sequence of actions based on real-time measurements describing conditions for each of the plurality of field portions in the field obtained during a previous pass in a same season the autonomous farming machine operated in the field.

The farming machine is configured to access real-time measurements describing field portions in a variety of manners. In an example, the farming machine may access an image captured by an image sensor coupled to the autonomous farming machine and determine one or more real-time measurements from visual information in the image. In an example, the farming machine may access machine condition information from one or more sensors monitoring operation of the autonomous farming machine and determine one or more real-time measurements from the machine condition information. In an example, the farming machine may access environment condition information from one or more sensors monitoring an environment surrounding the autonomous farming machine and determine one or more real-time measurements from the environment condition information. In an example, the farming machine may access one or more real-time measurements from a similar autonomous farming machine operating in a similar field performing at least one predefined farming action in the sequence of predefined farming actions.

In some cases, real-time measurements may include determining or calculating data from measurements. In an example, the farming machine may include weed pressure for each field portion in the real-time measurements. In this case, the farming machine may determine a weed pressure for each field portion based on other obtained real-time measurements. In an example, the farming machine may include one or more characteristics for one or more plants in the real-time measurements. In this case, determining one or more characteristics for one or more plants of the plants in each field portion based on the obtained real-time measurements. In an example, the farming machine In an example, the farming machine may include an expected return on investment as part of the real-time measurements. In this case, the farming machine may determine an expected return on investment for a crop planted in the field based on other obtained real-time measurements.

The farming machine is configured to apply the treatment prediction model in a variety of manners. For example, the farming machine may apply the prediction model for every portion of the field. That is, the farming machine will input the real-time measurements for each field portion into the prediction model, the farming machine will employ the model to determine informed treatment actions and informed times for each field portion, and the farming machine will employ the prediction model to modify the sequence of predefined farming actions for every field portion. The farming machine may also apply the prediction model to some subset of filed portions, e.g., every other, once a row, etc.

Lastly, many different field portions may be implemented in the workflow 1200. For instance, a filed portion may be less than a square foot, a few square feet, dozens of square feet, hundreds of square feet, an acre, several acres, several acres, hundreds of acres, etc. Field portions may also include one plant, two plants, three plants, four plants, five plants, ten plants, twenty plants, a hundred plants, etc.

Implementing an Experimental Treatment Plan

Figure 13:
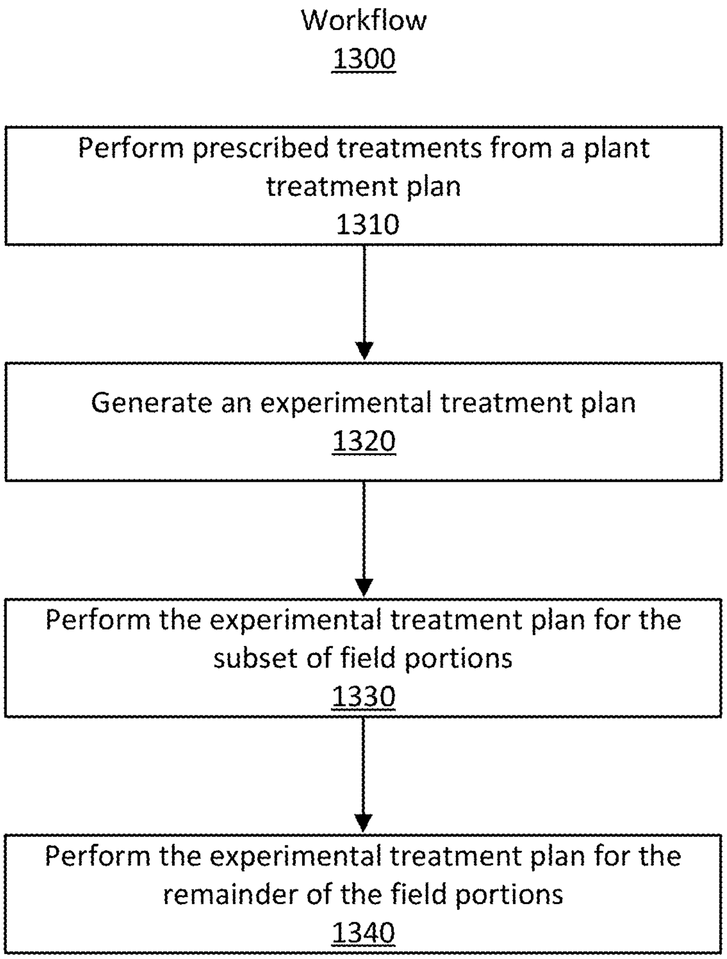
FIG. 13 illustrates a workflow for generating an experimental treatment plan for an autonomous farming machine, according to one example embodiment.

FIG. 13 illustrates a workflow for generating an experimental treatment plan for an autonomous farming machine, according to one example embodiment. The workflow 1300 can include additional or fewer steps and the illustrated steps may be accomplished in any order. In some cases, steps may be repeated any number of times before progressing to a subsequent step.

As described above, the workflow 1300 is performed by a farming machine in a field that is autonomously (or semi-autonomously) acting to accomplish a farming objective set forth by a manager of the field. Here, the farming objective weeding the field by treating identified plants with a spray treatment but could be a different farming objective. The field is divided into field portions and farming actions to achieve the farming objective may be different for each field portion.

The farming machine performs 1310 prescribed treatments of a plant treatment plan. Prescribed treatments are predefined farming actions configured for accomplishing the farming machine through the field. In other words, the prescribed treatments include an ordered sequence of prescribed treatments actions that the autonomous farming machine performs as it moves through the field.

In some examples, the farming machine obtains real-time measurements describing conditions of each of the plurality of field portions as the autonomous farming machine moves through the field performing prescribed treatments of the plant treatment plan. The farming machine may also obtain real-time measurements of plants, the soil, weather, etc., as the farming machine travels through the field. In some cases, the farming machine may also access historic and/or predicted measurements for the field portions. The farming machine may generate experimental treatment plans based on the real time measurements, the historic measurements, and/or the predicted measurements.

The farming machine generates 1320 an experimental treatment plan. The experimental treatment plan is a sequence of experimental treatments (i.e., experimental farming actions) configured to induce a variance between plants treated with the experimental treatment plan and plants treated with the prescribed treatments in the plant treatment plan. Generally, at least one of the experimental treatments is different from prescribed treatments of the plant treatment plan. Additionally, in some examples, at least one of the experimental treatments may be configured to be applied during a subsequent pass of the farming machine through the field, and the farming machine may implement the experimental treatment as such.

Depending on the conditions, the experimental treatment plan may vary from the plant treatment plan in one or more was. For example the experimental treatment plan may include (1) an experimental treatment having a different amount (e.g., spray volume, seed count, etc.) than prescribed treatments in the plant treatment plan, (2) an experimental treatment performed at a different location than prescribed treatments in the plant treatment plan, (3) an experimental treatment having a different type (e.g., necrose, promote, harvest, thin, etc.) than a prescribed treatment of the treatment plan, (4) an experimental treatment employing a different machine configuration of the autonomous farming machine than a prescribed treatment of the plant treatment plan, (5) an experimental treatment having a different application precision than a prescribed treatment of the plant treatment plan, etc.

In generating the experimental treatment plan, in an example, the farming machine may access an experimental field size describing an amount of the field allottable for the experimental treatment plan. That is, access an amount of the field the manager has indicated for performing experimental treatment plans. Typically, a size of the subset of field portions is less than the experimental field size such that the experimental treatment plan is applied to field portions less than the amount of field allotted by the manager. Similarly, the farming machine may access a location (e.g., area) of the field allottable for the experimental treatment plan. That is, access an area of the field that the manager has indicated for performing experimental treatment plans. The farming machine may generate experimental treatment actions for field portions in the allotted area.

In an example, the farming machine generates the experimental treatments for the experimental treatment plan according to divergence values indicated by the manager. That is, the farming machine may access an acceptable dissimilarity value (e.g., divergence, variance) of the experimental treatment plan indicated by the manager, and the farming machine may generate experimental treatments less than the acceptable dissimilarity from the plant treatment plan. For instance the manager may indicate that the treatments in the experimental treatment plan should be less than 5% different than those in the plant treatment plan, and the farming machine generates experimental treatments accordingly.

In various configurations, the farming machine generates experimental treatments in response to various triggers. For example, the farming machine may generate the experimental treatment plan in response to real-time measurements indicating that a plant quality is above a threshold plant quality. In another example, the farming machine may generate the experimental treatment plan in response to real-time measurements indicating that a plant quality is below a threshold plant quality. In still another example, the farming machine may generate the experimental treatment plan in response to real time measurements being a threshold level of dissimilarity away from an expected real-time measurement.

The farming machine performs 1330 the experimental treatment plan for the subset of field portions. That is, the farming machine implements the sequence of experimental treatments (i.e., experimental farming actions) in the subset of field portions (rather than the prescribed treatments of the plant treatment plan). In some cases, the subset of field portions may be a single row of plants, two rows of plants, etc.

In turn, the farming machine performs 1340 the plant treatment plan for a remainder of field portions of the plurality of field portions. The remainder of field portions is the plurality less the subset.

The farming machine may modify the plant treatment plan based on measured results of the plant treatment plan when generating experimental treatment plans. For instance, the farming machine may modify the plant treatment plant to perform one or more experimental treatments of the experimental treatment plan (or the experimental treatment plan) at a subsequent time in the field. For example, the farming machine may modify the plant treatment plan such that elements of the experimental treatment plan are performed in a subsequent growing season in the field. Modifying the plant treatment plan with experimental treatments may include modifying, accelerating, delaying, removing, replacing, adding specific treatment actions (e.g., farming actions) as described hereinabove.

Additionally, the farming machine may implement one or more experimental treatment plans in the field. For example, the farming machine may generate a second experimental treatment plan. The second experimental treatment plan comprises a second sequence of second experimental treatments for the autonomous farming machine to apply to a second subset of the plurality of field portions in the field. In this case, at least one second experimental treatment in the second experimental treatment plan is different from both prescribed treatments of the plant treatment plan and experimental treatments in the experimental treatment plan. Additionally, the second experimental treatment plan is configured to induce a second variance between plants treated by the plant treatment plan and plants treated with the second experimental treatment plan. Moreover, the variance induced by the experimental treatment plan is different from the second variance induced by the second experimental treatment plan, and the second subset of the plurality of field portions is different than the subset of the plurality of field portions.

This concept can be framed even more broadly. The farming machine may generate a plurality of experimental plant treatment plans for the autonomous farming machine to apply to a plurality of subsets of the plurality of field portions in the field. In this case, each experimental treatment plan comprises at least one experimental treatment different than the experimental treatments of the other experimental treatment plans in the plurality of experimental plant treatment plans. Moreover, each experimental treatment plan is configured to induce a different variance from the other experimental treatment plans, and each experimental treatment plan is applied to a different subset of the plurality of subsets of the plurality of field portions.

In some configurations, the farming machine may determine an induced variance after the experimental treatment plan is performed in the field. To do so, the farming machine obtain real-time measurements describing variance resulting from the experimental treatment plan in the subset of field portions and obtains real-time measurements describing variance resulting from the plant treatment plan in the remainder of field portions. The farming machine determines an induced variance caused by the experimental treatment plan by comparing real-time measurements indicating plant variance for the experimental treatment plan and the plant treatment plan.

In an example, the real-time measurements for determining the induced variance are obtained on a subsequent pass of the farming machine through the field. Moreover, in an example, the induced variance determined from real time measurement on the subsequent pass may be used to modify one or more prescribed treatments in the plant treatment plan.

User Feedback in Modifying a Treatment Plan

Figure 14:
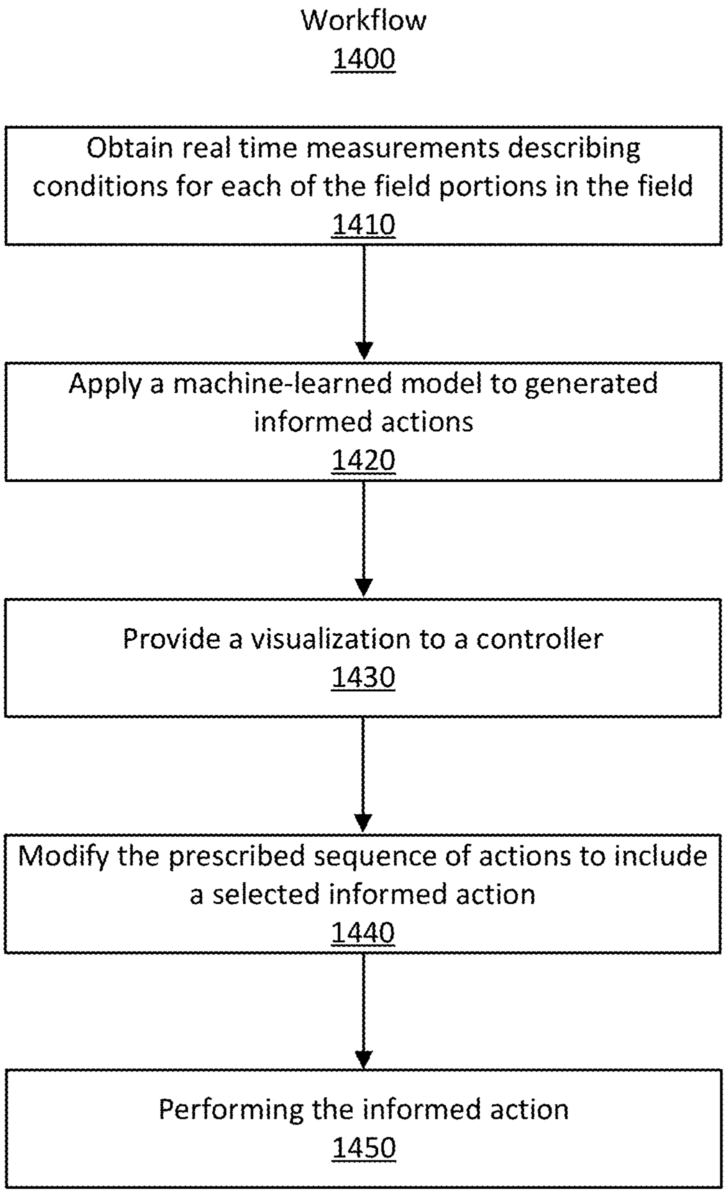
FIG. 14 illustrates a workflow for modifying a plant treatment plan based on manager (e.g., user) feedback, according to one example embodiment.

FIG. 14 illustrates a workflow for modifying a plant treatment plan based on manager (e.g., user) feedback, according to one example embodiment. The workflow 1400 can include additional or fewer steps and the illustrated steps may be accomplished in any order. In some cases, steps may be repeated any number of times before progressing to a subsequent step.

As described above, the workflow 1400 is performed by a farming machine in a field that is autonomously (or semi-autonomously) acting to accomplish a farming objective set forth by a manager of the field. Here, the farming objective weeding the field by treating identified plants with a spray treatment but could be a different farming objective. The field is divided into field portions and farming actions to achieve the farming objective may be different for each field portion.

To accomplish the farming objective, the farming machine obtains 1410 real-time measurements describing conditions (e.g., operating environment) for each of the field portions in the field. The real-time measurements may be obtained by the external systems (e.g., external system 220) or machine component array (e.g., machine component array 230) of the farming machine. The real-time measurements are obtained as the autonomous farming machine performs a prescribed action from a prescribed sequence of actions (i.e., a treatment plan) for treating plants in the field. In effect, the farming machine is continuously measuring the field as it is spraying plants with plant treatment.

The farming machine applies 1420 a machine-learned model (e.g., prediction model in the prediction module 460) to the real-time measurements. The machine learned module determines, for each field portion, a set of farming actions that further the farming objective. That is, the machine learned model generates modified farming actions informed by the real-time measurements obtained by the farming machine ("informed actions"). The generated set of informed actions represent a variety of possible actions that a manager may choose to further the farming objective, and each of those actions may change results pertaining the objective in different ways. For instance, one informed action may increase cost at the expense of yield when achieving the farming objective, while a second informed action may reduce cost to the detriment of yield.

Each of the informed farming actions in the set, in effect, performs a modified treatment at a modified time, both of which are informed by the real-time measurements. The modified treatment may be a change to various characteristics of the treatment (e.g., strength, duration, speed, chemistry, etc.). The modified time may be any of the temporal changes to modified treatments discussed hereinabove (e.g., accelerating, delaying, removing, adding, etc.).

The farming machine provides 1430 the manager (e.g., a controller) of the farming machine a visualization of the real-time measurements and the set of informed actions. The visualization may be provided to the manager via the network in the system environment of the farming machine. The visualizations may be graphical, text, audio, video, etc. of information in the system environment. For example, the visualization may be (1) a representation of an expected change in real-time measurements describing the conditions in the field when performing at least an informed action of the set of informed actions, (2) representation of one or more prescribed actions of the prescribed sequence of actions previously performed by the farming machine in the field, (3) illustrates historic real time measurements of the autonomous farming machine performing the prescribed sequence of actions in the field.

Whatever the medium, the visualizations provide the information to the manager in a manner that conveys the differences between (1) the set of informed farming actions and the prescribed sequence of actions, (2) results of a farming objective and/or treatment plan employing the prescribed sequence of actions and results of the farming objective and/or treatment plan employing the informed action, (3) current real-time measurements, (4) expected measurements, (5) between each informed action in the set of informed actions and the next prescribed action in the sequence of prescribed actions, (6) a difference between an informed action in the set of informed actions and a historic (i.e., previous, past, etc.) action performed in the field, (7) at least an informed action of the set of informed actions and an action previously executed by the farming machine, when the action previously executed by the farming machine is within a threshold level of similarity to the informed action. etc.

The controller selects one (or none) of the informed actions from the set of received informed actions for the farming machine in the field. For instance, the controller may interact with a device (e.g., via a display) to select the visualization representing the informed action. In some cases, the manager may modify an informed action (e.g., changing its parameters) and select the modified informed action. Similarly, the manager may elect not to implement one of the set of informed actions and the "selected" informed action reflects no-change to the pre-determined sequence. Additionally, the manager may interact with the visualization to request additional data describing the set of informed actions or the real-time measurements. The manager, via the device, then transmits the selected informed action to the farming machine such that the farming machine may implement the informed action. In the configurations where the manager requests information, the device may receive the requested information from the farming machine.

The farming machine receives 1440 the selected informed action of the set of informed actions from the manager. The farming machine then modifies the prescribed sequence of actions to include the selected informed action. The informed action may modify the prescribed sequence of actions in any of the manners described above (e.g., adding, removing, accelerating, delaying, modifying, etc.). The farming machine may employ the selected informed treatment action as an input to train one or more of the models employed by the prediction module 460.

The farming machine then performs 1450 the informed action as part of the prescribed sequence of actions (as the prescribed sequence of actions has been modified). Implementing the informed action may occur when the controller instructs the farming machine to perform the informed action (e.g., by transmitting the selected informed action), the farming machine schedules and performs the action, the farming machine generates instructions to implement the action, etc. The farming machine implements the informed action by performing the informed treatment at the informed time.

In some configurations, one or more of the set of informed actions may comprise a second prescribes sequences of actions. In this case, the second sequence prescribed set of actions may include one or more actions that modify the prescribed sequence of actions based on the real time measurements. The manager may then select and transmit the second prescribed sequence of actions to the farming machine. In other words, the manager may select an modified treatment plan rather than a modified treatment action.

X. Control System

Figure 15:
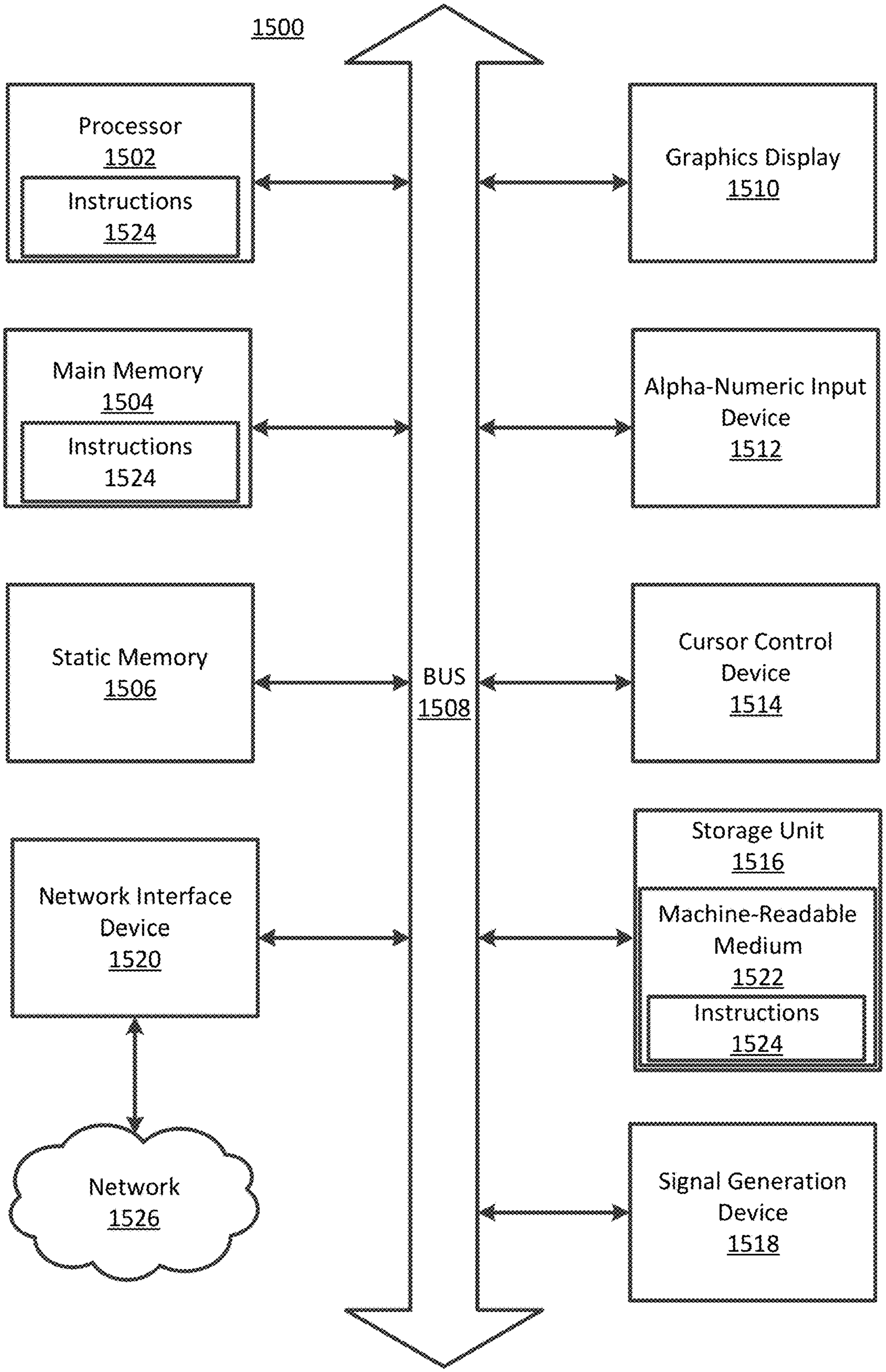
FIG. 15 is a block diagram illustrating components of an example machine for reading and executing instructions from a machine-readable medium, in accordance with one or more example embodiments.

FIG. 15 is a block diagram illustrating components of an example machine for reading and executing instructions from a machine-readable medium, in accordance with one or more example embodiments. Specifically, FIG. 15 shows a diagrammatic representation of control system 130 in the example form of a computer system 1500. The computer system 1500 can be used to execute instructions 1524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a client-server network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes one or more processing units (generally processor 1502). The processor 1502 is, for example, a central processing unit (CPU), a graphics processing unit (GPU), a digital signal processor (DSP), a control system 210, a state machine, one or more application specific integrated circuits (ASICs), one or more radio-frequency integrated circuits (RFICs), or any combination of these. The computer system 1500 also includes a main memory 1504. The computer system may include a storage unit 1516. The processor 1502, memory 1504, and the storage unit 1516 communicate via a bus 1508.

In addition, the computer system 1500 can include a static memory 1506, a graphics display 1510 (e.g., to drive a plasma display panel (PDP), a liquid crystal display (LCD), or a projector). The computer system 1500 may also include an alphanumeric input device 1512 (e.g., a keyboard), a cursor control device 88 (e.g., a mouse, a trackball, a joystick, a motion sensor, or other pointing instrument), a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. For example, the instructions 1524 may include the functionalities of modules of the system 130 described in FIG. 2. The instructions 1524 may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 may be transmitted or received over a network 1526 via the network interface device 1520.

XI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants 104 with a farming machine 100 including a control system 210 executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. An autonomous farming machine configured for generating an experimental treatment plan to perform in a field having a plurality of field portions, the autonomous farming machine comprising:
- a sensor array configured to obtain measurements of treatment plans executed in the field;
- a treatment array configured to perform a plant treatment plan in the field;
- one or more processors; and
- a non-transitory computer readable storage medium storing computer program instructions for generating the experimental treatment plan, the computer program instructions when executed by the one or more processors causing the autonomous farming machine to:
  - perform, using the treatment array, prescribed treatments of the plant treatment plan comprising a sequence of prescribed treatments as the autonomous farming machine moves through the field;
  - generate the experimental treatment plan comprising a sequence of experimental treatments for the autonomous farming machine to apply to a subset of the plurality of field portions in the field, and wherein generating the experimental treatment plan comprises:
  - determining the sequence of experimental treatments for the experimental treatment plan, wherein:
    - the sequence of experimental treatments configured to induce a variance;
    - the variance represents a deliberately induced agronomic difference between plants treated by the plant treatment plan and plants treated by the experimental treatment plan, and
    - the variance is measurable by the sensor array, and
  - generating the experimental treatment plan comprising the sequence of experimental treatments, wherein at least one experimental treatment in the experimental treatment plan is different from prescribed treatments of the plant treatment plan; and
  - performing, using the treatment array, the experimental treatment plan for the subset of field portions and the plant treatment plan for a remainder of field portions of the plurality of field portions.

2. The autonomous farming machine of claim 1, wherein the computer program instructions, when executed by the one or more processors, cause the autonomous farming machine to:
- modify the plant treatment plan for a subsequent season based on the experimental treatment plan;
- modify the plant treatment plan such that prescribed treatments are not applied to the subset of field portions in the subsequent season; and
- modify the plant treatment plan such that one or more of the prescribed treatments is replaced with one or more of the experimental treatments of the experimental treatment plan for the subsequent season.

3. The autonomous farming machine of claim 1, wherein the computer program instructions, when executed by the one or more processors, cause the autonomous farming machine to:
- generate a second experimental treatment plan comprising a second sequence of second experimental treatments for the autonomous farming machine to apply to a second subset of the plurality of field portions in the field, wherein:
  - at least one second experimental treatment in the second experimental treatment plan is different than prescribed treatments of the plant treatment plan and experimental treatments in the experimental treatment plan,
  - the second experimental treatment plan is configured to induce a second variance between plants treated by the plant treatment plan and plants treated with the second experimental treatment plan,
  - the variance induced by the experimental treatment plan is different from the second variance induced by the second experimental treatment plan, and
  - the second subset of the plurality of field portions is different than the subset of the plurality of field portions.

4. The autonomous farming machine of claim 1, wherein the computer program instructions, when executed by the one or more processors, cause the autonomous farming machine to:
- responsive to performing, using the treatment array, the experimental treatment plan for the subset of field portions and the prescribed treatment plan for the remainder of field portions:
  - obtain, using the sensor array, real-time measurements describing variance resulting from the experimental treatment plan in the subset of field portions;
  - obtain, using the sensor array, real-time measurements describing variance resulting from the plant treatment plan in the remainder of field portions; and
- determine an induced variance caused by the experimental treatment plan by comparing real-time measurements indicating plant variance for the experimental treatment plan and the plant treatment plan.

5. The autonomous farming machine of claim 1, wherein the experimental treatment plan comprises at least one additional experimental treatment configured to be applied during a subsequent pass of the autonomous farming machine, and
- the computer program instructions, when executed by the one or more processors, cause the autonomous farming machine to perform the at least one additional experimental treatment on the subsequent pass of the farming machine through the field.

6. The autonomous farming machine of claim 1, wherein the computer program instructions, when executed by the one or more processors, cause the autonomous farming machine to:
- transmit, to a manager of the autonomous farming machine, the experimental treatment plan;
- receive, from the manager the autonomous farming machine, a verification to proceed with the experimental treatment plan; and
- wherein the experimental treatment plan is applied to the subset of field portions responsive to receiving the verification.

7. The autonomous farming machine of claim 1, wherein at least one experimental treatment of the experimental treatment plan is one or more of the following:
- a different amount of treatment than a prescribed treatment in the plant treatment plan,
- applied at a different location than a prescribed treatment in the plant treatment plan,
- a different treatment type of treatment than a prescribed treatment of the plant treatment plan,
- employs a different machine configuration of the autonomous farming machine than a prescribed treatment of the plant treatment plan.

8. A non-transitory computer readable storage medium storing computer program instructions for generating an experimental treatment plan, the computer program instructions when executed by one or more processors causing an autonomous farming machine to:

perform, using a treatment array of the autonomous farming machine, prescribed treatments of a plant treatment plan comprising a sequence of prescribed treatments as the autonomous farming machine moves through a field comprising a plurality of field portions;

generate, the using the one or more processors of the farming machine, the experimental treatment plan comprising a sequence of experimental treatments for the autonomous farming machine to apply to a subset of the plurality of field portions in the field, and wherein generating the experimental treatment plan comprises:

determining the sequence of experimental treatments for the experimental treatment plan, wherein:

the sequence of experimental treatments configured to induce a variance;

the variance represents a deliberately induced agronomic difference between plants treated by the plant treatment plan and plants treated by the experimental treatment plan, and the variance is measurable by a sensor array, and generating the experimental treatment plan comprising the sequence of experimental treatments, wherein at least one experimental treatment in the experimental treatment plan is different from prescribed treatments of the plant treatment plan;

perform, using the treatment array, the experimental treatment plan for the subset of field portions and the plant treatment plan for a remainder of field portions of the plurality of field portions.

* * * * *